(12) United States Patent
Fan et al.

(10) Patent No.: US 11,543,653 B2
(45) Date of Patent: Jan. 3, 2023

(54) DEVICE COMPONENTS FORMED OF GEOMETRIC STRUCTURES

(71) Applicant: The Board of Trustees of the Leland Stanford Junior University, Stanford, CA (US)

(72) Inventors: Jonathan A. Fan, Palo Alto, CA (US); David Sell, Stanford, CA (US); Jianji Yang, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 154 days.

(21) Appl. No.: 16/937,258

(22) Filed: Jul. 23, 2020

(65) Prior Publication Data

US 2022/0299760 A1 Sep. 22, 2022

Related U.S. Application Data

(62) Division of application No. 15/583,827, filed on May 1, 2017, now Pat. No. 10,725,290.

(Continued)

(51) Int. Cl.
| | |
|---|---|
| *G02F 1/09* | (2006.01) |
| *G02B 26/00* | (2006.01) |
| *G02B 5/18* | (2006.01) |
| *G02B 27/10* | (2006.01) |
| *G02B 27/00* | (2006.01) |
| *G02B 1/00* | (2006.01) |

(52) U.S. Cl.
CPC ......... *G02B 27/0012* (2013.01); *G02B 1/002* (2013.01); *G02B 5/18* (2013.01); *G02B 2005/1804* (2013.01); *G02B 2207/101* (2013.01)

(58) Field of Classification Search
CPC .... G02B 3/00; G02B 26/0841; G02B 26/001; G02B 5/1866; G02B 3/0056; G02F 1/09; G02F 1/29; G02F 1/315; G02F 1/31; G11B 7/1353
USPC ....... 359/642, 298, 237, 282, 315–316, 260, 359/263, 318, 566, 569, 619, 627
See application file for complete search history.

(56) References Cited

U.S. PATENT DOCUMENTS

| | | | | |
|---|---|---|---|---|
| 5,367,588 | A | * | 11/1994 | Hill ........................ G03F 7/7035 264/2.6 |
| 7,778,296 | B1 | * | 8/2010 | Vuckovic .................. H01S 5/10 372/41 |

(Continued)

*Primary Examiner* — Dawayne Pinkney

(57) ABSTRACT

Various embodiments are directed to an apparatus and methods of forming and/or using an apparatus comprising a plurality of device components. An example method includes geometrically optimizing a periodic or aperiodic device comprising a plurality of device components by optimizing a topology, for each device component, from a starting point to have particular optical properties for a particular optical response. Each device component includes a plurality of geometric structures. The optimization includes selecting the starting point for a continuous profile to have the particular optical properties for the particular optical response, iteratively converging the continuous profile to a discrete profile, and, while iteratively converging to the discrete profile, adjusting edges between boundaries of the device components by accounting for fabrication constraints.

26 Claims, 65 Drawing Sheets
(53 of 65 Drawing Sheet(s) Filed in Color)

Related U.S. Application Data

(60) Provisional application No. 62/329,841, filed on Apr. 29, 2016.

(56) References Cited

U.S. PATENT DOCUMENTS

| | | | |
|---|---|---|---|
| 10,365,416 B2 * | 7/2019 | Zhan | G02B 1/002 |
| 2011/0181971 A1 * | 7/2011 | Campbell | G02B 5/045 83/875 |

* cited by examiner

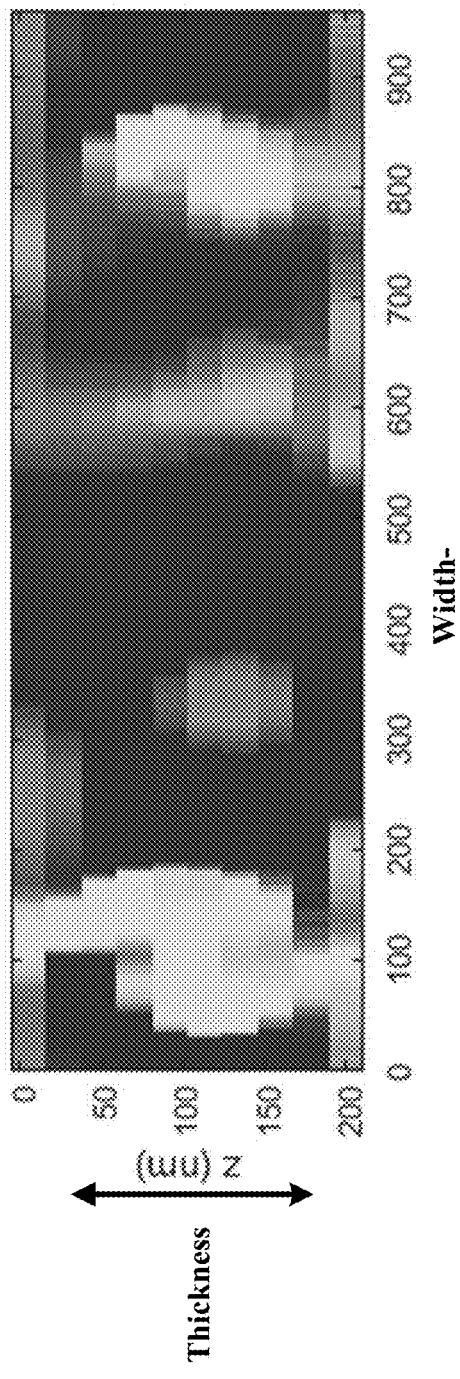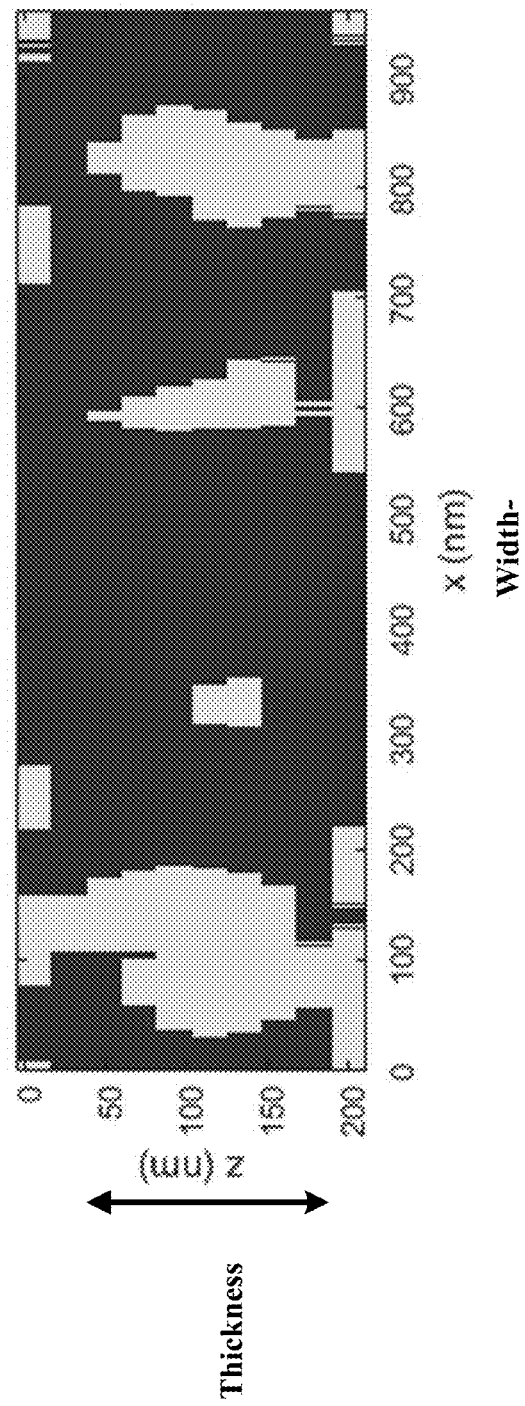

Transmission Mode

Transmission Mode
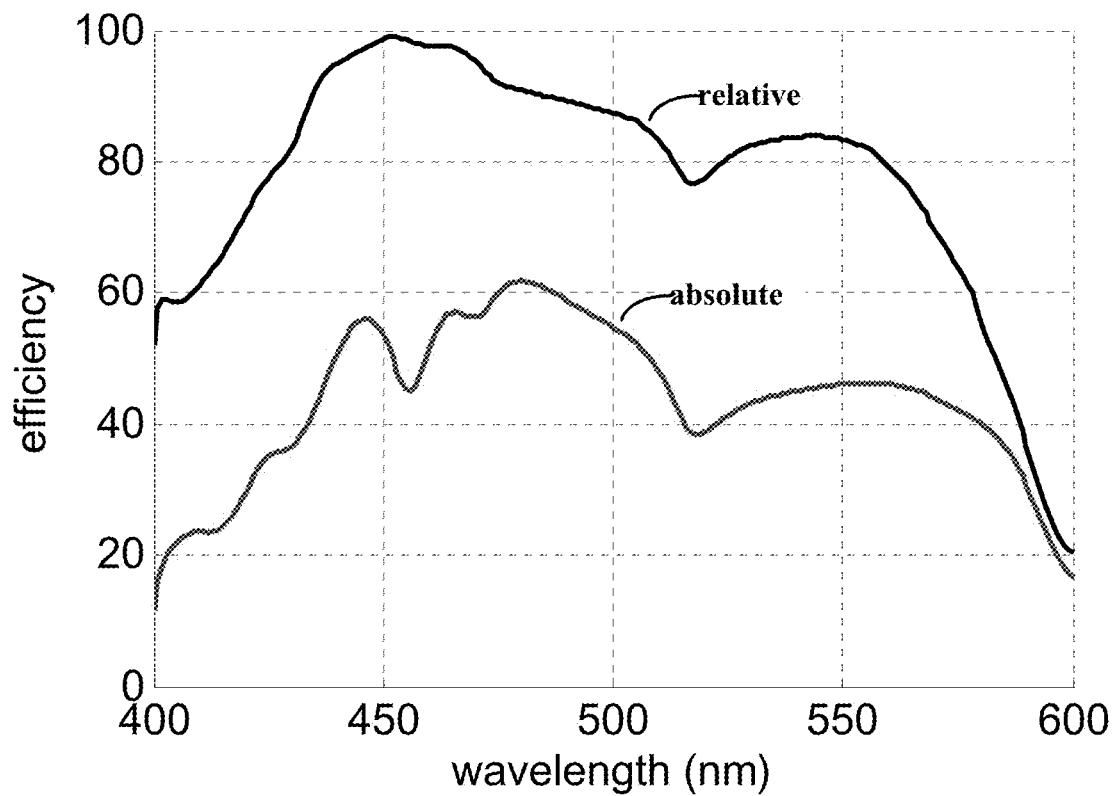
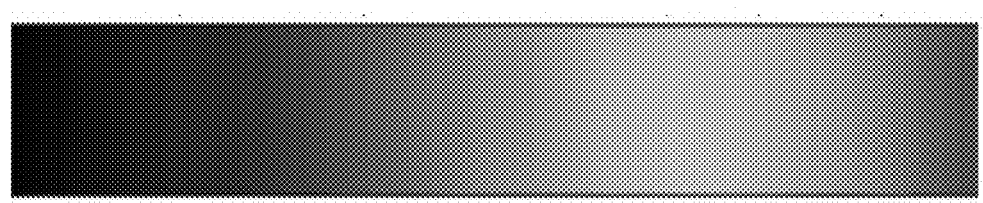
Violet  Blue  Green  Yellow  Red
FIG. 8D

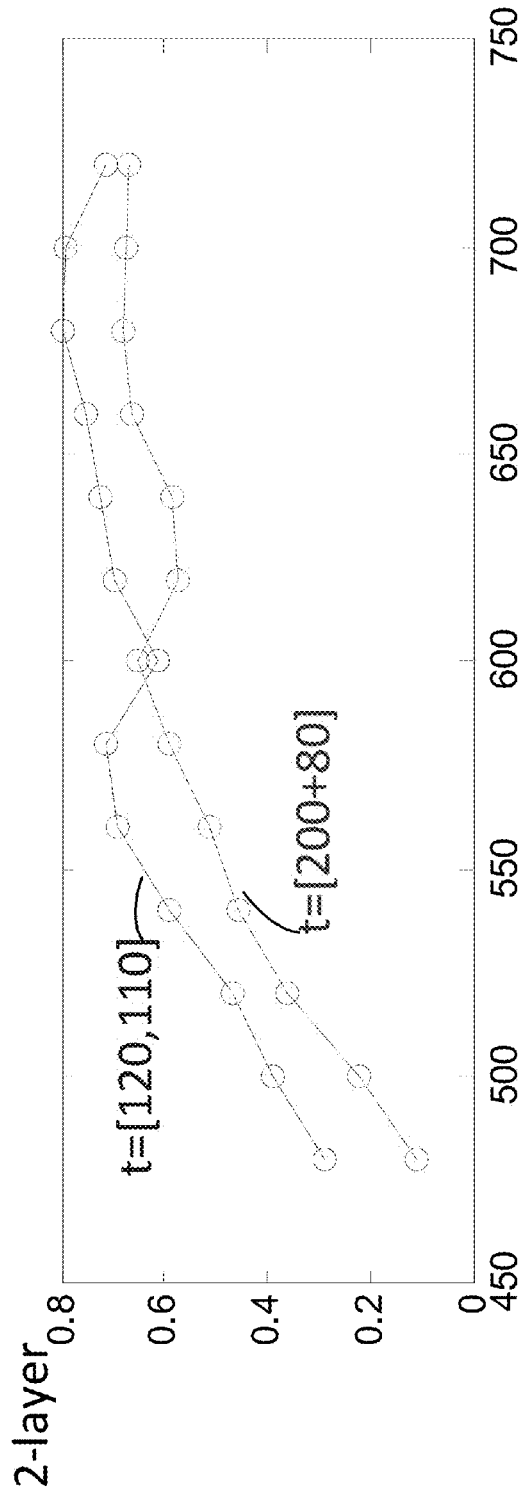
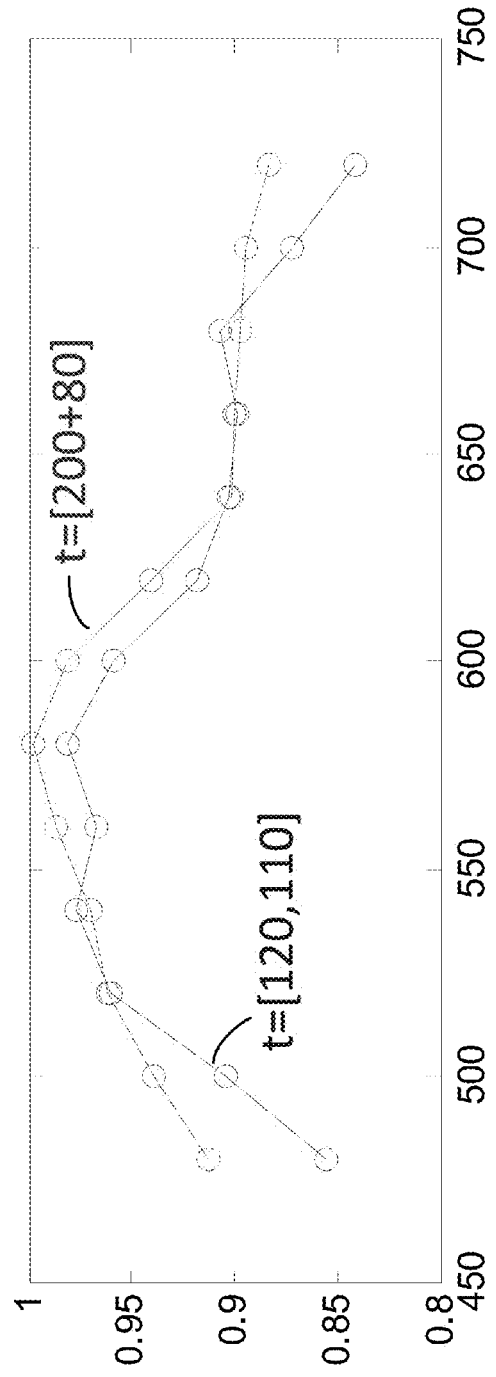
FIG. 30A
FIG. 30B 3-layer

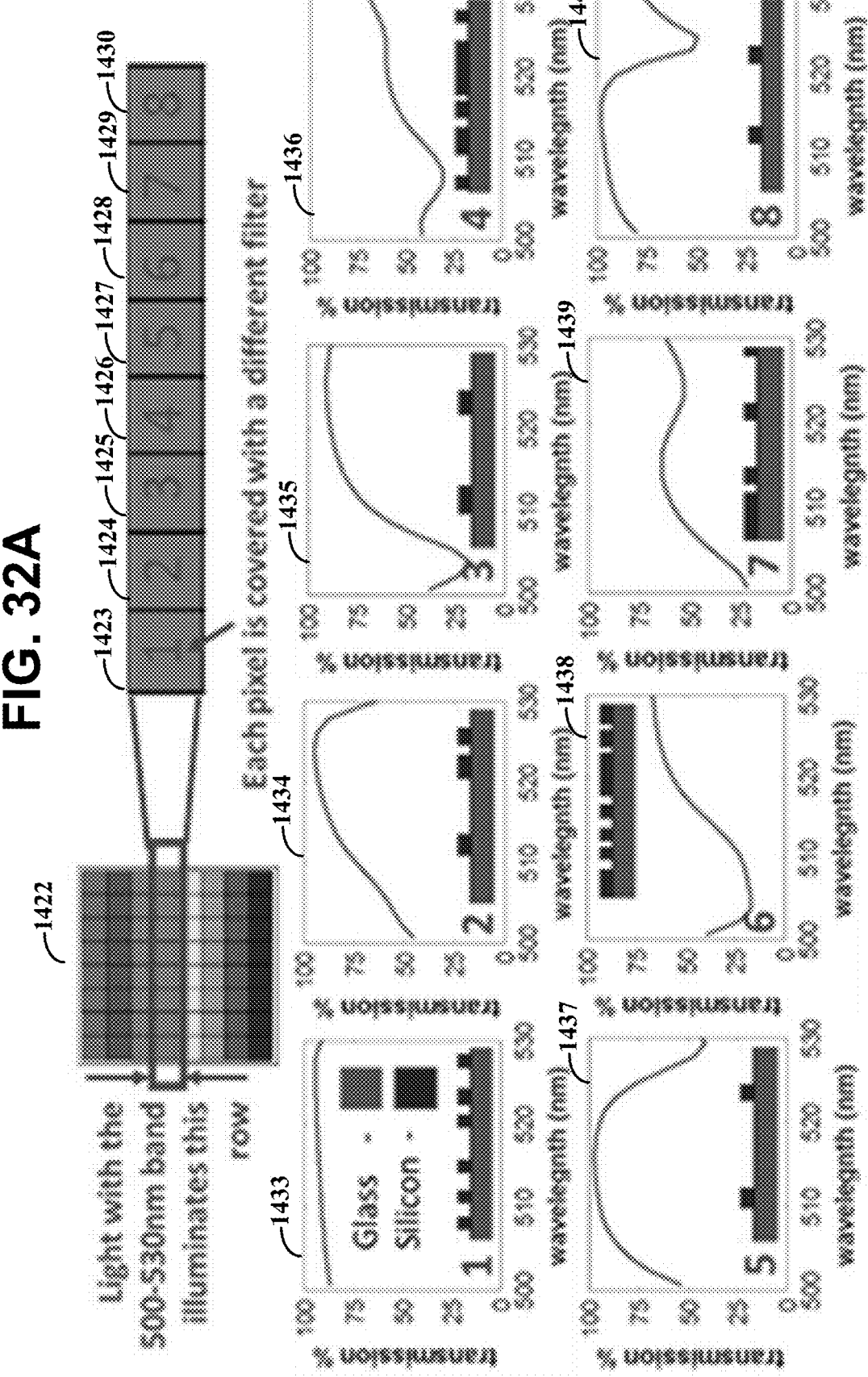

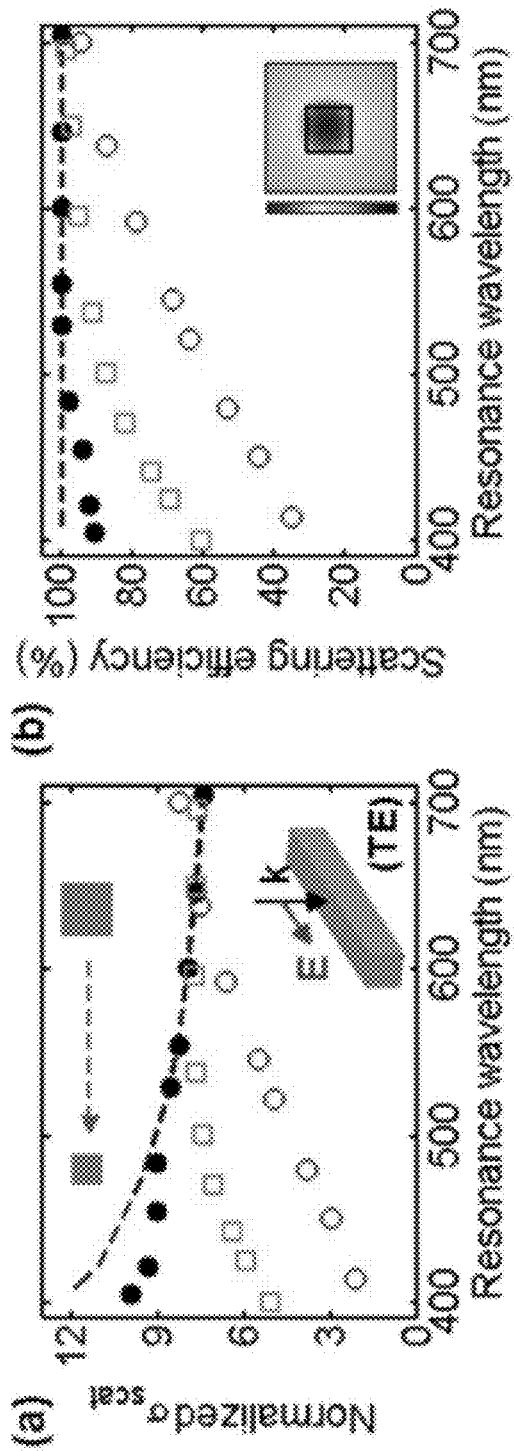
FIG. 35A
FIG. 35B
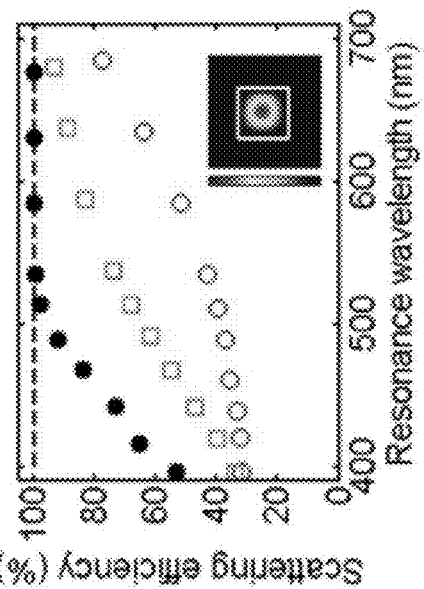
FIG. 35C
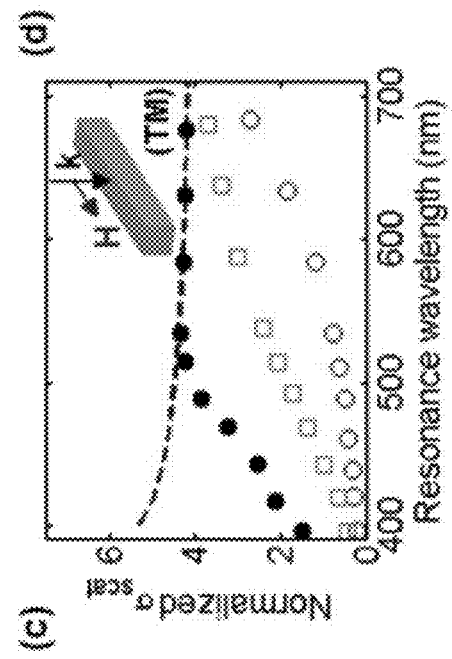
FIG. 35D

DEVICE COMPONENTS FORMED OF GEOMETRIC STRUCTURES

FEDERALLY-SPONSORED RESEARCH AND DEVELOPMENT

This invention was made with Government support under contract FA9550-15-1-0161 awarded by the U.S. Air Force. The U.S. Government has certain rights in this invention.

OVERVIEW

Optics are used in a wide-variety of applications. For example, smart phones that are carried by people include optics or optical elements, such as lenses used in cameras. Due to the size of smart phones, as well as other devices, the optics (e.g., hardware) have limits in size. Optical hardware processes spectral, polarization, and optical phase information from incident light. Metasurfaces are sometimes used in optics. Metasurfaces are optical hardware/devices that control their magnitude and phase response to light based on geometric design of the metasurfaces. For example, a metasurface controls the wavefronts of incident electromagnetic waves and support beam steering and focusing functionality. Metasurfaces can also specify the polarization and angular momentum of light that exceeds the ability of conventional optical components.

Two factors affect metasurface design. The first is the detailed geometry of geometric structures, which are sub-wavelength-scale resonators with geometry-dependent optical properties. The second is the material forming the geometric structures, which is sometimes determined by the target wavelength of interest. In infrared and terahertz regimes, metal and doped semiconductors are used, as well as plasmonic material in both active and passive metasurface platforms. Transition metal oxides and nitrides can support plasmonic behavior in the near-infrared regimes. Between near-infrared and green visible light, semiconductors with high refractive index and low loss, such as amorphous and polycrystalline silicon, are used.

In accordance with various embodiments, silicon, such as crystalline silicon or polycrystalline silicon and/or other various materials, is used to form geometric structures for a metasurface design. Crystalline silicon, for example, has superior optical properties for blue wavelengths (400 nm to 500 nm range) as compared to polycrystalline silicon or amorphous forms of silicon. For example, while amorphous or polycrystalline silicon scatter light effectively at longer wavelengths than blue wavelengths, they absorb blue wavelengths which limits their scattering efficiency. Aluminum is plasmonic at ultraviolet and blue wavelengths but its performance is limited by absorption losses and sensitivity to oxidation. Transparent dielectric materials such as titanium oxide and silicon nitride have low reflect indexes which limit their ability to scatter light.

A number of aspects of the present disclosure are directed to methods for optimizing a thin film layer, such as a silicon-based metasurface. First, the metasurface layout is set (e.g., optimized) for a continuous profile (e.g., continuous dielectric constant), and then the continuous profile is converted into a discrete profile (e.g., realistic dielectric constants). For example, the method includes optimizing a periodic or aperiodic device comprising a plurality of device components by optimizing a topology, for each device component, from a starting point to have particular optical properties for a particular optical response. Each device component includes a plurality of geometric structures. The optimization includes selecting the starting point for a continuous profile to have the particular optical properties for the particular optical response, converging the continuous profile to a discrete profile, and adjusting edges between boundaries of the device components by accounting for fabrication constraints.

As further described herein, these devices are created using an adjoint-based topology optimization process, and possess non-intuitive layouts that enable a variety of diffractive optics phenomena, such as beam deflection and diffraction. The initial device component consists of a random dielectric continuum of dielectric constants, with values ranging between the dielectric constants of the material forming the geometric structures, such as of air and silicon. To improve the Figure of Merit (FoM), which corresponds to grating efficiency, an iterative process is performed that uses two electromagnetic simulations per iteration, a forward and an adjoint simulation. These simulations produce two sets of electromagnetic field profiles within the device, which serve to simulate and/or specify specific changes in the dielectric constant at each location in a manner that improves the FoM. Over the course of multiple iterations, the dielectric continuum in the device converges to the dielectric constant of either silicon or air. The optimization method can be used to achieve multiple input polarizations and wavelengths, by performing forward and adjoint simulations for each optical degree of freedom per iteration.

Various aspects in accordance with the present disclosure include periodic or aperiodic metasurfaces that are formed by a plurality of device components. Each device component includes multiple layers of geometric structures. For example, at least two layers includes a unique geometric layout of the geometric structures (e.g., nanostructures). In various aspects, one or more layers includes solid material, such as a $SiO_2$ spacer layer that can be formed entirely of $SiO_2$. The device components have a particular optical properties for a particular optical response (e.g., are optimized to). For example, a device component is configured to control the amplitude and phase of light across a broadband spectrum, in various aspects. The geometric structures, in some specific aspects, are formed of silicon, such as crystalline silicon that is capable of scattering light effectively across the broadband spectrum (e.g., visible light, infrared and near-infrared light). For example, various aspects of the present disclosure include a metasurface formed using multiple materials, wherein silicon and silicon dioxide are the materials used to build at least a portion of the multiple layers of the metasurface (e.g., most), however, the metasurface is not limited to these materials.

According to other embodiments, methods and/or apparatuses (e.g., devices, elements, and/or systems) are directed to a plurality of device components, each including at least one layer of geometric structures (e.g., each geometric structure including or being a material having a geometric shape and/or size defined by same-wavelength and/or sub-wavelength dimension(s)) and having optical properties for a particular optical response, wherein the device components are combined together to form a periodic or aperiodic device and/or apparatus. In more specific but related embodiments, the method and/or apparatus is further directed to a periodic or aperiodic device and/or apparatus including device components, each including at least two layers of geometric structures and having optical properties for a particular optical response. Further, portions of the device components are combined. For example, the device components can be combined together in at least two directions including width, length, and depth, and wherein the stitched device components are used to manipulate light defined in a particular wavelength range and wherein the shapes and/or sizes of the geometric structures facilitate the manipulation of the light.

These and other matters have presented challenges to optics, for a variety of applications. The above discussion/summary is not intended to describe each embodiment or every implementation of the present disclosure. The figures and detailed description that follow also exemplify various embodiments.

DESCRIPTION OF THE FIGURES

The patent or application file contains at least one drawing executed in color. Copies of this patent or patent application publication with color drawing(s) will be provided by the Office upon request and payment of the necessary fee.

Various example embodiments may be more completely understood in consideration of the following detailed description in connection with the accompanying drawings in the Appendices, which form part of this patent document.

FIGS. 3A-3C illustrate an example of a continuous profile and a discrete profile of a topology of a device component, in accordance with various embodiments;

FIGS. 8A-8D illustrate an example device component, such as the device component illustrated by FIG. 1A, optimized for broadband spectrum transmission efficiency, in accordance with various embodiments;

FIGS. 30A-30B illustrate example efficiency of a two layer device component as designed with two thickness, in accordance with various embodiments;

FIGS. 32A-32B illustrate an example hyperspectral imaging platform that includes an apparatus comprising a plurality of device components and optical properties of each device components of the apparatus across a broadband spectrum, in accordance with various embodiments;

FIGS. 35A-35D illustrate a theoretical analysis of the scattering properties of silicon ridges, in accordance with various embodiments.

Figure 1A:
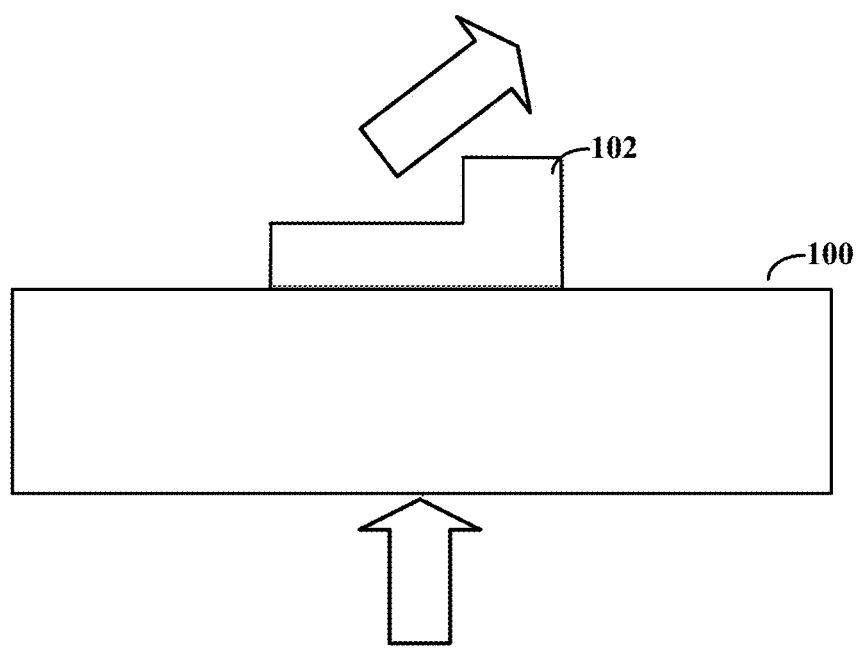
FIG. 1A illustrates an example geometric structure, in accordance with various embodiments.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving geometrically optimized device components having optical properties for a particular optical response. In certain implementations, aspects of the present disclosure have been shown to be beneficial when used in the context of device components formed of at least one layer of silicon geometric structures and wherein portions of the device components are combined together to form a periodic or aperiodic device and/or apparatus. In various specific aspects, the apparatus is used with and/or to form thin film solar cells, a hyper-spectral imaging system, various types of lenses such as a dielectric flat lens or a polarization sensitive lens, a thermal management metasurface, a light emitting device, a fluorescence imaging system, a wearable flexible device, and/or a micro-electro-mechanical system (MEM), among other devices and/or systems. Further, the device components can be formed of a plurality of layers of geometric structures. While not necessarily so limited, various aspects may be appreciated through a discussion of examples using such exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In various instances, optics operate by bending light based on the refractive index of the material forming the optics. However, as device size is being reduced, such as with smartphones, the space that optics occupy is also limited and results in the optics being smaller than or comparable to the wavelength of light. As previously discussed, metasurfaces are often used in optics. Metasurfaces are optical hardware/devices that control a magnitude and phase response to light based on geometric layout of the metasurfaces. For example, a metasurface controls the wavefronts of incident electromagnetic waves and support beam steering and focusing functionality with high efficiency. Metasurfaces, alternatively and/or in addition, specify the polarization and angular momentum of light that exceeds the ability of conventional optical components. Semiconducting geometric structures as components in the metasurface result in high performance in the visible wavelengths due to their high refractive indices and relatively low absorption losses. In accordance with various embodiments, geometric structures of the metasurface are formed using silicon, such as crystal silicon to provide broadband spectral responses, including the regime of 400-500 nanometers (nm) which corresponds to blue wavelengths. Geometric structures have a geometric shape and size defined by wavelength or sub-wavelength dimensions and having optical properties for a particular optical response. Crystalline silicon, in various embodiments, possesses low losses and is readily patterned into resonant geometric structures (e.g., nanostructures) within the 400-500 nm range and across a broadband spectrum range. A broadband spectrum range refers to or includes a visible light, infrared and/or near-infrared range such as, for example, the broadband spectrum range 400-800 nm.

In various embodiments, the geometric structures are fabricated from silicon-on-insulator films bonded to a material, such as Pyrex. For example, the geometric structures are used to form beam deflectors that surprisingly operate across broadband ranges and are optimized for particular wavelength ranges, such as for blue wavelengths. The silicon geometric structures, in various specific embodiments, are layered in multiple layers. In some embodiments, using the geometric structures in at least one layer, as further described herein, a surface is designed that is optimized for a variety of optical properties and/or responses.

In accordance with various embodiments, the geometric structures are used to form metasurfaces. For example, the geometric structures are within at least one layer of device components and can be stacked in at least one dimension (x and/or z, and/or z, etc.). In other specific embodiments, the geometric structures are within multiple layers of the geometric structures are stacked to form the device components in three-dimensions (x, y, and z). The thickness of the device component (e.g., the direction of the layers, which may be the y-direction or z-direction depending on the point of view of the component) is determined by the thickness of each layer and the number of layers. For instance, the stacking of the layers forms the thickness of the device components. Each device component is geometrically shaped, via the geometric structures, to have particular optical properties for an optical response. For example, a device component is configured to control an amplitude and phase of light for a particular wavelength range and/or across a broadband range. The device components are combined to form an aperiodic or periodic device and/or apparatus. For example, each device component is a dielectric or semiconducting film or films and arranged on a flat substrate. In some specific embodiments, the device components are combined by stitching a portion of the device components in one or more directions, such as a width, length, and/or thickness/layer direction to form the periodic or aperiodic device and/or apparatus.

In these context, it is appreciated that "periodic" and "aperiodic" refer to structural aspects of the devices with which they are associated. A periodic device and/or apparatus includes a metasurface formed of periodic structures, such as device components with geometric structures of a periodic pattern (e.g., device components with regularly arranged layers). As a more specific example, a periodic device and/or apparatus can be configured to modulate light in a periodic pattern. An aperiodic device and/or apparatus includes a metasurface formed of aperiodic structures, such as devices components formed of different geometric structures in an aperiodic pattern. Aperiodic devices and/or apparatuses, in various example embodiments, are formed of or using the plurality of device components and influence or control the amplitude and phase of light across a broadband spectrum range.

Various specific embodiments are directed to optimization methods which support compact optical hardware with capabilities that exceed those of conventional diffractive optics. By tailoring optical hardware and/or software, a foundation is created for energy efficient optical systems with smartphone camera footprints, ranging from spectroscopic imagers and light field cameras to microscopes. An element of the hardware can be the metasurface, which consists of or includes geometric structures (e.g., nanostructures) with optical properties specified by geometry.

There can be different methodology to design these devices. For example, an "optical nanomaterials database" can be created that consists of many (on an order of millions and billions) of different device components (e.g., nanoscopic metasurface building blocks) and/or geometric structures therein. By efficiently searching through and combining together different building blocks, followed by local refining, a blueprint is created for optically efficient metasurfaces. The metasurfaces are tailored around energy efficient image processing functions or algorithms to optimize for system size and energy efficiency.

Relating to such optimization, various specific embodiments are directed to identifying: 1) the limits of amplitude and phase control in coupled geometric structures (e.g., for example, these limits are practicably-fundamental limits), and 2) the limits of coupling together dispersive (e.g., possessing wavelength-dependent optical responses) nanoresonators to yield broadband optical response (e.g., for example, these limits are physical or manufacturable-practicable limits). In certain embodiments using this approach can be advantageous in that the metasurfaces are not necessarily constructed using a single layer of simple structures as found in conventional optical devices (sometimes referred to as having physically-intuitive optical responses).

Various other specific embodiments are directed to methods for optimizing a silicon-based metasurface. First, the metasurface layout is set (e.g., optimized) for a continuous profile (e.g., continuous dielectric constant), and then the continuous profile is converted into a discrete profile (e.g., realistic dielectric constants). A layer of the metasurface can contain a unique layout of silicon-in-silicon dioxide. These devices are created using an adjoint-based topology optimization process, and possess non-intuitive layouts that enable a variety of diffractive optics phenomena, such as beam deflection and diffraction. In specific embodiments, the device components can be transmissive gratings that deflect a normally incident plane wave with a specific polarization and wavelength. The initial device component consists of a random dielectric 1 of dielectric constants, with values ranging between the dielectric constants of the material forming the geometric structures, such as of air and silicon. To improve the Figure of Merit (FoM), which corresponds to grating efficiency, an iterative process is performed that uses two electromagnetic simulations per iteration, a forward and an adjoint simulation. These simulations produce two sets of electromagnetic field profiles within the device, which serve to simulate and/or specify specific changes in the dielectric constant at each location in a manner that improves the FoM. Over the course of multiple iterations, the dielectric continuum in the device converges to the dielectric constant of either silicon or air. The optimization method can be used to achieve multiple input polarizations and wavelengths, by performing forward and adjoint simulations for each optical degree of freedom per iteration.

The resulting device component(s) can form or be part of an apparatus/optical device that supports a plurality of optical modes. The optical modes are mediated by the bouncing of light between different vertical interfaces of the layers within the device components. For example, light entering the device components can bounce within, instead of going through the device components in a single path. When light enters the device, the light itself can be considered an optical mode and each time the light (e.g., electromagnetic wave) bounces, a new mode can be generated. The different optical modes generated by the light bouncing within the device can be generated by intra-mode couplings and inter-mode couplings. Intra-mode coupling refers to or includes reflection of an optical mode into itself (e.g., the optical mode couples with a reflection of itself into the device). Inter-mode coupling refers to or includes coupling of a first optical mode with a second (or more) optical mode. Because of the bouncing of light within the device components, the devices support a plurality of spatially overlapping optical modes per unit area. In specific embodiments, apparatuses formed can support at least three round trips of bouncing within device components and which recovers the steady state performance of the device. The intra-mode coupling can be indicative of the number of bounces.

The metasurface can include multiple layers of geometric structures, in various embodiments. As a specific example, a 200 nm-thick fully visible transmission grating is designed consisting of ten 20 nm-thick layers. At least two layers contain a unique layout of silicon-in-silicon dioxide. The continuous and discrete profiles provide layouts with unexpected optical responses, and the efficiencies of these devices have performance metrics that, surprisingly, far exceed those of diffractive optics and single layer metasurface.

Various embodiments include a geometric structure and/or device component database that includes categorization of geometric structures and/or starting points for topology of device components to achieve optical properties for particular optical responses. In accordance with some specific embodiments, optimization efforts can include: 1) generating the device component database and the optical responses of the geometrical structures, 2) combining together different device components (e.g., metasurface building blocks) in a way that provides a seamless material and optical interface, and 3) locally adjusting (e.g., optimizing) and refining the device components to a defined specification. In various embodiments, an optical nanomaterials database is generated, based on neutral network architecture and local optimization function or algorithm, where a particular (e.g., desired) optical response is specified and the algorithm outputs the corresponding metasurface.

Various embodiments disclosed herein include periodic or aperiodic devices and/or apparatuses (e.g., metasurface devices) with tailored dispersion to break the limit of classical optics (where images are focused and recorded at an imaging plane, and processing images are informationally inefficient and functionally limiting) and enable high performance optical functionality in compact systems.

Turning now to the figures, FIG. 1A illustrates an example geometric structure 102 in accordance with various embodiments. The geometric structure 102 is a structure (e.g., nanostructure) formed of a material and with optical properties specified by geometry. As illustrated, the geometric structure 102 is layered on a base layer 100, as discussed further herein. The geometry, in various embodiments, includes ridges, cylinders, post, and spheres, among other shapes. However, the geometric shape is not limited to shapes common to metasurface engineering. For example, the shapes and/or layouts of the geometric structures include shapes and layouts that provide such unexpected optical responses. The specific geometric structures are designed using a topology-optimization methodology, in which the resulting shapes or layouts of the structures (the specific geometry or shape which may not be pre-defined) support at least three round trips of bouncing within device components and which recovers the steady state performance of the device.

In a number of embodiments, one or more of the geometric structures include nanostructures. A nanostructure refers to or includes a geometric structure with one or more dimensions (e.g., length, width, and/or height/thickness) that are less than a micron (e.g., a magnitude of a nanometer).

The geometric structure(s), in various embodiments, are formed of a variety of material to have and/or provide optical properties and/or responses. For example, the geometric structures can be formed of one or more dielectric or semiconducting material that are primarily non-metallic and/or have a refractive index that is greater than two, such as insulating, semiconducting, phase change materials, electro-optic materials, and/or electrochemical materials. In various specific embodiments, the geometric structures are formed of silicon, such as polycrystalline silicon and/or crystalline silicon. As described further herein, crystalline silicon has negligible absorption at green and red wavelengths, and it is used to create efficient, fully visible metasurfaces. In various embodiments, each device component includes at least one layer of geometric structures formed of two or more different materials. The geometric structures can be formed by optimizing the topology and boundaries, for each device component, to have particular optical properties for a particular optical response and based on fabrication constraints. For example, the device component and/or the apparatus can have a particular optical response as a function of at least one of: a number of layers of geometric structures of the device component, dimensions of the device component, thickness of each layer of the device component, materials forming the geometric structures, presence of a layer of solid material, and/or total thickness of the device component.

In various embodiments, the geometric structures are used to form a multi-layer device component. As further illustrated herein, the multi-layer device component is a stack of multiple layers of the geometric structures. Each layer of geometric structures, for example, has a unique layout of one or more geometric structures. However, embodiments are not so limited, and can include device components having one layer of geometric structures and/or having a single geometric structure.

Figure 1B:
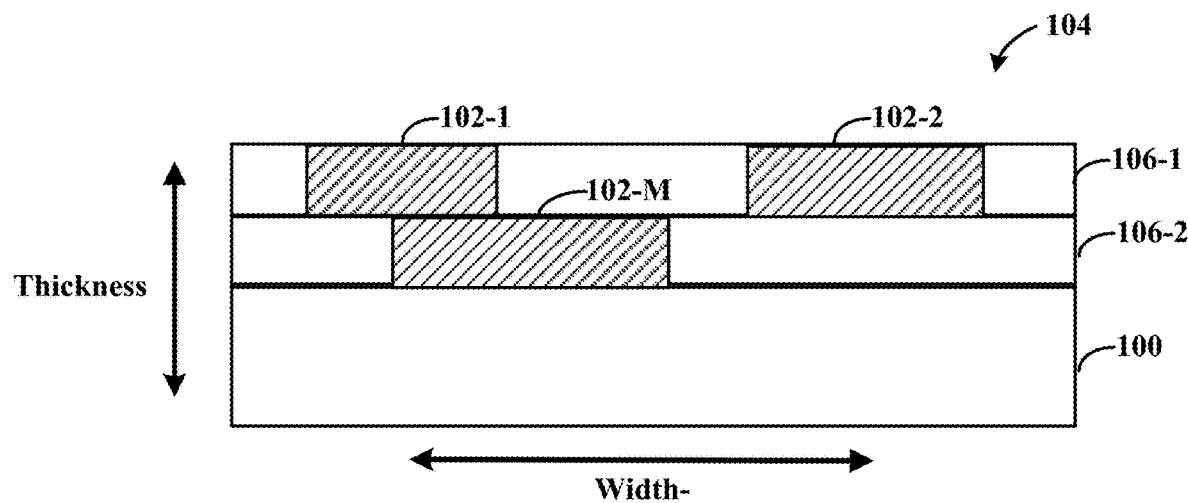
FIG. 1B illustrates an example of a device component, in accordance with various embodiments.

FIG. 1B illustrates an example of a device component 104 in accordance with various embodiments. As illustrated, multiple layers 106-1, 106-2 of geometric structures 102-1, 102-2, 102-3 (herein generally referred to as "the geometric structures 102") provide a unique layout of geometric structures. In some specific embodiments, each layer 106-1, 106-2 is a unique layout of geometric structures in silicon dioxide. In other embodiments, one or more of the layers are formed of a solid material, such a SiO2 spacer layer that is formed entirely of SiO2. For example, a layer formed of SiO2 may be between the two layers 106-1, 106-2. As illustrated, the multiple layers 106-1, 106-2 of geometric structures 102 are layered on a base layer 100, as discussed further herein. One or more of the layers 106-1, 106-2 is formed using two or more materials. Example materials used to form the layers includes metal, insulating, and/or semiconducting materials.

In accordance with various embodiments, the geometry of the device component 104 is optimized to have particular optical properties for a particular optical response. For example, the layout of geometric structures 102 of each layer is designed to provide optical properties for the optical response. In various embodiments, the device component 104 is configured to control the amplitude and phase of light in a particular wavelength range and/or over a broad band. In some specific embodiments, the control includes a deflection angle, such as for a diffraction grating device. Other example optical properties include reflection, scattering, transmitting, etc.

In some specific embodiments, the device components are microstructures. A microstructure refers to or includes a structure with one or more dimensions that are a magnitude order of a micron. For example, in a particular embodiment, a device component includes a one micron width (e.g., x-direction) and one micron length (e.g., z-direction), although embodiments are not so limited and the device components can be a variety of dimensions in an order of a micron magnitude. For example, the device components are microstructures formed of a plurality of layers of nanostructures. Although the embodiment of FIG. 1B illustrates two layers of geometric structures, embodiments in accordance with the present disclosure are not so limited and can include more or less than two layers.

In various embodiments, a plurality of device components are combined to form a device. The device formed is a surface (e.g., metasurface) with varying geometries in a height/thickness dimension (e.g., y-direction). For example, the plurality of device components are combined by stitching portions of a plurality of device components together in two directions (e.g., the x-direction and z-direction relative to the y-direction/direction of the layers of the device components).

In some specific embodiments, the device components can be combined to form a transmission grating. A transmission grating can steer light to a specific diffraction order based on the shapes of the geometric structures of the device components. For particular deflection angles, gratings based on such concepts can steer light into a single diffraction mode with particular efficiencies. Devices in this operation regime have large grating periods, and for metagratings, multiple waveguide elements can be stitched within a single period to sufficiently sample a linear phase profile response. As the deflection angle increases, the gratings become increasingly inefficient.

In accordance with various embodiments, a metagrating can be designed using an adjoint-based topology optimization process. An adjoint-based topology optimization process can result in devices with a variety of non-intuitive layouts (as further illustrated by FIG. 16B among other embodiments). As further described herein, the methodology can be used for designing transmissive gratings that deflect a normally incident plane wave with a specific polarization and wavelength is summarized as follows. The initial device consists of a random dielectric continuum of dielectric constants, with values ranging between the dielectric constants of the material forming the geometric structures, such as air and silicon. To improve the Figure of Merit (FoM), which corresponds to grating efficiency, an iterative process is performed that uses two electromagnetic simulations per iteration, a forward and an adjoint simulation. These simulations produce two sets of electromagnetic field profiles within the device, which serve to simulate and/or specify (specific) changes in the dielectric constant at each location in a manner that improves the FoM. Over the course of multiple iterations, the dielectric continuum in the device converges to the dielectric constant of either silicon or air. The boundaries between of the device components can be adjusted by accounting for fabrication constraints during the converging the continuous profile to the discrete profile. Surprisingly, the optimization method can extend to multiple input polarizations and wavelengths, by performing forward and adjoint simulations for each optical degree of freedom per iteration.

Figure 1C:
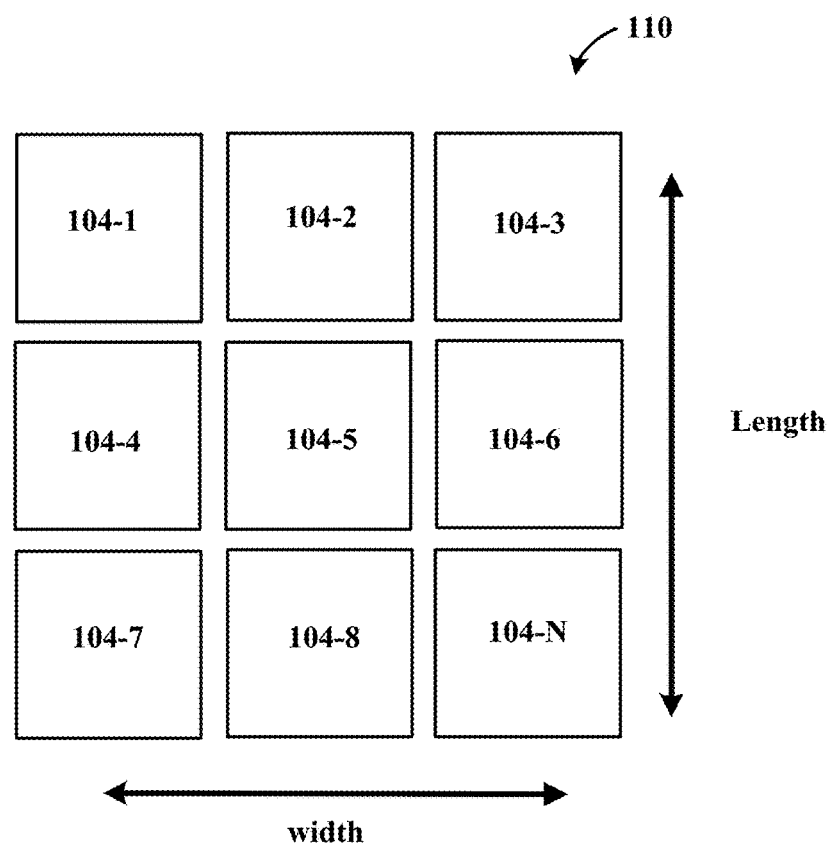
FIG. 1C illustrates an example apparatus, in accordance with various embodiments of the present disclosure.

FIG. 1C illustrates an example device 110 in accordance with various embodiments of the present disclosure. The illustration includes a top down view (e.g., a birds-eye view) of the device. The device 110 includes a plurality of device components 104-1, 104-2, 104-3, 104-4, 104-5, 104-6, 104-7, 104-8, 104-N (herein generally referred to as "the device components 104"). As illustrated, a subset of the device components 104 are combined and/or stitched in two directions (e.g., the x-direction/width and the z-direction/length) to form the device 110. In various embodiments, the device is a metasurface, as described above and further described herein. The space between the device components 104 can be set to mitigate or minimize coupling between adjacent device components 104 and/or to result in an approximate linear phase profile response.

Although the embodiments of FIG. 1C illustrates a device comprising of three rows and three columns of device components 104, embodiments in accordance with the present disclosure are not so limited and can include a variety of number of device components combined to form the device and a variety of shapes. Further, the device components are not limited to a square-like shape and can include other shapes, such as rectangular, circular, octagon, etc.

As previously described, the device supports a plurality of optical modes which can include inter-mode and intra-mode coupling that is mediated by the bouncing of light between different vertical interfaces of the layers of the device components. The different optical modes generated by the light bouncing within the device can be generated by intra-mode couplings and inter-mode couplings, as previously described. Because of the bouncing of light within the device components, the devices support a plurality of spatially overlapping optical modes per unit area. In specific embodiments, apparatuses formed can support at least three round trips of bouncing with device components and which recovers the steady state performance of the device.

Figure 2A:
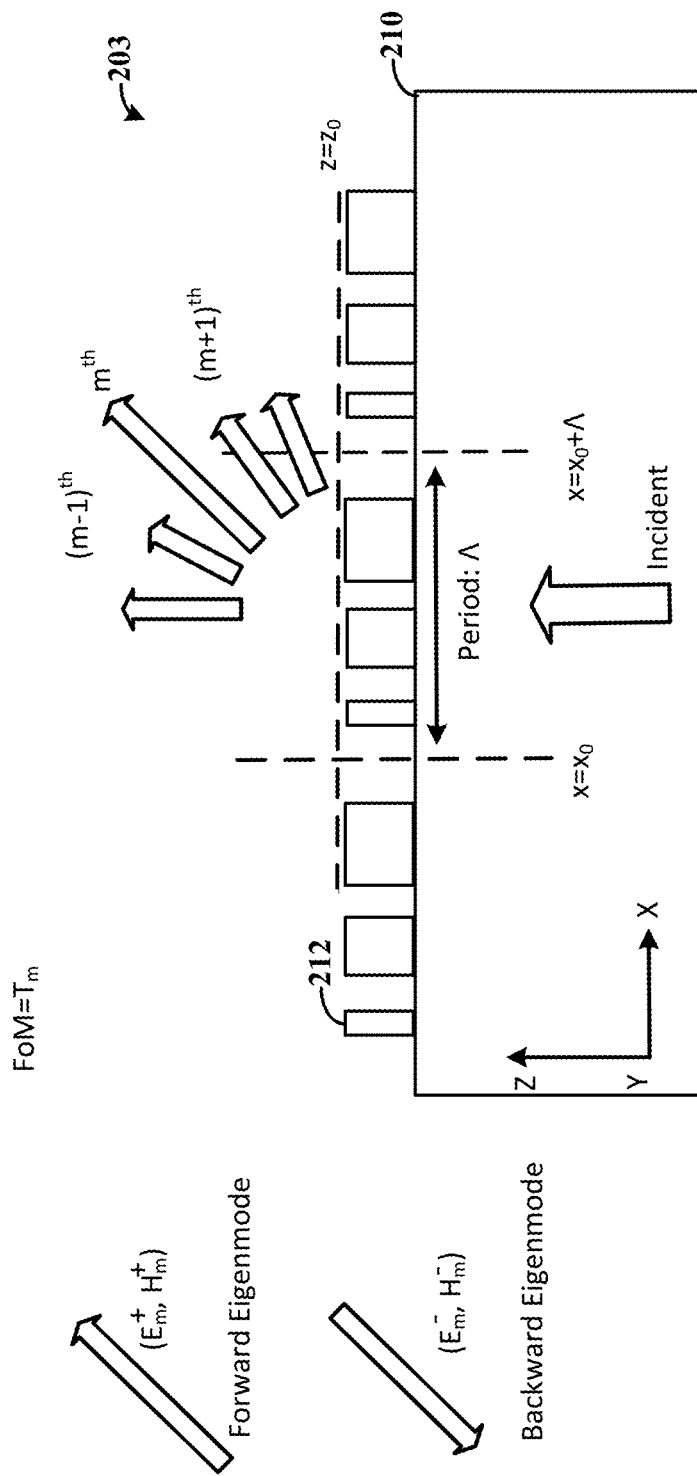
FIGS. 2A-2C illustrates an example of an optimization process, in accordance with various embodiments of the present disclosure.
Figure 2B:
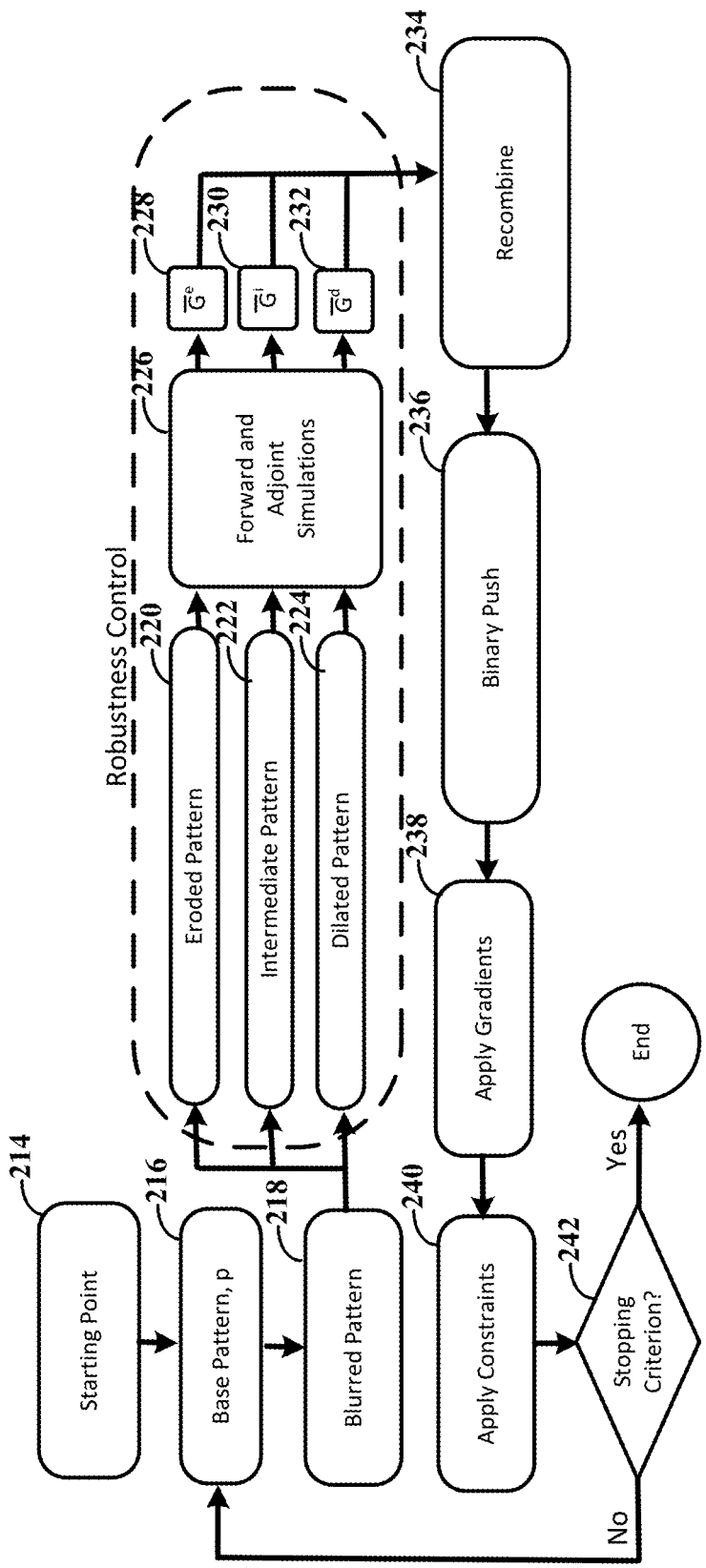
Figure 2C:
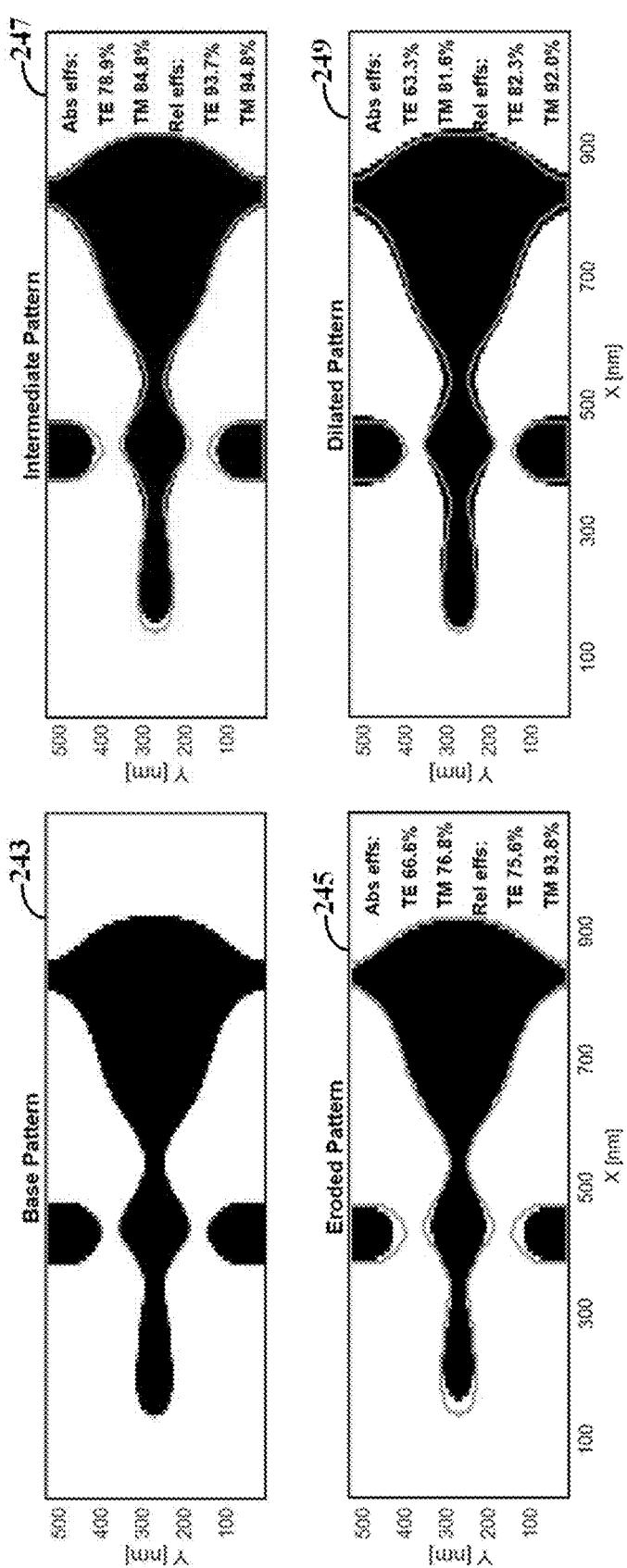

FIGS. 2A-2C illustrate an example of an optimization process, in accordance with various embodiments of the present disclosure. As previously described, the optimization process can be referred to as an adjoint-based topology optimization. The adjoint-based topology optimization process can optimize a device (e.g., metasurface) using two optimization processes: a topology optimization and a boundary optimization. For example, the topology optimization includes solving Maxwell's equations and producing an output electromagnetic wave state for a given input design and input electromagnetic wave condition. The boundary optimization, in some instances, leverages a simulation engine to produce a fabricatible design (by imposing the fabrication tolerance into the optimization) yielding an ideal output electromagnetic wave state.

More specifically, the adjoint-based topology optimization process can use two electromagnetic simulations per iteration to solve for gradients in dielectric constants at each spatial location in the device. The optimization can be used for specific angles and multi-functional deflection, and can be used to solve for maximum transmission efficiency of incident plane waves into targeted diffraction order channels.

FIG. 2A illustrates an example of simulated device, e.g., a grating 203. The grating 203 includes several geometric structures (e.g., as illustrated by particular geometric structure 212) formed of a dielectric material (e.g., dielectric nanobeams). Light is incident on the grating from the substrate 210 and couples into several diffraction orders. For example, forward and backward eigenmodes can be used for simulation. The forward eigenmode represents the target transmitted diffraction order in the forward simulations. The backward eigenmode can be used for adjoint simulations. The forward and backward eigenmodes are the same mode, but propagate in opposite directions. As illustrated by FIG. 2A, for a metagrating design for an incident plane wave with a specific polarization and wavelength, the FoM can be defined as the transmission intensity $T_m$ to the target diffraction order $m^{th}$:

$$FoM = T_m,\qquad \text{EQ. 1}$$

$T_m$ can be obtained by projecting the total transmitted field to the $m^{th}$ diffraction order. For illustrative purposes and as illustrated by FIG. 2A, a plane wave can be considered that is normally incident on a one-dimensional lamellar grating through a substrate. The incident power $P_{inc}$ in a single period of the grating is assumed to be 1. The transmission efficiency $T_m$ can be normalized relative to the intensity of the incident beam, which can be found by performing an overlap integral between two fields: the total field $(E(x, z_0), H(x, z_0))$ that is excited by the incident field, and the target $m^{th}$ diffraction order field $(E_m^-(x, z_0), H_m^-(x, z_0))$. In this expression for diffracted fields, the subscript "m" denotes the order of the diffraction channel and the subscript "−" denotes that the field is propagation in downward in the −z direction. Both fields can be evaluated at the $z=z_0$ plane above the grating, and overlap integral is performed for a grating period $\Lambda$:

$$T = |t|^2 = \frac{\left| \int_{x=x_0}^{x=x_0+\Lambda} [E(x, z_0) \times H_m^-(x, z_0) - E_m^-(x, z_0) \times H(x, z_0)] \cdot n_2 dx \right|^2}{|N_m|^2} \qquad \text{EQ. 2}$$

Where $$N_m = \int_{x=x_0}^{x=x_0+\Lambda} [E_m^+(x, z_0) \times H_m^-(x, z_0) - E_m^-(x, z_0) \times H_m^+(x, z_0)] \cdot n_2 dx$$

defines the normalization of the $rm^{th}$ diffraction order, and $(E_m^+(x, z_0), H_m^+(x, z_0))$ and $(E_m^-(x, z_0), H_m^-(x, z_0))$ denotes the fields propagating in the forward (+z) and backward (−z)

directions. This normalization procedure is consistent with the Lorentz reciprocity relation, and can be valid for both lossy (e.g., plasmonic) and lossless (e.g., fiber modes or planewaves) eigenmodes. Assuming $|N_m|=1$ the FoM can be written as:

$$FoM = \left| \int_{x=x_0}^{x=x_0+\Lambda} [E(x, z_0) \times H_m^-(x, z_0) - E_m^-(x, z_0) \times H(x, z_0)] \cdot n_2 dx \right|^2 \quad \text{EQ. 3}$$

If a perturbation is introduced in permittivity $\Delta\varepsilon$ within a volume $\Delta V$ at a location $r_1=(x_1, z_1)$ in the grating layer, the total field at the $z=z_0$ plane can be defined at $[E(x, z_0)+\Delta E(x, z_0), H(x, z_0)+\Delta H(x, z_0)]$ and the changed FoM' can be defined as:

$$FoM' = \left| \int_{x=x_0}^{x=x_0+\Lambda} \left[ \begin{array}{c} (E(x, z_0) + \Delta E(x, z_0)) \times H_m^-(x, z_0) - \\ E_m^-(x, z_0) \times (H(x, z_0) + \Delta H(x, z_0)) \end{array} \right] \cdot n_2 dx \right|^2 \quad \text{EQ. 4}$$

The expression can be simplified by omitting the $0(\Delta^2)$ terms, which can be a valid approximation if the change in the field from the dielectric perturbation $\Delta\varepsilon$ is less than a threshold amount. The change of the FoM resulting from the inclusion of $\Delta\varepsilon$ can be found by combining EQ. 3 and EQ. 4:

$$\Delta FoM = FoM' - FoM = \quad \text{EQ. 5}$$

$$2\text{Re}\left( conj(t) \int_{x=x_0}^{x=x_0+\Lambda} [E(x, z_0) \times H_m^-(x, z_0) - E_m^-(x, z_0) \times H(x, z_0)] \cdot n_2 dx \right)$$

The addition of the perturbation $\Delta\varepsilon$ at location $r_1$ can be treated as the insertion of an electric dipole with dipole moment $p=\varepsilon_0 \Delta\varepsilon \Delta E_{app}$, where $E_{app}$ denotes the approximate value of the electric field inside the perturbation. An estimate of $E_{app}$ can include $E_{app} \approx E(r_1)$. This electric dipole can produce scattered fields described by:

$$\begin{cases} \Delta E(x, z_0) = \omega^2 G_{ep}(r, r_1) p \\ \Delta H(x, z_0) = \omega^2 G_{hp}(r, r_1) p \end{cases} \quad \text{EQ. 6}$$

Where $G_{ep}$ and $G_{hp}$ are the Green's tensors. EQ. 5 can be rewritten as:

$$\Delta FoM = 2\omega^2 \varepsilon_0 \Delta\varepsilon(r_1) \Delta \quad \text{EQ. 7}$$

$$V\text{Re}\left( conj(t) \int_{x=x_0}^{x=x_0+\Lambda} [(G_{ep}(r, r_1)E(r_1)) \times H_m^-(x, z_0) - E_m^-(x, z_0) \times (G_{hp}(r, r_1)E(r_1))] \cdot n_2 dx \right)$$

Applying vector identities into EQ. 7, the gradient of FoM to the local permittivity at $r_1=(x_1, z_1)$ can be defined as:

$$\frac{\partial FoM}{\partial \varepsilon}\bigg|_{r=r_1} = \quad \text{EQ. 8}$$

$$2\varepsilon_0 \omega^2 \Delta V \text{Re}\left( conj(j)E(r_1) \cdot \int_{x=x_0}^{x=x_0+\Lambda} [(G_{ep}(r_1, r)(-n_z \times H_m^-(x, z_0)) + \\ -G_{hp}^T(r_1, r)(n_z \times E_m^-(x, z_0))] dx \right)$$

The term $[G_{ep}(r_1, r)(-n_z \times H_m^-(x, z_0)) + (-1)G_{hp}^T(r_1, r)(n_z \times E_m^-(x, z_0))]$ represents the field induced by an incident field $(E_m^-, H_m^-)$ at the location $r_1$. EQ. 8 can be rewritten as:

$$\frac{\partial FoM}{\partial \varepsilon}\bigg|_{r=r_1} = 2\varepsilon_0 \omega^2 \Delta V \text{Re}(conj(t)E(r_1) \cdot E_{adjoint}(r_1)). \quad \text{EQ. 9}$$

Where $E_{adjoint}(r_1)=[G_{ep}(r_1,r)(-n_z \times H_m^-(x,z_0))+(-1)G_{hp}^T(r_1, r)(n_z \times E_m^-(x,z_0))]$ is defined as the adjoint field and can be obtained by an auxiliary simulation in which the backward-propagating eigenmode $(E_m^-, H_m^-)$ serves as the incident field. EQ. 9 indicates that with two simulations, one forward simulation and one adjoint simulation, $$\frac{\partial FoM}{\partial \varepsilon}$$

can be evaluation at each (e.g., all) locations of the device.

FIG. 2B illustrates an optimization process. As illustrated, the optimization process can be performed in an iterative manner, which in specific experimental embodiments can include 200-300 simulated iterations to achieve convergence. The starting point 214 can be a random dielectric continuum of dielectric constants, and over the course of the iterative process, this continuum can converge to discrete values of silicon and air. A base pattern $\rho$ can be obtained from the starting point, at 216. A blurring function is applied to the base pattern, resulting in a blurred geometry $\tilde{p}=B(\rho)$ that is split into three geometric versions: an eroded pattern 220 ($\rho^{-e}=Q^e(\tilde{p})$) an intermediate pattern 222 (e.g., $\rho^{-i}=i(\tilde{p})$), and the dilated pattern 224 ($\rho^{-d}=Q^d(\tilde{p})$), at 218. Over each iteration, forward and adjoint simulations are performed for the eroded, intermediate, and dilated patterns at 226 which produces values of G 228, 230, 232 (e.g., $\overline{G}^e$, $\overline{G}^i$, $\overline{G}^d$) that correspond to the gradient of the figure of merit, $\partial(FoM)/\partial\varepsilon$. These values can then be used to modify the dielectric constant at all points of the device. For example, the produced values G are combined to generate a total gradient value $G_{tot}$, at 234. The total gradient value can be defined as $$G_{tot} = \sum_q \overline{G}^q \frac{\partial \rho^{-q} \partial \tilde{p}}{\partial \tilde{p} \partial p}.$$

A bias function is added to the total gradient value to push the pattern toward binary structures (e.g., binary push), at 236. The binary push can be defined by $G=G_{tot}+b(2\rho-1)^{2n}$. And, gradient and constraints are applied, at 238 and 240. The gradient constraint can be defined as $\rho_{new}=\rho+cG$. For example, the constraints can be applied periodically (e.g., every tens of iteration) to remove geometric structures that are smaller than a threshold size. The process is repeated until convergence occurs at 242.

During the topology optimization, the dielectric constant at each point in the device can range in a continuous fashion between $\varepsilon_{high}=\sqrt{\varepsilon_{si}}$ and $\varepsilon_{low}=\varepsilon_{air}$. For a given iteration u, the device can be encoded at all spatial locations $r_i$ with a real number $p_u(r_i)\in[0,1]$, such that the dielectric constant at each point is given by $\varepsilon_u(r_i)=p_u(r_i)\varepsilon_{high}+(1-p_u(r_i))\varepsilon_{low}$.

In order to mitigate (e.g., avoid or eliminate) features of less than a threshold size and create devices that are robust to fabrication error, a robustness algorithm can be applied. For more general and specific information related to a robustness algorithm, reference is made to F. Wang, et al, "Robust Topology Optimization of Photonic Crystal Waveguides with Tailored Dispersion Properties," *J. Opt. Soc. Am. B*, 28, 387-397 (2011), which is hereby incorporated by reference for its teaching. At the beginning of iteration u, a blurring function $B_u$ is applied to the device $p_u$, $B_u:R^N \to R^N$, were N is the total number of points in the device:

$$B_u(p_u(r_i)) = \frac{\sum_{j\in N_e}[(R_u - \|r_j - r_i\|)p_u(r_j)]}{\sum_{j\in N_e}[(R_u - \|r_j - r_i\|)p_u(r_j)]} = \tilde{p}_u(r_i), \quad \text{EQ. 10}$$

$$N_e = \{j \mid \|r_j - r_i\| \le R_u\}$$

$R_u$ is the blurring radius and can be iteration-dependent. This blurred geometry is then split into three separate geometric versions $p_u^{-q}(r_i)$, where $q\in\{E,I,D\}$ corresponds to the eroded, intermediate, and dilated devices.

FIG. 2C illustrates examples of a base pattern 243, an eroded pattern 245, an intermediate pattern 247, and a dilated pattern 249, in accordance with varies embodiments. The patterns can be designed, in specific experimental embodiments, for a 75 degree metagrating (e.g., as illustrated by the experimental embodiments further described herein). The green curve represents the boundary of the base pattern 243. The intermediate pattern 247 represents the ideal pattern for fabrication, and the eroded and dilated patterns 245, 249 represent devices that are over-etched and under-etched, respectively, during fabrication. These geometric variants of the device can be mathematically described as:

$$p_u^{-q}(r_i) = \begin{cases} n_u^q\left\{\exp[-B_u(1-\tilde{p}_u(r_i)/n_u^q] - \left(1 - \frac{\tilde{p}_u(r_i)}{n_u^q}\right)\exp(-B_u)\right\}, & 0 \le \tilde{p}_u(r_i) \le n_u^q \\ (1-n_u^q)\left\{1 - \exp\left[\frac{-B_u(\tilde{p}_u(r_i)-n_u^q)}{(1-n_u^q)}\right]\right\} + \frac{(\tilde{p}_u(r_i)-n_u^q)}{(1-n_u^q)e^{-B_u}} + n_u^q, & n_u^q \le \tilde{p}_u(r_i) \le 1 \end{cases} \quad \text{EQ. 11}$$

Where $B_u$ the iteration-dependent sharpness of the threshold function, and $n_u^q$ is the cutoff value of $\tilde{p}_u$ at which the threshold is applied, such that $n_u^E > 0.5$, $n_u^I = 0.5$, and $n_u^D < 0.5$.

Once the forward and adjoint calculations are performed for all three geometric variants of the device, $\bar{G}^q(r_i)=\partial FoM^q/\partial\varepsilon$ can be calculated for each geometry. A singular $\partial(FoM)/\partial\varepsilon$ can be applied to the base pattern and that combines the three $\bar{G}^q$ can be expressed as:

$$G_{tot}(r_i) = \sum_q \sum_{e \in N_1} \bar{G}^q(r_e) \frac{\partial \tilde{p}_u^q(r_e) \partial \tilde{p}_u(r_e)}{\partial \tilde{p}_u(r_e) \partial p(r_i)} \quad \text{EQ. 12}$$

Once this gradient is calculated, a bias function $Y_u(p_u(r_i))$ is added, which can be used to push the pattern towards a binary structure (e.g., $p_u(r_i)=[0, 1]$). This bias function increases in strength as the full iterative optimization process nears completion. In the case of a multi-functional device with M functions, each with $G_m(r_i)=\partial FoM_m/\partial\varepsilon$, different ways to combine $G_m$ into a single G can be used. Two such methods include:

$$G(r_i)=\Sigma m G_m(r_i), \text{ and}$$

$$G(r_i)=\Sigma m G_m(r_i)(T_m^{tgt}-T_m) \quad \text{EQ. 13}$$

The topology method optimizes for the total combined power going into all targeted diffraction channels. The bottom method minimizes the mean squared error for a set of targeted power transmission coefficients associated with each diffraction channel, $T_m^{tgt}$.

In order to remove (tiny) nanoscale features in the device design, a circular spatial blurring filter to the material distribution ($r_i$) periodically, such as every few tens of simulation iterations. In a specific experimental embodiment, a diameter of this circular blurring filter is approximately 80 nm, and filtering is performed every 40 iterations. This filtering results in reductions in efficiency, which can be visualized as sharp dips, such as further described and illustrated herein in connection with FIG. 17D of the experimental embodiments.

Figure 3C:
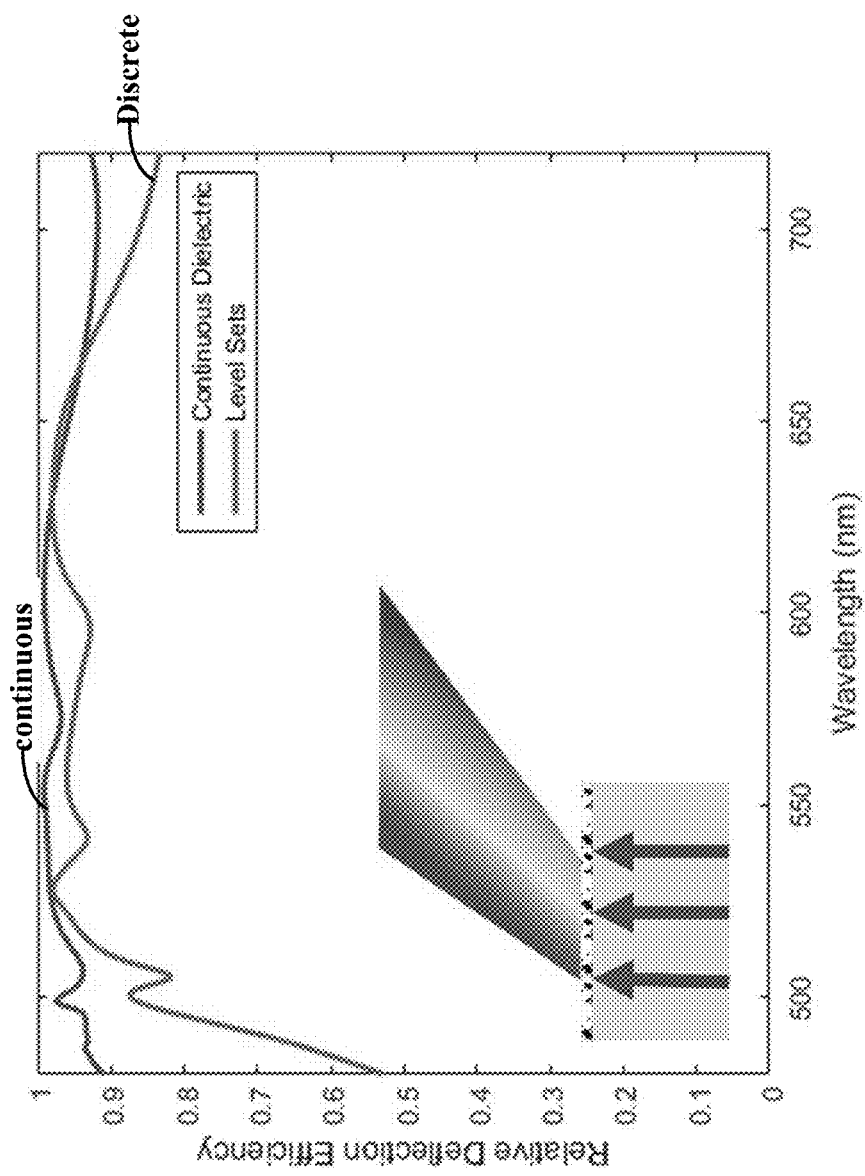

FIGS. 3A-3C illustrate an example of a continuous profile and a discrete profile of a topology of a device component in accordance with various embodiments. In various embodiments, a device component is configured to deflect a particular wavelength range, such as blue wavelengths (400-500 nm) at an optimized efficiency. The device component can include a single layer of geometric structures or multiple layers of geometric structures.

In some experimental/representative embodiments, the device component includes a 200 nm-thick (e.g., layered direction) fully visible transmission grating consisting of ten 20 nm-thick layers of geometric structures. Each of the ten layers includes a unique layout of silicon in silicon dioxide. In other experimental/representative embodiments, a subset of the layers include unique layouts of geometric structures and the remaining one or more layers include solid material (e.g., spacers) as previously discussed. A layer of solid material, in some instances, is used as a spacer between two layers of geometric structures. Optimized, in various embodiments, is not limited to absolute optimal value but rather is an efficiency for the particular optical property and/or response that is above a predefined threshold. In some specific embodiments, the predefined threshold include 60 percent, although other embodiments are not so limited and can include thresholds between 60-80 percent or more. The embodiment type of FIGS. 3A-3C is a blazed grating, whereas embodiments in accordance with the present disclosure include other types of diffraction gratings and optical devices.

One way that device components can be designed is by setting (e.g., optimizing) a topology of the layer(s) of geometric structures. For example, a continuous profile is first set (e.g., optimize) to have particular optical property for particular optical response. Then, the continuous profile is converted to a discrete profile (e.g., binary). FIG. 3A, for example, illustrates a cross-section of a continuous profile configured to deflect blue wavelengths at an optimized efficiency. The continuous profile includes a range of material from silicon to air, with silicon being light, oxide being dark, and values between including a mixture of the silicon and air. FIG. 3B illustrates a cross section of a discrete profile as generated by converting the continuous profile illustrated by FIG. 3A to a discrete result. For example, the resulting discrete profile includes silicon (light) and oxide (dark).

In various embodiments, multiple layers of geometric structures can be used. FIG. 3C illustrates the efficiencies of the device components of FIG. 3A and FIG. 3B having multiple layers of geometric structures and with metrics that exceed those of diffractive optics and single layers of geometric structures. In various embodiments, the discrete profile includes structures that are binary and that are generated without cross-sections.

In accordance with various embodiments, the device components are optimized using topology optimization, boundary optimization, or both. Topology optimization sets the number and shape of elementary geometries (e.g., geometric structures) within a device layout, and boundary optimization adjusts and/or refines the boundaries of the geometries generated in the topology optimization process. For example, the edges between boundaries of the device components can be periodically adjusted by accounting for fabrication constraints during the converging the continuous profile to the discrete profile. In some embodiments, the topology optimization process effectively generates geometries that are near the theoretical global optimum with high probability. These geometries are then used as starting points in the boundary optimization routine, which further refines the geometry as well as imposes constraints on minimum feature size for fabrication purposes.

Figure 4A:
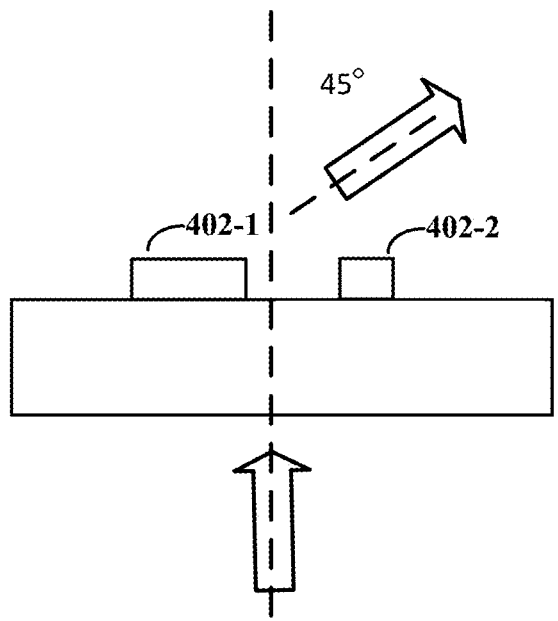
FIGS. 4A-4D illustrate example boundary optimization of device components containing two geometric structures and three geometric structures, in accordance with various embodiments.
Figure 4B:
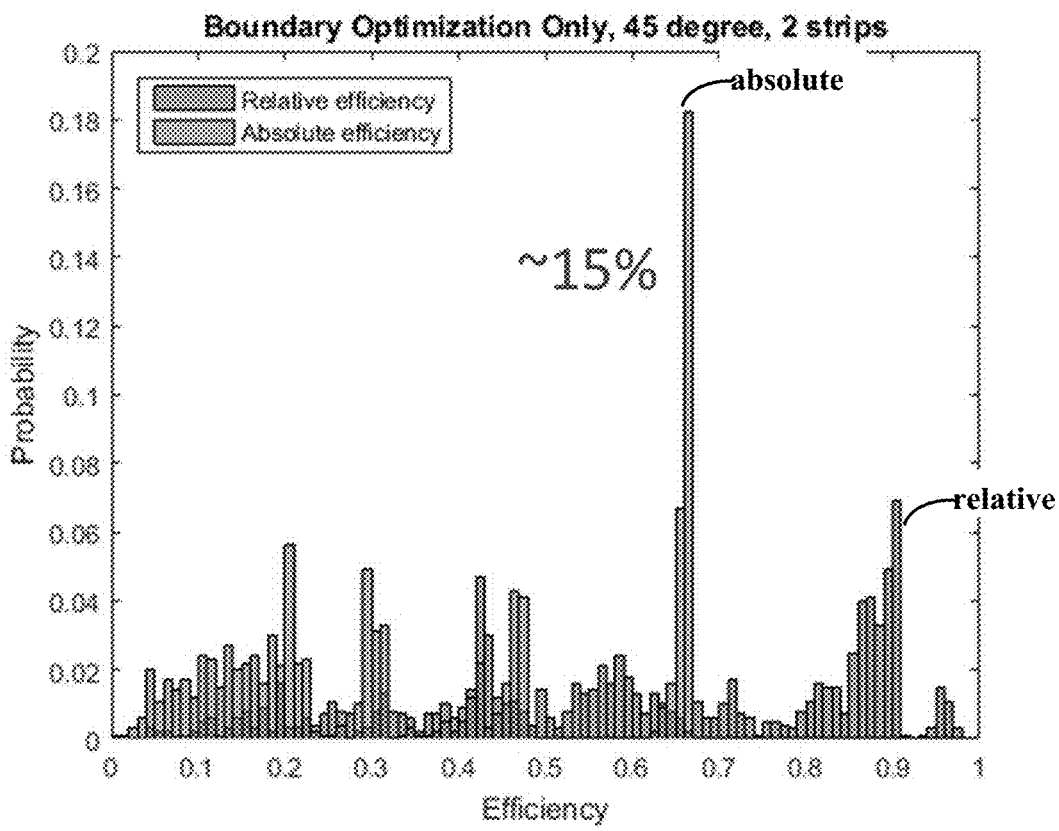
Figure 4C:
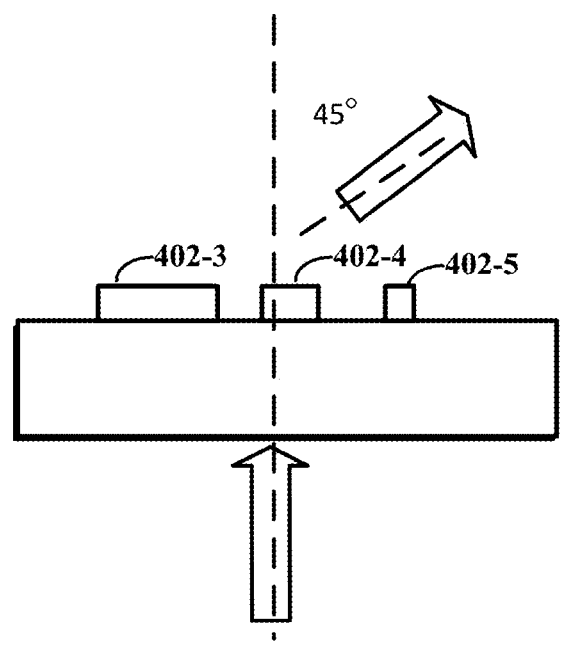
Figure 4D:
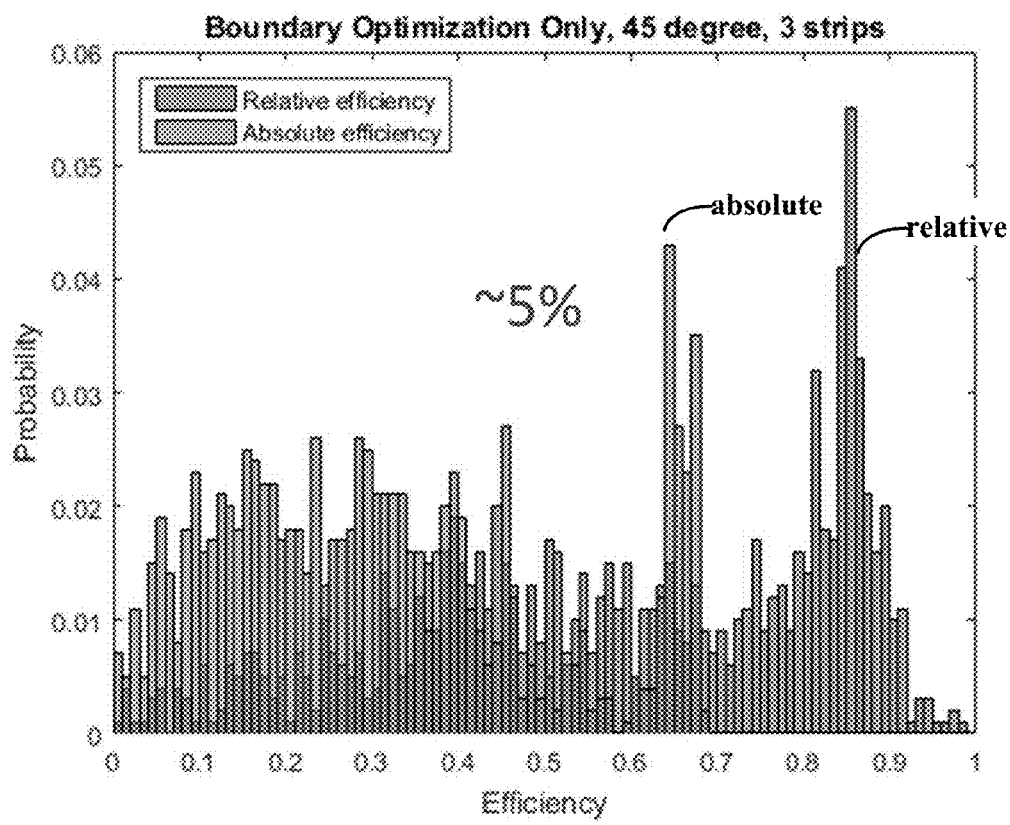

FIGS. 4A-4D illustrate an example of boundary optimization of device components containing two geometric structures and three geometric structures (in a layer or more). The device component, as illustrated, is a flat blazed grating that is configured to deflect light at a 45 degree angle. As previously discussed, the term optimized as used herein is not limited to the best possible outcome but rather to an optimal value at or above an acceptable threshold. For example, with optics, there can be many local maximums when optimizing for a particular optical property and response. In various embodiments, a starting topology for the device components is set and then adjusted for boundaries. As illustrated by FIG. 4A, a first device component includes two geometric structures 402-1, 402-2 and as illustrated by FIG. 4C a second device component includes three geometric structures 402-3, 402-4, 402-5. FIG. 4B and FIG. 4D illustrate boundary optimization results from the first and second device components, and specifically illustrate the probability of obtaining device component with a particular efficiency after 1,000 realizations using boundary optimization from a starting point. For example, as illustrated by FIG. 4B, the boundary optimization of the first device component results in an efficiency of seventy-percent about fifteen-percent of the time. FIG. 4D illustrates that boundary optimization of the second device component results in an optical property (efficiency) of seventy-percent about five-percent of the time.

Figure 5:
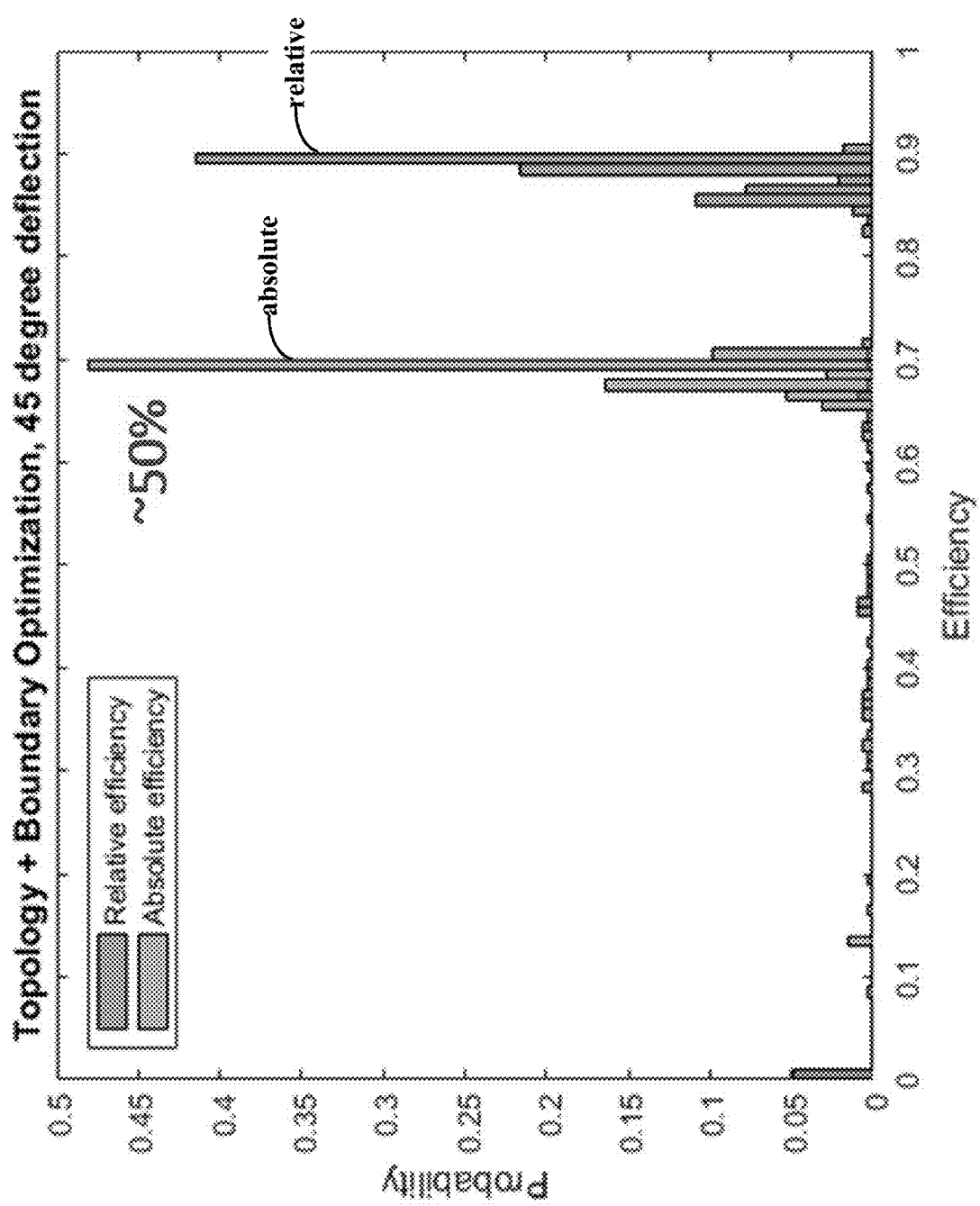
FIG. 5 illustrates an example of topology and boundary optimization of a device component with two geometric structures, in accordance with various embodiments.

FIG. 5 illustrates an example of topology and boundary optimization of a device component with two geometric structures. The device component, in various embodiments, includes the first device component as illustrated by FIG. 4A and that is configured to deflect light at a 45 degree angle. As illustrated, using both the topology and boundary optimization results in an optical property of seventy-percent about fifty-percent of the time. That is, there is around a fifty percent probability of obtaining a device component with an optical property of seventy percent after 1,000 realizations when performing both topology and boundary optimization.

Figure 6A:
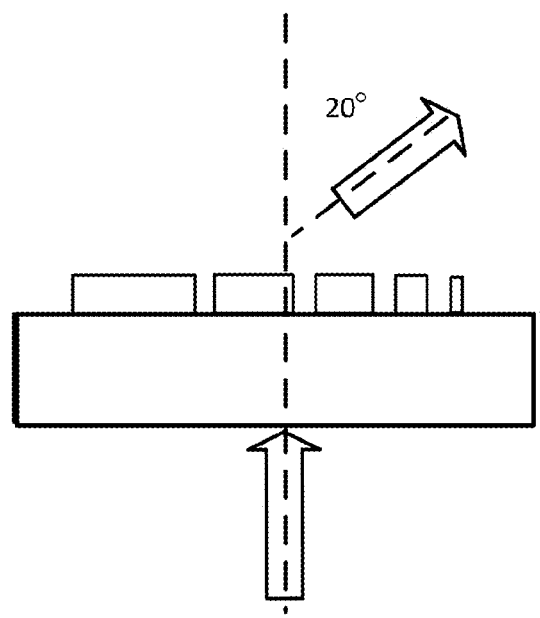
FIGS. 6A-6B illustrate an example boundary optimization of a device component that is optimized to deflect light at a 20 degree angle, in accordance with various embodiments.
Figure 6B:
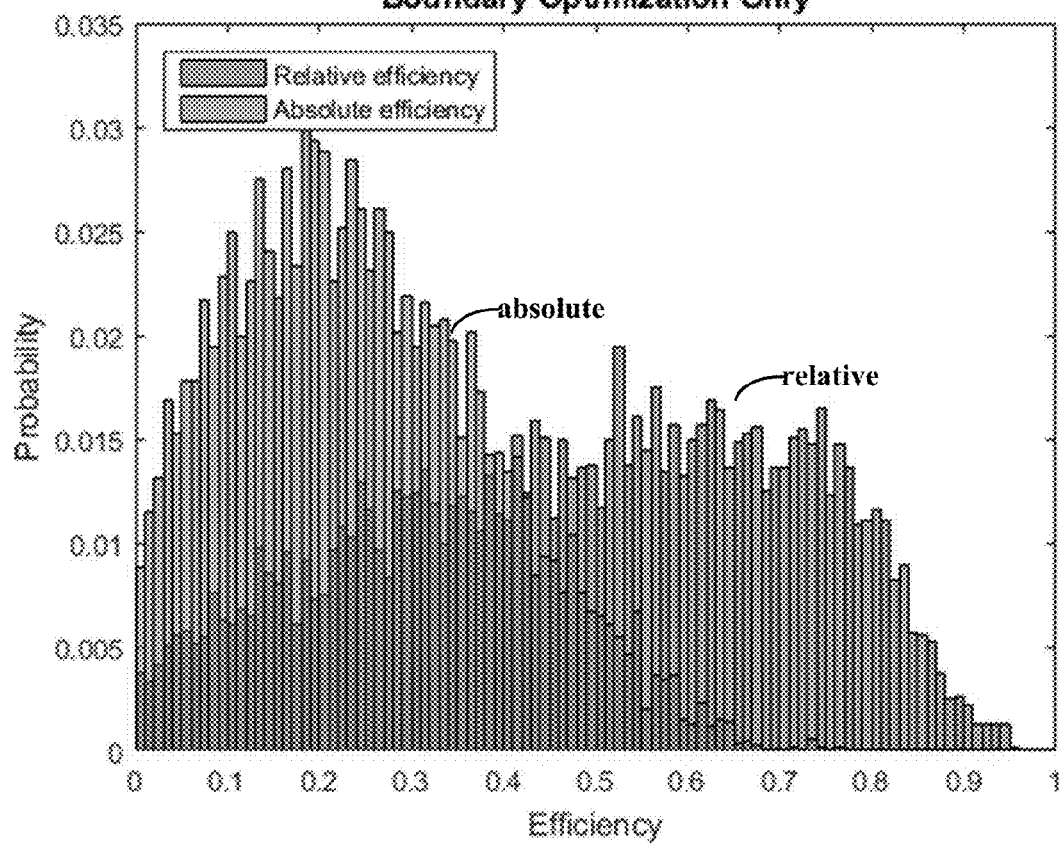

FIGS. 6A-6B illustrate an example boundary optimization of a device component that is optimized to deflect light at a 20 degree angle. For example, FIG. 6A illustrates a device component with five geometric structures configured to deflect light at 20 degree angle. As illustrated, compared to the 45 degree angle, the device component includes a greater number of geometric structures. FIG. 6B illustrates the probability of optimizing a device to a particular efficiency after ten thousand realizations using boundary optimization. As illustrated, there is a 0.01 probability of obtaining a device with a seventy percent efficiency after ten-thousand realizations.

Figure 7B:
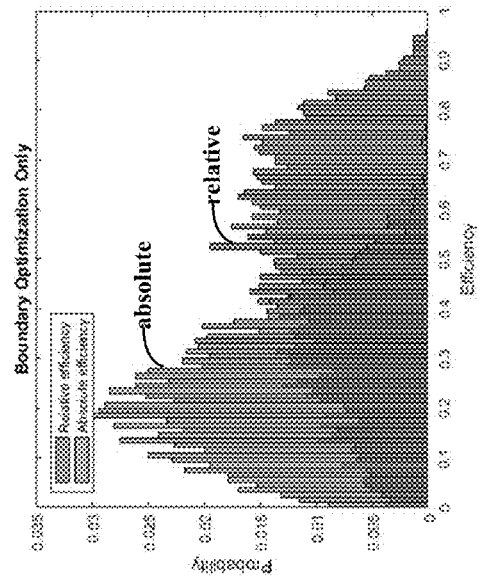
FIGS. 7A-7D illustrate an example optimization of a device component that is optimized to deflect light at a 20 degree angle, in accordance with various embodiments.
Figure 7A:
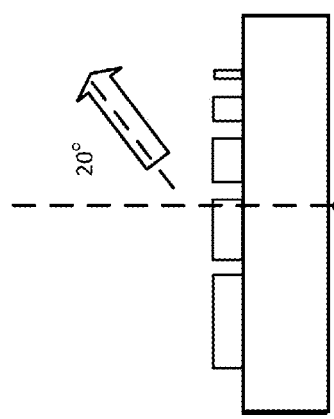
Figure 7D:
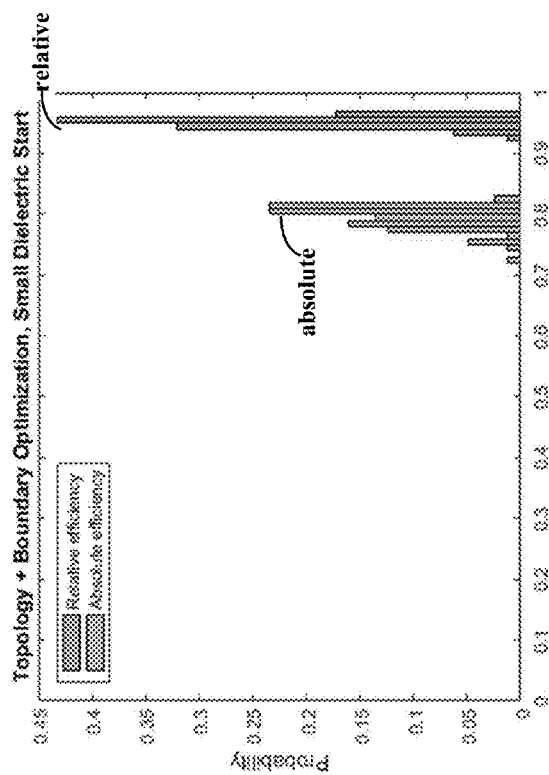
Figure 7C:
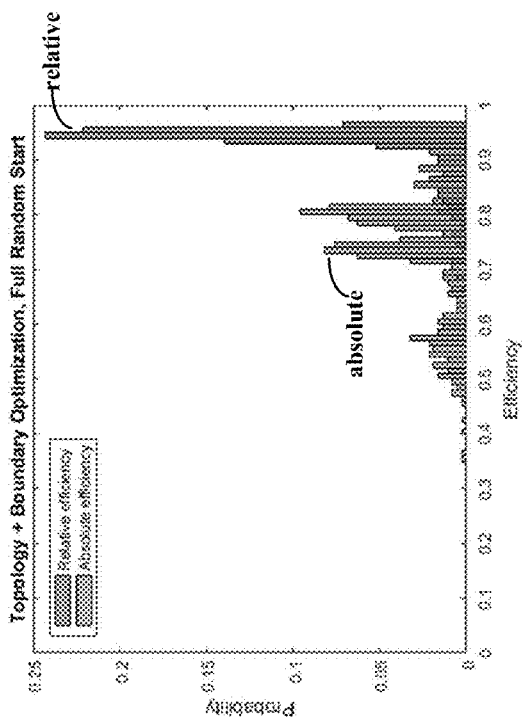

FIGS. 7A-7D illustrate an example optimization of a device component that is configured to deflect light at a 20 degree angle. For example, FIG. 7A illustrates a device component with five geometric structures optimized to deflect light at 20 degree angle. FIG. 7B illustrates the probability of optimizing a device component to a particular efficiency after ten thousand realizations using only boundary optimization. As illustrated, there is a 0.01 probability of obtaining a device with a seventy-percent efficiency. FIG. 7C illustrates the probability of optimizing a device component to a particular efficiency using topology optimization and boundary optimization from a starting point. FIG. 7D illustrates the probability of optimizing a device component to a particular efficiency using topology optimization and boundary optimization from a constant profile (with low average dielectric).

Figure 8A:
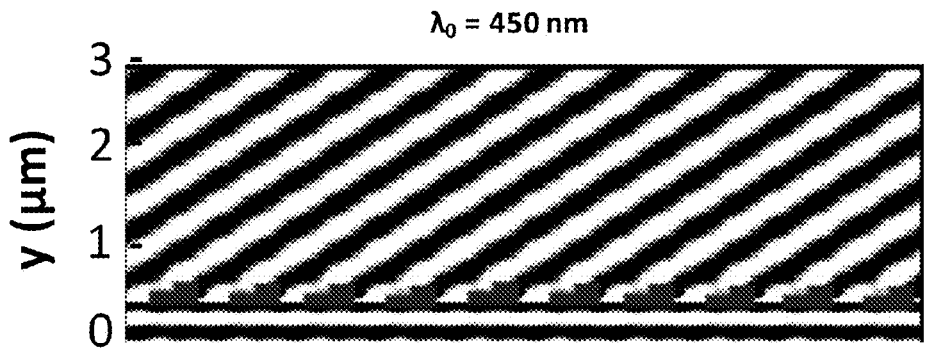
Figure 8B:
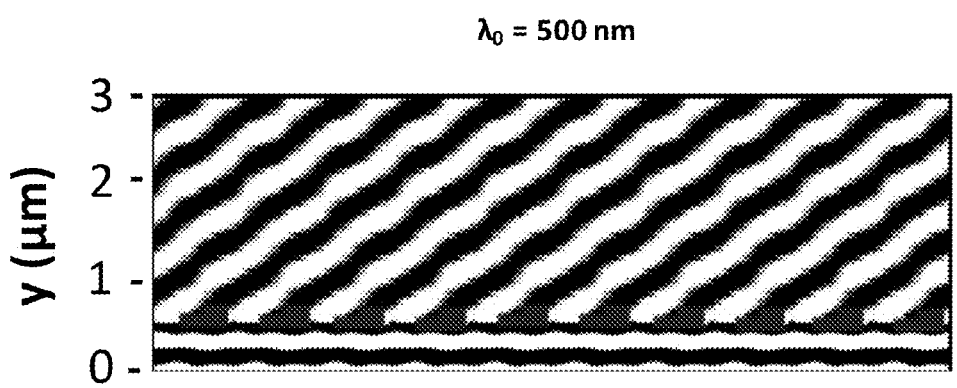
Figure 8C:
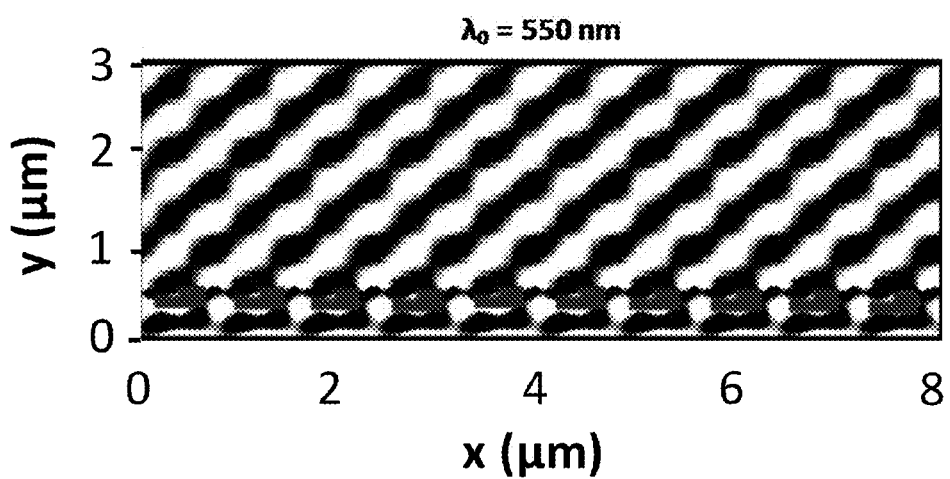

FIGS. 8A-8D illustrate example device components with geometric structures, such as the geometric structure illustrated by FIG. 1A, optimized for broadband spectrum transmission efficiency. For example, FIGS. 8A-8C illustrate a cross-section of a grating with geometric structures that are locally optimized for transmitting different wavelengths of light (e.g. 450 nm, 500 nm, and 550 nm). FIG. 8D illustrates the relative efficiency and absolute efficiency across a broadband spectrum. As illustrated, the particular geometric structure, which includes an "L-shape" has a near one-hundred percent relative efficiency at around 450 nm.

Figure 9B:
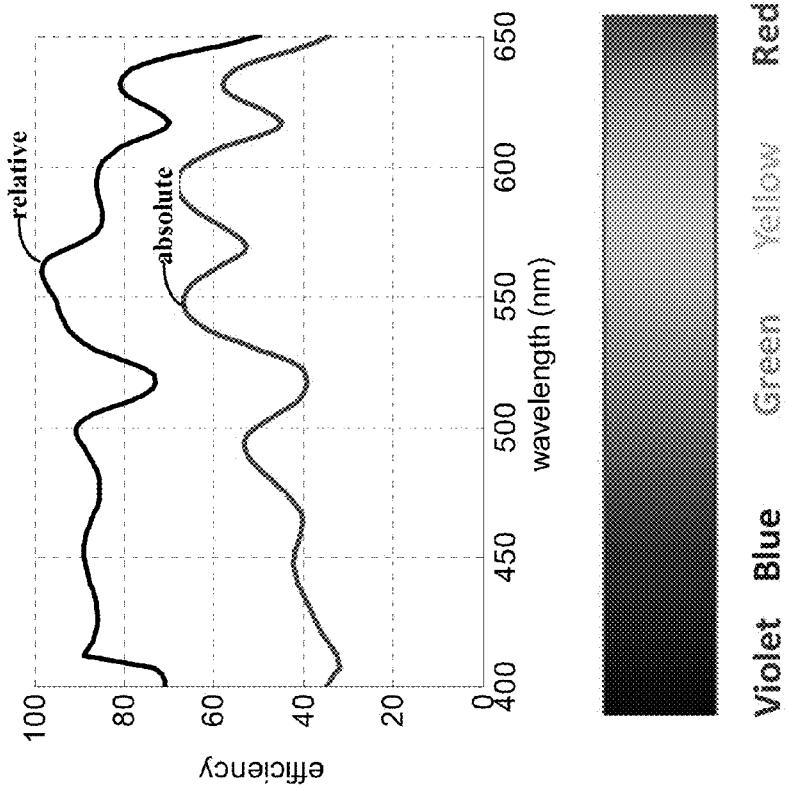
FIGS. 9A-9B illustrate an example device component, optimized for broadband spectrum reflection efficiency, in accordance with various embodiments.
Figure 9A:
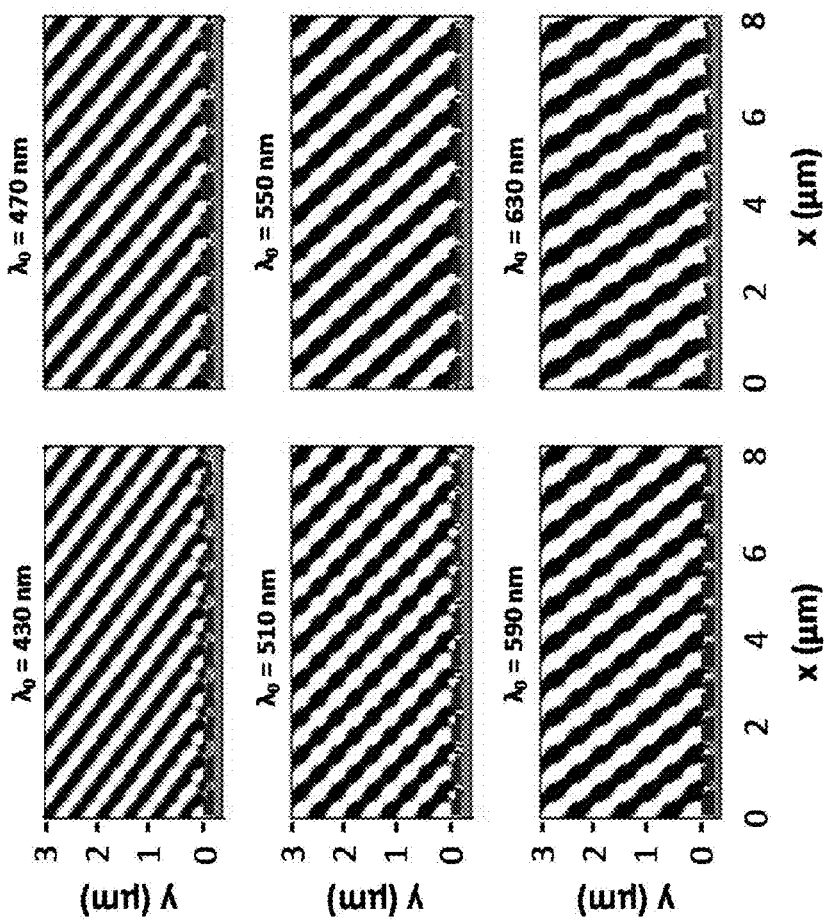
Figure 9C:
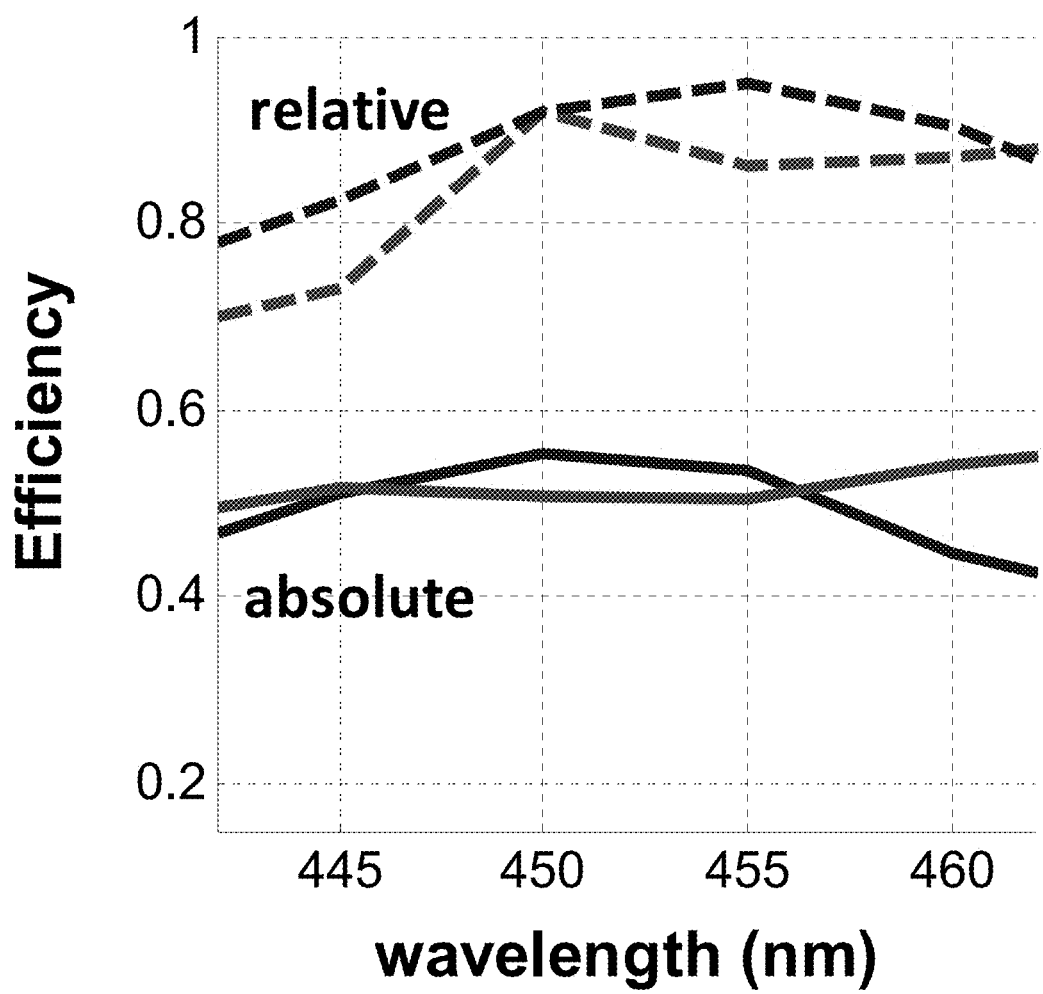
FIG. 9C illustrate the relative transmission efficiency and absolute transmission efficiency of light of two polarization states (e.g., traverse electric polarization and transverse magnetic polarization) for the polarization-insensitive device components illustrated by FIG. 1A, in accordance with various embodiments.

FIGS. 9A-9B illustrate example device components optimized for broadband spectrum reflection efficiency. FIG. 9A illustrates a cross-section of a grating with geometric structures that are locally optimized for reflecting different wavelengths of light (e.g. 430 nm, 470 nm, 510 nm, 550 nm, 590 nm, and 630 nm). The geometric structures, in various embodiments, include the geometric structure illustrated by FIG. 1A. FIG. 9B illustrates the relative efficiency and absolute efficiency across a broadband spectrum. As illustrated, the particular geometric structure, which includes an "L-shape" has a near one-hundred percent relative efficiency at around 560 nm. FIG. 9C illustrates the relative transmission efficiency and absolute transmission efficiency of light of two polarization states (transverse electric (TE) and transverse magnetic (TM)) for the polarization-insensitive device components illustrated by FIG. 1A.

FIG. 10A-10E illustrate an example process of fabricating an apparatus, in accordance with various embodiments. As previously discussed, apparatuses in accordance with the present disclosure include at least one planar layer of geometric structures. In specific embodiments, multiple planar layers of geometric structures can be stacked one on top of the other, to yield a three-dimensional optical apparatus. Each layer includes two or more distinct materials that are patterned, such that the materials cumulatively fill the full layer area. Further, the device include device components that have a constant cross-section extending along one axis (e.g., for example, an ordered stack of logs), and multi-layer device components that are three-dimensional and lack a translational symmetry constant.

A variety of material is used for a substrate for the device components, including rigid semiconducting or insulating substrates. These layers can also be directly fabricated onto and integrated with structures including but not limited to CCD imaging arrays, silicon photonic ICs, photodetectors, solar cells, LEDs, lasers, quantum cascade lasers, and transparent displays. Further, the layers can be transfer-printed onto alternative substrates, such as polymers, plastics, and silicone elastomers, using wafer bonding or pick-up and transfer techniques. Integration of geometric structures with flexible and stretchable substrates is made possible due to the intrinsic flexible mechanics. Further, the geometric structures can processed directly into optical MEMS structures, and their thin film form factor enables high frequency and high mechanical quality factor operation.

Each layer is defined using a combination of at least two general processes. In the first, geometric structures comprising distinct materials are defined using additive or subtractive manufacturing. In the second, the layer is planarized, such that its top surface is polished down or an additional material is added to produce a flat surface at the top of the layer. These two processes can be repeated for an individual layer to produce layers that consist of more than two materials. As used herein, when referring to "layer 1, layer 2, etc.", layer 1 refers to the layer that is processed first and therefore deeper (e.g., closer to) within the substrate, and higher numbers are processed subsequently and therefore closer to the surface of the substrate. When referring to "material 1, material 2, etc.", these refer to the order in which materials are deposited into each individual layer. These materials may differ in different layers, in a number of embodiments. Geometric structures within individual layers can be defined using a broad range of additive and subtractive manufacturing techniques. FIGS. 10A-10E illustrate an example of a series of general steps that can be used to define the geometric structures in a layer using an additive process. Although FIGS. 10A-10E illustrate a single layer, the process which is illustrated is repeated, in various embodiments, for a plurality of layers of geometric structures, although some embodiments include a single layer of geometric structures.

Figure 10A:
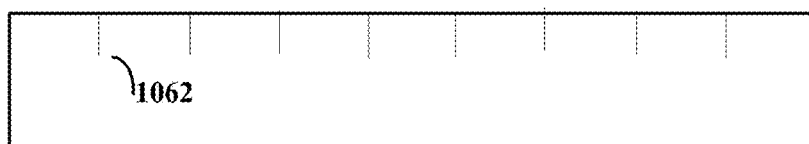
FIGS. 10A-10E illustrate an example process of fabricating an apparatus, in accordance with various embodiments.

As illustrated by FIG. 10A, the first layer includes a base layer 1060. The base layer 1060, in various embodiments, includes a thin film material layer and/or the top layer of a substrate. In accordance with some embodiments, the substrate is formed of a rigid semiconducting or insulating material. As a specific example, the substrate is formed of glass. Alignment marks 1062 are added to the base layer 1060 and used throughout the patterning process. For example, the alignment markers 1062 are used to pattern each layer to ensure that the layers are aligned with respect to one another with precision.

Figure 10B:
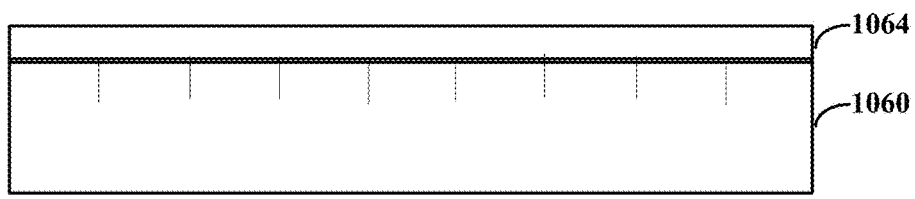
Figure 10C:
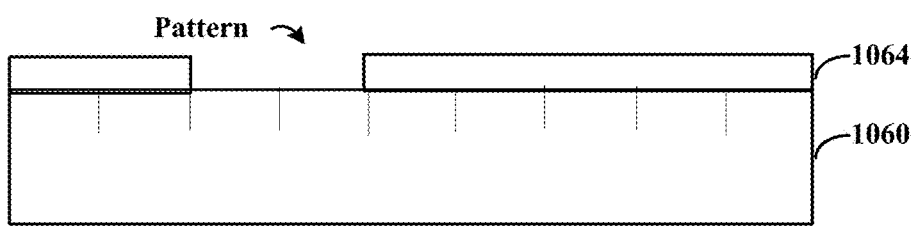

A sacrificial material 1064 is added to the second layer, as illustrated by FIG. 10B. The sacrificial material 1064, in various embodiments, includes a photoresist material. The material 1064 is deposited onto the base layer 1060, as illustrated by FIG. 10B, and then patterned, as illustrated by FIG. 10C using one or more of a number of processes. For example, the processes includes optical lithography, electron beam lithography, direct write lithography, nanoimprint lithography, and/or chemical self-assembly. These patterns are aligned relative to the other layers using the alignment marks 1062.

Figure 10D:
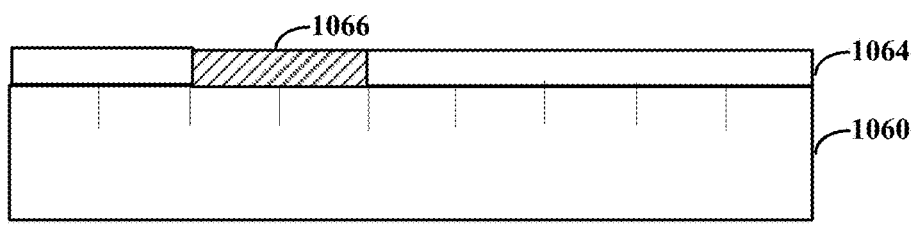
Figure 10E:
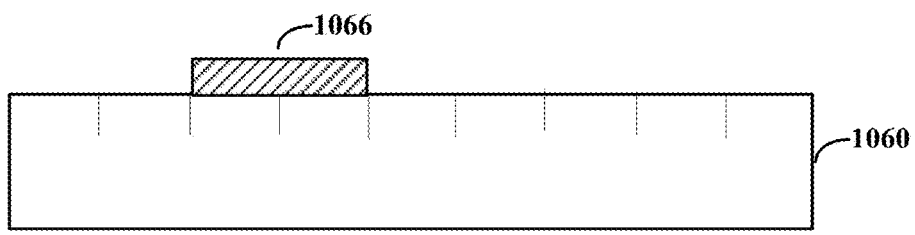

Further, as illustrated by FIG. 10D, another material 1066 is deposited on a first layer (e.g., onto a surface of the base layer 1060). For example, the other material 2166 is deposited using a technique such as atmospheric pressure chemical vapor deposition (CVD), low-pressure CVD, ultrahigh vacuum CVD, aerosol assisted CVD, direct liquid injection CVD, microwave plasma-assisted CVD, plasma-enhanced CVD, remote plasma-enhanced CVD, atomic layer CVD (also known as ALD), combustion CVD, hot filament CVD, hybrid physical-chemical vapor deposition, metalorganic CVD, rapid thermal CVD, photo-initiated CVD, sputtering, electron beam evaporation, thermal evaporation, wet chemical processing, or ion beam deposition. And, as illustrated by FIG. 10E, the sacrificial material 1064 is removed, which leaves a negative pattern of the material 1066 on the base layer 1060 (e.g., the substrate).

Figure 11A:
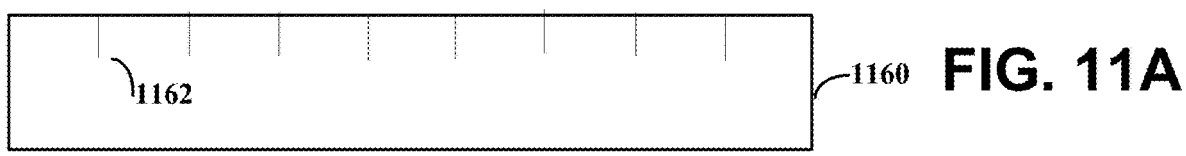
FIGS. 11A-11C illustrate an example of fabricating an apparatus, in accordance with various embodiments.
Figure 11B:
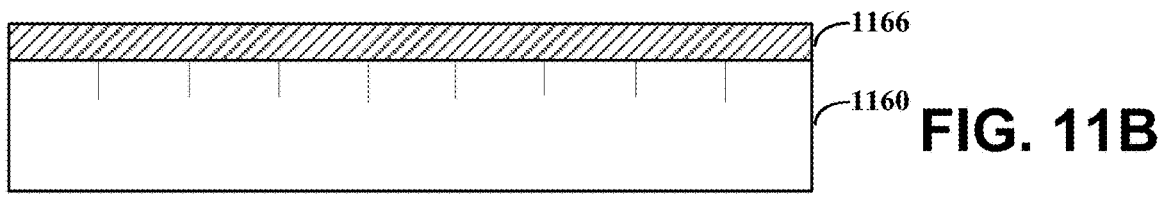
Figure 11C:
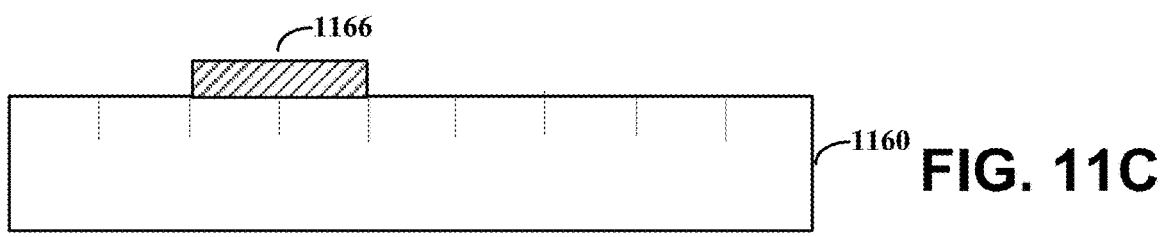

Alternatively and/or in addition, the geometric structures are fabricating using a different additive process. FIGS. 11A-11C illustrate another such fabrication process.

FIGS. 11A-11C illustrate an example of fabricating an apparatus, in accordance with various embodiments. As illustrated by FIG. 11A, the first layer includes a base layer 1160 with alignment markers 1162, such as those described above by FIGS. 10A-10E. The material 1166, which can include the same material 1166 as illustrated by FIGS. 11C-11E, is deposited onto the base layer 1160, as illustrated by FIG. 11B to form the first layer. In various embodiments, the material 1166 is deposited onto the base layer 1160 as previously described in connection with FIG. 10 and/or attached using wafer bonding. Examples of wafer bonding include direct, surface activated, plasma activated, anodic, eutectic, glass frit, adhesive, thermocompression, reactive, and transient liquid phase diffusion bonding. Next, the material 1166 is patterned and then etched using a wet or dry etching technique. The etching, in some embodiments, is completely or partially through the material film. The result is a geometric structure formed of the material 1166 within the first layer, as illustrated by FIG. 11C.

Figure 12A:
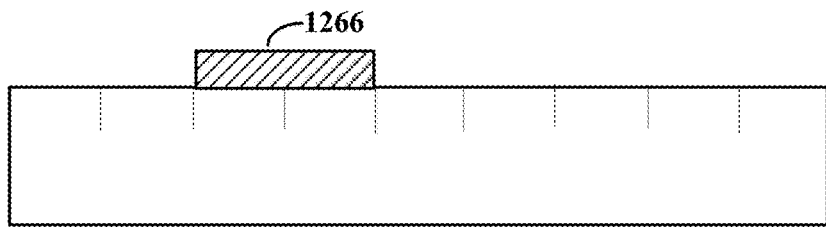
FIGS. 12A-12D illustrate various examples of fabricating an apparatus, in accordance with various embodiments.

FIGS. 12A-12D illustrate various examples of fabricating an apparatus, in accordance with various embodiments. In a number of embodiments, geometric structures of one or more layers are formed of more than one material. In such embodiments, the geometric structures are patterned using a process that combines material deposition onto a material consisting of geometric structures, followed by chemical-mechanical polishing (CMP). For example, FIG. 12A illustrates a base layer 1260 with a geometric structure formed of a first material 1266. The device component illustrated by FIG. 12A is formed via the process illustrated and described by FIGS. 11A-11C or FIGS. 10A-10E in various embodiments.

Figure 12B:
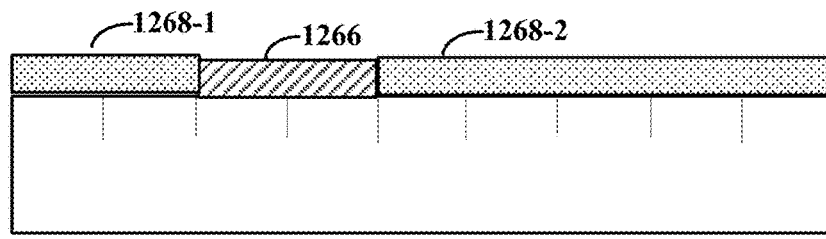

The regions of the first layer (e.g., the layer on the base layer 1260) that are not filled with the first material contain air. As illustrated by FIG. 12B, a second material is deposited and the layer is CMP polished, leaving geometric structures comprising the second material 1268-1, 1268-2.

Figure 12C:
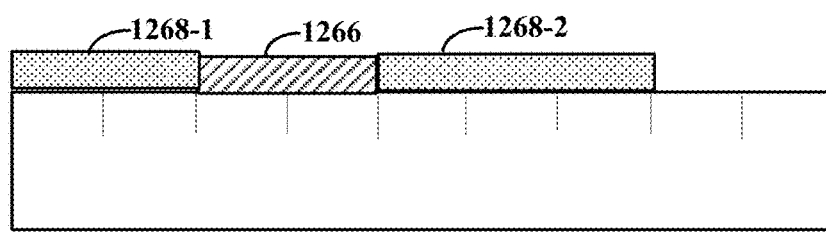
Figure 12D:
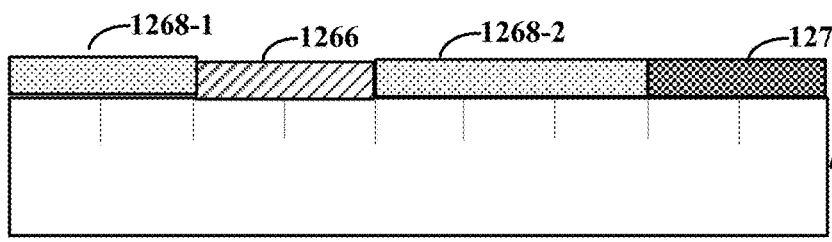

In various embodiments, one or more layers consists of more than two materials (e.g., the geometric structures comprising the first material 1266 and the second material 1268-1, 1268-2). In a number of embodiments to create a first layer with three materials, the process described by FIGS. 12A-12D is used. For example, the first layer defined by first depositing and patterning a first material 2366 (i.e. transparent oxide layer), followed by the deposition and CMP polishing of a second material 1268-1, 1268-2 as illustrated by FIGS. 12A-12B. The layer is patterned again, followed by the deposition of CMP polishing of a third material 1270 as illustrated by FIG. 12C and FIG. 12D. In other embodiments and/or in addition, as further illustrated herein, the third material includes a planarization material.

Figure 13A:
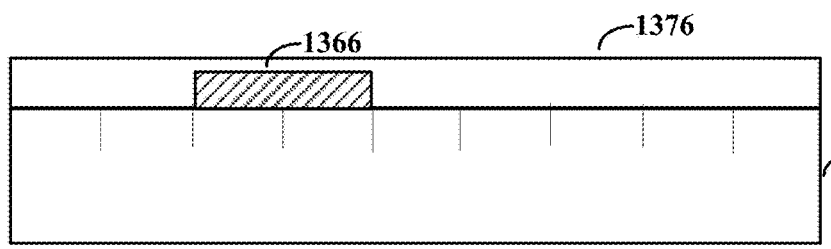
FIGS. 13A-13C illustrate various examples of fabricating an apparatus, in accordance with various embodiments.
Figure 13B:
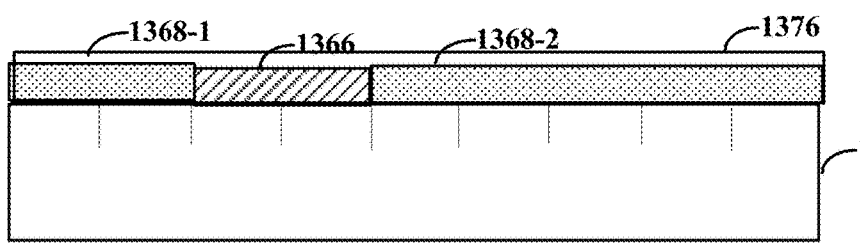
Figure 13C:
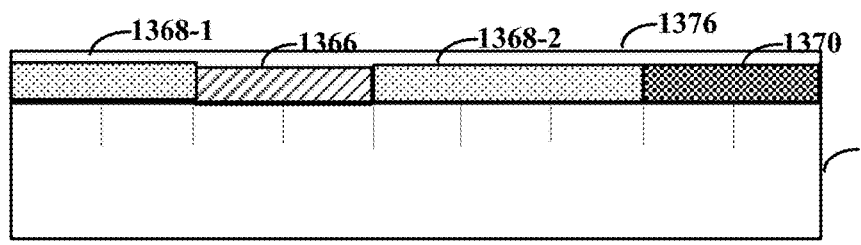

FIG. 13A-13C illustrate various examples of fabricating an apparatus, in accordance with various embodiments. In various embodiments, one or more of the layers of geometric structures is planarized. Planarization is used to ensure that the thickness of each layer is well-defined and to steamline the manufacturing of the device component. Planarization of an individual layers, in some instances, is achieved by spin-coating a planarization material onto the substrate, followed by material curing. The planarization material includes a liquid, such as spin-on-glasses and epoxy resins. This method ensures that the top surface of the layer is smooth and planar. The total thickness of the layer is controlled by controlling the spin speed during spin coating. Alternatively and/or in addition, an individual layer is planarized using CMP. For example, FIG. 13A illustrates planarization of a layer comprising one geometric structure of a first material 1366 using a planarization material 1376 (and a base layer 1360). FIG. 13B illustrates planarization of a layer comprising one geometric structure of a first material 1366 and two geometric structures of a second material 1368-1, 1368-2 using a planarization material 1376. FIG. 13C illustrates planarization of a layer comprising one geometric structure of a first material 1366, two geometric structures of a second material 1368-1, 1368-2, and one geometric structure of a third material 1370 using a planarization material 1376.

Various embodiments include a combination of these processes of defining geometric structures and planarization to yield layers consisting of two or more materials. For example, to create a layer with three materials, an additive process to define geometric structures is performed twice to define nanostructures consisting of material one and material two, followed by planarizing the layer using material three. In some embodiment, the curable planarization liquid is the third material.

A broad range of materials are incorporated into the fabrication of apparatuses in accordance with the present application and depending on the particular application. These include metals, semiconductors, and insulators; linear and non-linear optical materials; active and passive electronic materials. Different material combinations are used to target applications at specific wavelengths or wavelength ranges. In some embodiments, wavelength ranges are defined as follows:

Visible: 400 nm-800 nm wavelengths;
Near-infrared (NIR): 800 nm-2000 nm wavelengths;
Mid-infrared (MIR): 2 μm-10 μm wavelengths; and
Far-infrared (FIR): 10 μm-40 μm wavelengths.

Further in various specific examples, material is selected based on:

Si (crystalline): High index (>3.4), visible and NIR applications
Si (polycrystalline): High index (>3.4), red and NIR applications
Si (amorphous): High index (>3.4), MR applications
SiO2: index ~1.5, visible and NIR applications
Al2O3: index ~1.7, UV, visible and NIR applications
GeO2: index ~1.7, UV, visible and NIR applications
MgO: index ~1.7, NIR and MIR applications
TeO2: index ~2.2, MIR applications
TiO2: index ~2.5, visible and NIR applications
HfO2: index ~2.1, visible and NIR applications
ZrO2: index ~2.1, UV, visible and MR applications
AlAs: index ~3, MR applications
GaAs: index ~3.6, NIR applications
InAs: index ~3.4, MIR applications
KBr: index ~1.5, UV, visible, NIR, MIR, and FIR applications
C (diamond): index ~2.4, UV, visible, NIR, and MIR applications
CaCO3: index 1.4-1.9, birefringent, UV, visible, and NIR applications
SiC: index 3-3.5, NIR and FIR applications
Photonic material (e.g., SiC): MIR applications
AgCl: index ~2, NIR and MIR applications
CsCl: index ~1.6, visible, NIR, and MIR applications
KCl: index ~1.4, UV, visible, MR, MIR, and FIR applications
NaCl: index ~1.5, visible, NIR, MIR, and FIR applications
BaF2: index ~1.45, UV, visible, MR, and MIR applications
CaF2: index ~1.4, UV, visible, NIR, and MIR applications
MgF2: index ~1.35, UV, visible, MR, and MIR applications
Ge: High index (~4), NIR, MIR, and FIR applications
AlN: index ~2, UV, visible, NIR, and MIR applications
Si3N4: index ~2, visible and NIR applications
LiNbO3: index ~2.2, visible and MR applications
GaP: High index (>3), visible and NIR applications
As2S3: index ~2.4, NIR and MIR applications
CS2: index ~1.6, visible and NIR applications, highly dispersive
ZnS: index ~2.2, visible, NIR, and MIR applications
AlSb: High index (~3.3), NIR applications
ZnSe: index ~2.5, visible, NIR, MIR, and FIR applications
SrTiO3: index ~2.4, visible and NIR applications, highly dispersive, persistent photoconductivity
CdTe: index ~2.7, MR, MIR, and FIR applications
Bi4Ti3O12: index ~2.7, visible applications, electrooptical and photorefractive
BaTiO3: index ~2.4, birefringent, highly nonlinear, photorefractive, piezoelectric, pyroelectric, ferroelectric
YVO4: index ~2, birefringent, visible and NIR applications
CaWO4: index ~1.9, slightly birefringent, UV fluorescent, UV, visible, and NIR applications
VO2: phase change material, visible and NIR applications
GeSbTe: phase change material, visible and NIR applications
In2O3-SnO2 (ITO): index ~1.7, visible applications, conductive
PMMA: index ~1.5, visible and NIR applications
Polycarbonate: index ~1.6, visible and NIR applications
HSQ (spin-on-glass): index 1.4-1.5, visible and NIR applications
BaB2O4: ne 1.55, no 1.68, birefringent, UV, visible, and NIR applications
LiB3O5: all refractive index ~1.6, birefringent, UV, visible, and NIR bands CsLiB6O10: all refractive index ~1.45, birefringent, UV, visible, and NIR applications
CdS: solid state laser material and photoresistor
PbS: NIR sensitive photoresistor
TaAl3: NIR and MIR applications
Ta: plasmonic material
Be: plasmonic material
Pr: plasmonic material
Co: plasmonic material
Fe: plasmonic material
Sn: plasmonic material
Nb: plasmonic material
Ni: plasmonic material
Pb: plasmonic material
Pd: plasmonic material
Ag: plasmonic material
Au: plasmonic material
Cu: plasmonic material
Al: plasmonic material
Na: plasmonic material
K: plasmonic material
Bi: plasmonic material
Pt: plasmonic material
Cr: plasmonic material
Ti: plasmonic material
W: plasmonic material
Zn: plasmonic material
TiN: plasmonic material.

Figure 14:
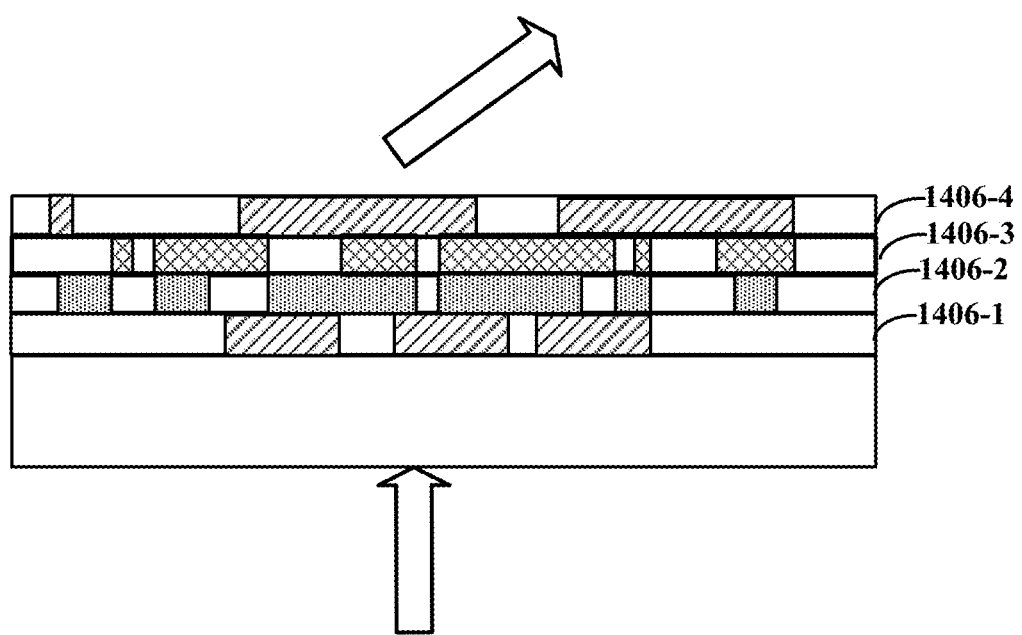
FIG. 14 illustrates an example device component with four layers of geometric structures, in accordance with various embodiments.

FIG. 14 illustrates an example device component with four layers 1406-1, 1406-2, 1406-3, and 1406-4 of geometric structures. As illustrated, one or more of the layers includes a unique layout of geometric structures. The device components includes a multi-layer device component.

Experimental/More Detailed Embodiments

In the following discussion, various experimental/more detailed embodiments are described. The skilled artisan would appreciate that specific aspects in these detailed examples, although useful in connection with the previously described embodiments, are not intended to be necessarily limiting.

In various experimental embodiments, a metagrating is designed using the above-described optimization process. The metagrating can be designed for deflecting 75 degrees, in some experimental embodiments. The metagrating can be fabricated of polycrystalline silicon. For example, polycrystalline silicon (p-Si) is deposited onto multiple wafers, including fused silica substrates and crystalline silicon structures with a thermal oxide, using silane in a low-pressure chemical vapor deposition furnace at 620° C. The samples consisting of p-Si on thermal oxide on crystalline silicon are optically characterized using ellipsometry to determine the final thickness and the refractive index of the p-Si. A 30 nm-thick silicon dioxide hard mask is then deposited by plasma-enhanced chemical vapor deposition. The patterns are defined via electron beam lithography using ZEP 520A resist. The nanostructures are dry-etched using a breakthrough C2F6 etch, followed by a Cl2, HBr, and O2 main etch, and an HBr and O2 over-etch. The samples are cleaned in a piranha solution, which consists of a mixture of sulfuric acid and hydrogen peroxide heated to 120° C.

Figure 15A:
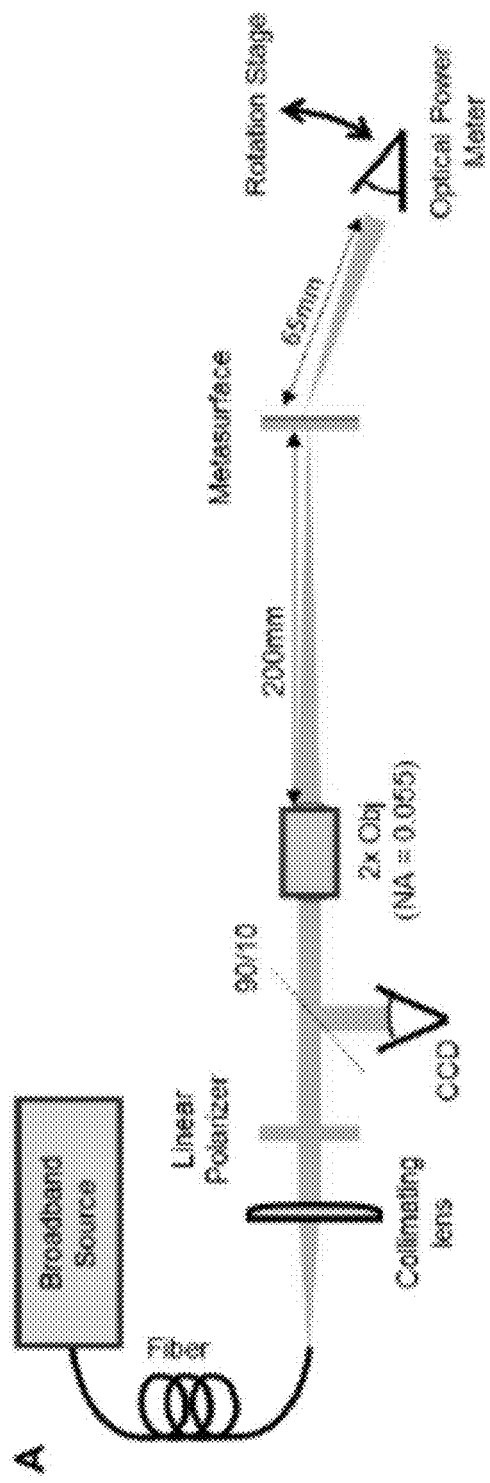
FIGS. 15A-15D illustrate examples of characterizing devices in accordance with the present disclosure.
Figure 15D:
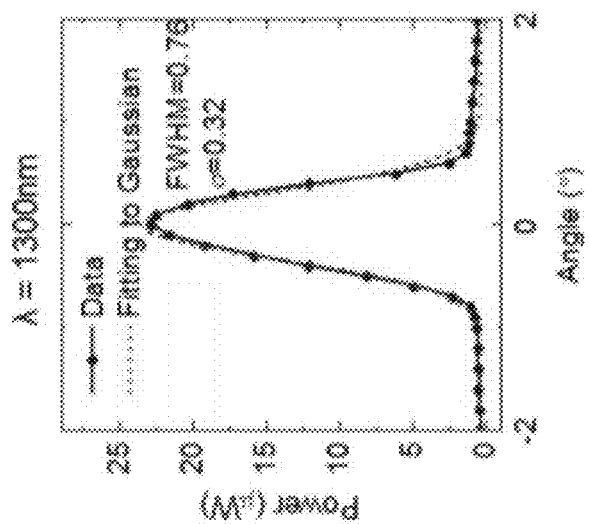
Figure 15C:
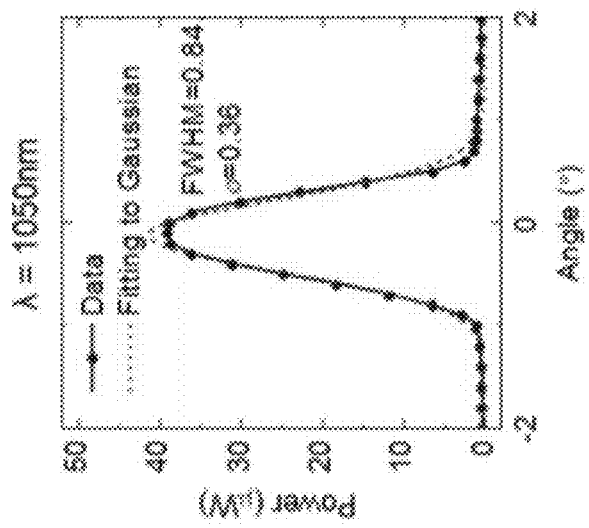
Figure 15B:
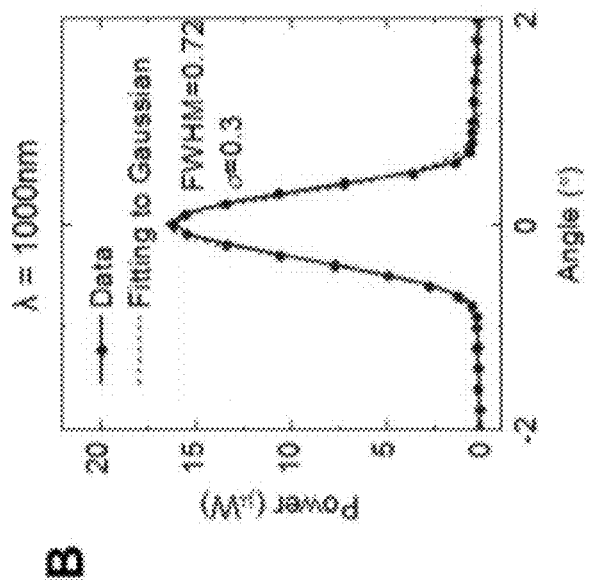

FIGS. 15A-15D illustrate examples of characterizing devices designed in accordance with the present disclosure. To characterize the devices, light from an NKT SuperK white light laser is wavelength-filtered using an LLTF module, collimated, and polarized. It is then focused onto the devices using a 0.055 numerical aperture (NA) objective. FIG. 15A illustrates an example setup for characterizing the device and FIGS. 15B-15D illustrate examples of measured angular profiles of the incident beam at three different wavelengths. As illustrated by FIG. 15A, the setup for characterizing the devices can include a polarized halogen white light source, coupled to a near-normal dark-filed spectroscopy. For instance, a tunable white light laser can be used as a light source. The angular distribution of the focusing beam is experimentally characterized at wavelengths of 1000 nm, 1050 nm, and 1300 nm, and in all three cases, the angular spread is within ±1 degree from normal. The transmitted beam is characterized with a germanium power meter mounted on a motorized rotation stage. A section of the substrate with the silicon fully etched away is used as a calibration window and serves as a reference region for the total transmitted power from the source.

FIGS. 16A-16E illustrate example schematics of a supermode coupling in a metagrating apparatus, in accordance with various embodiments of the present disclosure. The dynamics of supermode coupling and propagation in metagratings can be described using coupled Bloch mode analysis (CBMA). CBMA involving the supermodes in grating-like structures can be used to produce in-depth physical insight into the diffraction process in dielectric gratings, and it has more recently been used to explain the physics of highly reflective deep lamellar gratings. In CBMA, the electromagnetic fields in the air superstrate above the grating (i.e., region I in FIG. 16A) and the SiO2 substrate below the grating (i.e., region III in FIG. 16A) can be expanded by Fourier harmonics (i.e., Rayleigh or planewave expansion). The electromagnetic fields inside the periodic metagrating (i.e., region II in FIG. 16A) are expanded into a set of N supermodes.

Figure 16A:
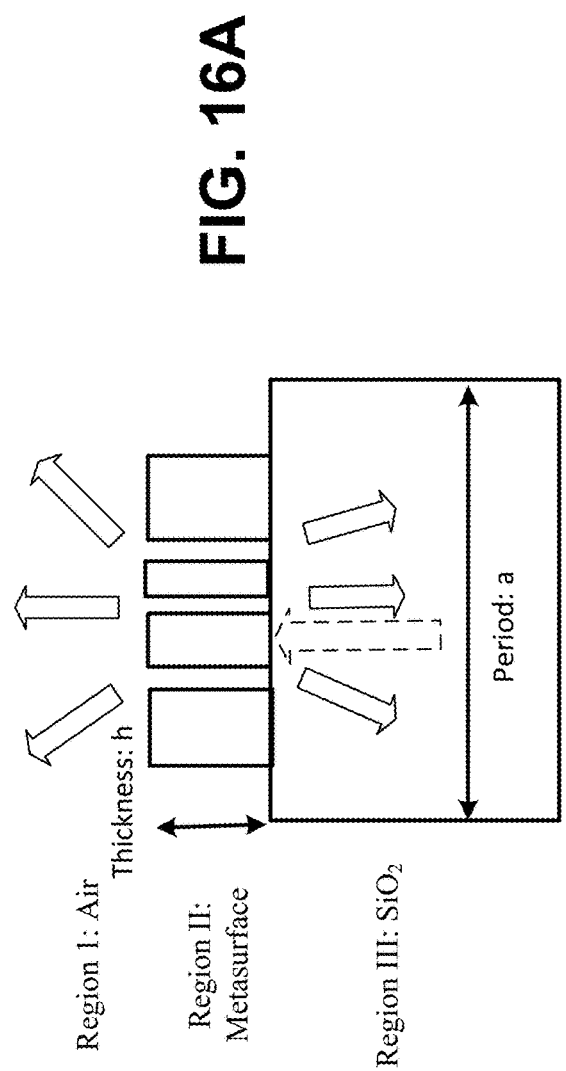
FIGS. 16A-16E illustrate example schematics of a supermode coupling in a metagrating, in accordance with various embodiments of the present disclosure.
Figure 16B:
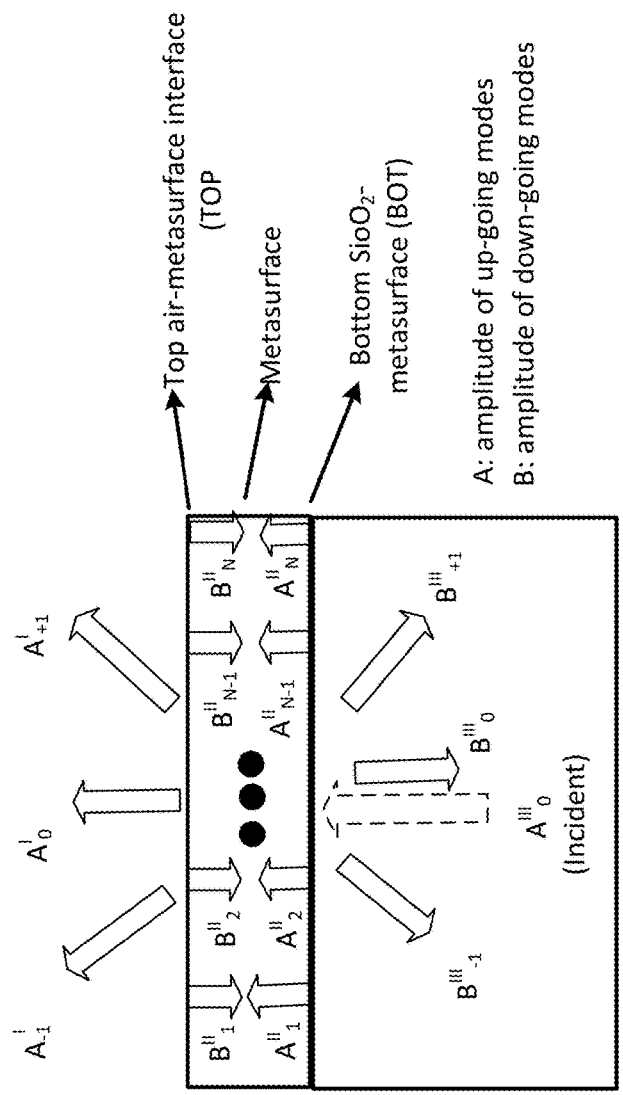
Figures 16C, 16D, 16E:
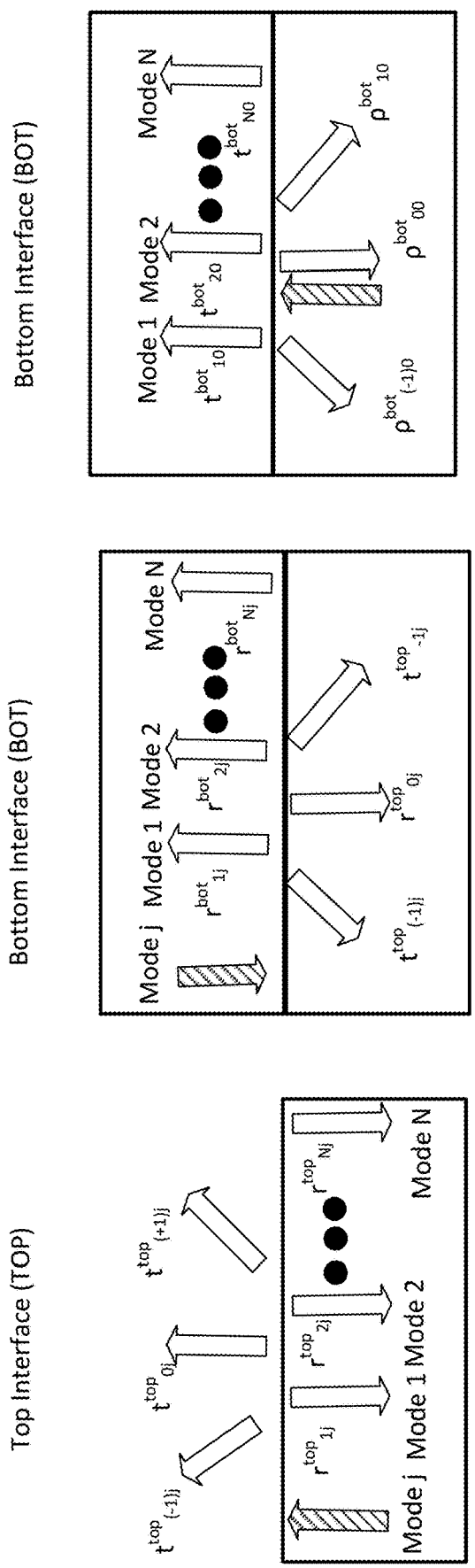

The metagrating can be treated as a vertically-oriented Fabry Perot cavity, in which the supermodes bounce between the air-metagrating interface and SiO2-metagrating interface (FIG. 16B). As an individual supermode (indexed as mode j) interacts with an interface, three types of processes can occur. First, the mode can transmit out of the cavity and couple to the far-field diffraction channels in regions I or III. Second, the mode can reflect from the interface and propagate in the opposite direction in region II. Third, the mode may couple with and exchange energy with the other N−1 supermodes in region II. These coupling dynamics at the top and bottom metagrating interfaces are depicted in FIGS. 16C and 16D. The interaction of the incident plane wave with the bottom metagrating interface shows similar coupling processes and is depicted in FIG. 16E.

The supermodes include propagating modes, which possess purely real-valued $n_{\it{eff}}$ (for lossless materials), and evanescent modes, which possess very high imaginary-valued $n_{\it{eff}}$ and exponentially decay along the propagation direction. The metagratings presented herein can be thicker than the decay length of the evanescent modes. As such, the propagating modes are the principal modes responsible for energy transport within the metagrating and for energy funneling into the far-field diffractive channels. This approximation can be used so long as the evanescent supermodes are effectively damped by the relatively thick metagrating.

Specifically, FIG. 16A illustrates a schematic of a metagrating illuminated by an incident beam through the substrate (dashed-lined single-headed arrow), which produces light beams emitted into discrete diffraction channels (solid-lined single-headed arrows). FIG. 16B illustrates a dynamic picture of supermode transport and coupling processes in the metagrating. FIG. 16C illustrates detailed schematic of the mode-coupling processes at the air-metagrating interface for the upward-propagating $j^{th}$ supermode. This mode can couple into the diffracted channels in Region I or couple into downward-propagating supermodes (including the $j^{th}$ mode). FIG. 16D illustrates a detailed schematic of the supermode coupling processes at the metagrating-substrate interface for the downward propagating jth supermode. This mode can couple into the diffracted channels in Region III or couple into upward-propagating supermodes (including the $j^{th}$ mode). FIG. 16E illustrates a detailed schematic of the mode-coupling processes driven by the incident wave at the metagrating substrate interface. The incident wave can couple into the diffracted channels in Region III or into upward-propagating supermodes.

Mathematically, CBMA is derived based on the N supermodes (usually propagating modes) bouncing back and forth within the metagrating, which can be considered as a Fabry-Perot cavity. The effective mode index of the $j^{th}$ supermode can be denoted as $n_j$ and its propagation delay over a single trip inside the metagratings $\phi_j = \exp(ik_o n_j h)$. The excitation coefficients of the $i^{th}$ Bloch mode (or $n^{th}$ diffracted order) can be defined by the $j^{th}$ Bloch mode as $r_{ij}^{top/bot}$ (or $t_{nj}^{top/bot}$) at the top/bottom interface, and the excitation coefficient of the $m^{th}$ far-field diffracted order the $n^{th}$ order as $p_{mn}^{top/bot}$. Reciprocity ensures certain equality relations such as $r_{ij}^{top/bot} = r_{ji}^{top/bot}$, $t_{ij}^{top/bot} = t_{ji}^{top/bot}$ and $p_{mn}^{top/bot} = p_{nm}^{top/bot}$. At the metagrating-substrate interface, there can be the relation:

$$\begin{bmatrix} A_1^{II} \\ A_2^{II} \\ M \\ A_{N-1}^{II} \\ A_N^{II} \end{bmatrix} + R^{bot} \begin{bmatrix} B_1^{II} \\ B_2^{II} \\ M \\ B_{N-1}^{II} \\ B_N^{II} \end{bmatrix} = T^{bot} \begin{bmatrix} A_0^{III} \\ A_0^{III} \\ M \\ A_0^{III} \\ A_0^{III} \end{bmatrix}$$  EQ. 14

With:

$$R^{bot} = \begin{bmatrix} r_{11}^{bot}\phi_1 & r_{12}^{bot}\phi_2 & \Lambda & r_{1(N-1)}^{bot}\phi_{N-1} & r_{1N}^{bot}\phi_N \\ r_{21}^{bot}\phi_1 & r_{22}^{bot}\phi_2 & \Lambda & r_{2(N-1)}^{bot}\phi_{N-1} & r_{2N}^{bot}\phi_N \\ M & M & O & M & M \\ r_{(N-1)1}^{bot}\phi_1 & r_{(N-1)2}^{bot}\phi_2 & \Lambda & r_{(N-1)(N-1)}^{bot}\phi_{N-1} & r_{(N-1)N}^{bot}\phi_N \\ r_{N1}^{bot}\phi_1 & r_{N2}^{bot}\phi_2 & \Lambda & r_{N(N-1)}^{bot}\phi_{N-1} & r_{NN}^{bot}\phi_N \end{bmatrix}$$

And $$T^{bot} = \begin{bmatrix} t_{10}^{bot} & 0 & 0 & 0 & 0 \\ 0 & t_{20}^{bot} & 0 & 0 & 0 \\ 0 & 0 & O & 0 & 0 \\ 0 & 0 & 0 & t_{(N-1)0}^{bot} & 0 \\ 0 & 0 & 0 & 0 & t_{N0}^{bot} \end{bmatrix}$$

Similarly, at the top air metagrating interface, there can be the relation:

$$R^{top} \begin{bmatrix} A_1^{II} \\ A_2^{II} \\ M \\ A_{N-1}^{II} \\ A_N^{II} \end{bmatrix} + \begin{bmatrix} B_1^{II} \\ B_2^{II} \\ M \\ B_{N-1}^{II} \\ B_N^{II} \end{bmatrix} = \begin{bmatrix} 0 \\ 0 \\ M \\ 0 \\ 0 \end{bmatrix}$$  EQ. 15

With:

$$R^{top} = \begin{bmatrix} r_{11}^{top}\phi_1 & r_{12}^{top}\phi_2 & \Lambda & r_{1(N-1)}^{top}\phi_{N-1} & r_{1N}^{top}\phi_N \\ r_{21}^{top}\phi_1 & r_{22}^{top}\phi_2 & \Lambda & r_{2(N-1)}^{top}\phi_{N-1} & r_{2N}^{top}\phi_N \\ M & M & O & M & M \\ r_{(N-1)1}^{top}\phi_1 & r_{(N-1)2}^{top}\phi_2 & \Lambda & r_{(N-1)(N-1)}^{top}\phi_{N-1} & r_{(N-1)N}^{top}\phi_N \\ r_{N1}^{top}\phi_1 & r_{N2}^{top}\phi_2 & \Lambda & r_{N(N-1)}^{top}\phi_{N-1} & r_{NN}^{top}\phi_N \end{bmatrix}$$

Combining EQ. 14 with EQ. 15 provides:

$$\begin{bmatrix} A_1^{II} \\ A_2^{II} \\ M \\ A_{N-1}^{II} \\ A_N^{II} \end{bmatrix} = (1 - R^{bot}R^{top})^{-1} T^{bot} \begin{bmatrix} A_0^{III} \\ A_0^{III} \\ M \\ A_0^{III} \\ A_0^{III} \end{bmatrix}$$  EQ. 16

EQ. 16 provides the amplitudes of the upward propagating Bloch modes inside the metagrating, as excited by the external illumination. The amplitudes of the downward-propagating Bloch modes can be obtained by substituting EQ. 16 into EQ. 15. Then the $m^{th}$ diffracted order in Region I can be written as:

$$A_m' = \Sigma_j t_{m,j}^{top} A_j'' \phi_j$$  EQ. 17.

The amplitudes of the $m^{th}$ diffracted orders in region III can be written as:

$$A_m''' = \Sigma_j t_{m,j}^{bot} B_j'' \phi_j + p_{m0} A_0'''.$$  EQ. 18.

In EQ. 17 and EQ. 18, the far-field diffracted channels are written as the coherent summation over all the propagating supermodes inside the metagrating, and allow for examination of the supermode interference as they couple into the diffraction channels. Notably, if only one supermode is kept in EQ. 17 and EQ. 18, these equations reduce to the classical Fabry-Perot formulas for a single mode in a periodic medium.

FIGS. 17A-17D illustrate an example metagrating design using an adjoint-based topology optimization. The efficiencies in particular angle metagratings can be understood by examining the optical modes of the devices. Metagratings consisting of a single thin film with vertically etched features can be treated as a vertically-oriented Fabry Perot cavity supporting supermodes. The substrate-grating and grating-air interfaces serve as the cavity mirrors. The plane wave incident on the metagrating couples into these modes, which bounce within the cavity. Whenever a mode interacts with a cavity mirror, a combination of three processes can occur, as described by coupled Bloch mode analysis (e.g., FIG. 18A). First, the mode can reflect from the interface. Second, the mode can couple with and excite other supermodes. Third, the mode can couple out as plane waves into several discrete diffraction channels (six channels are shown in the example in FIG. 18A). As such, each diffraction channel contains contributions from all of the supermodes. High deflection efficiency in the desired diffraction channel is achieved when the out-coupled plane waves from all the supermodes in that channel (strongly) constructively interfere (FIG. 18A, dashed boxes).

Figure 17A:
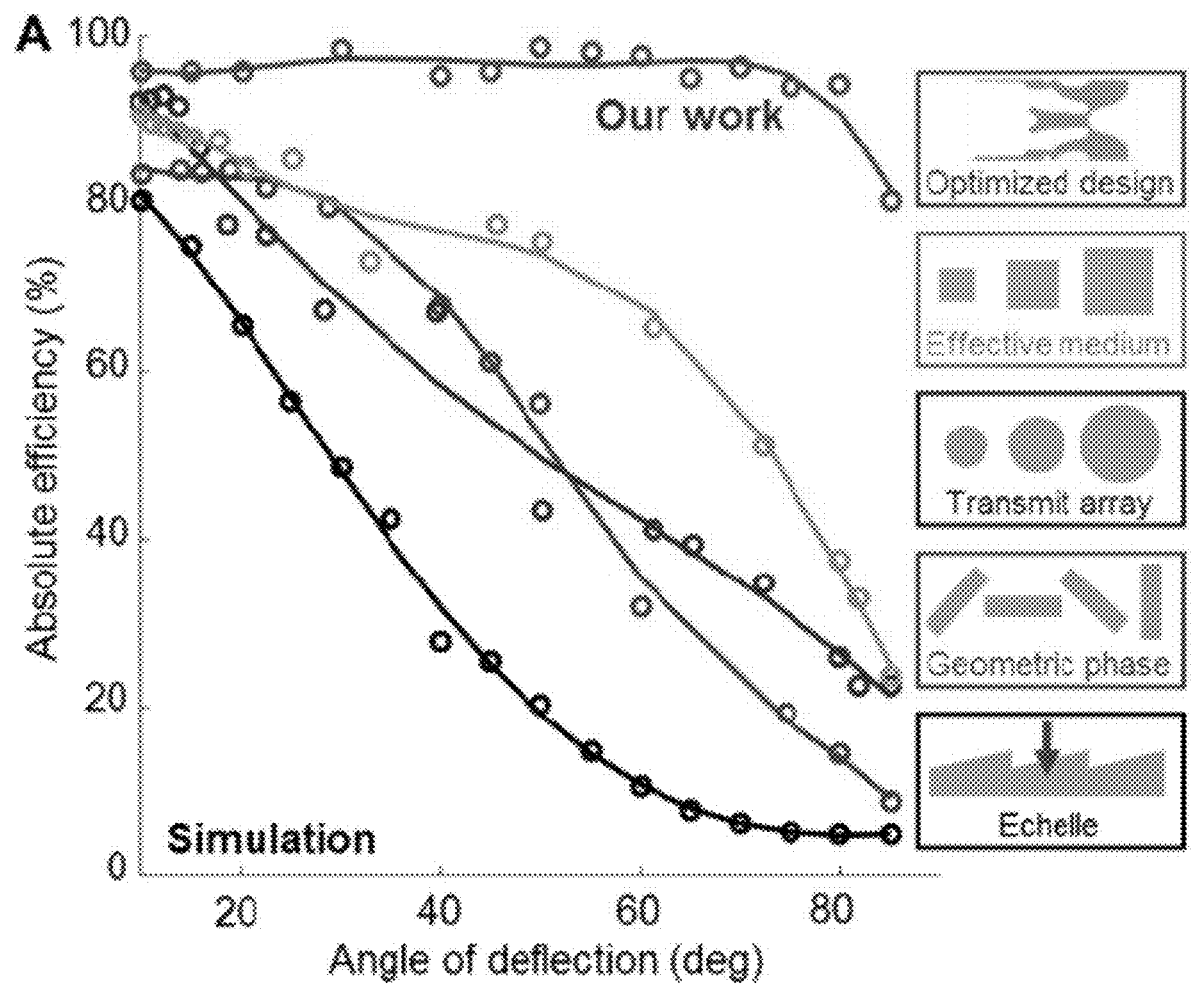
FIGS. 17A-17D illustrate an example metagrating design using topology optimization, in accordance with various embodiments of the present disclosure.
Figure 18A:
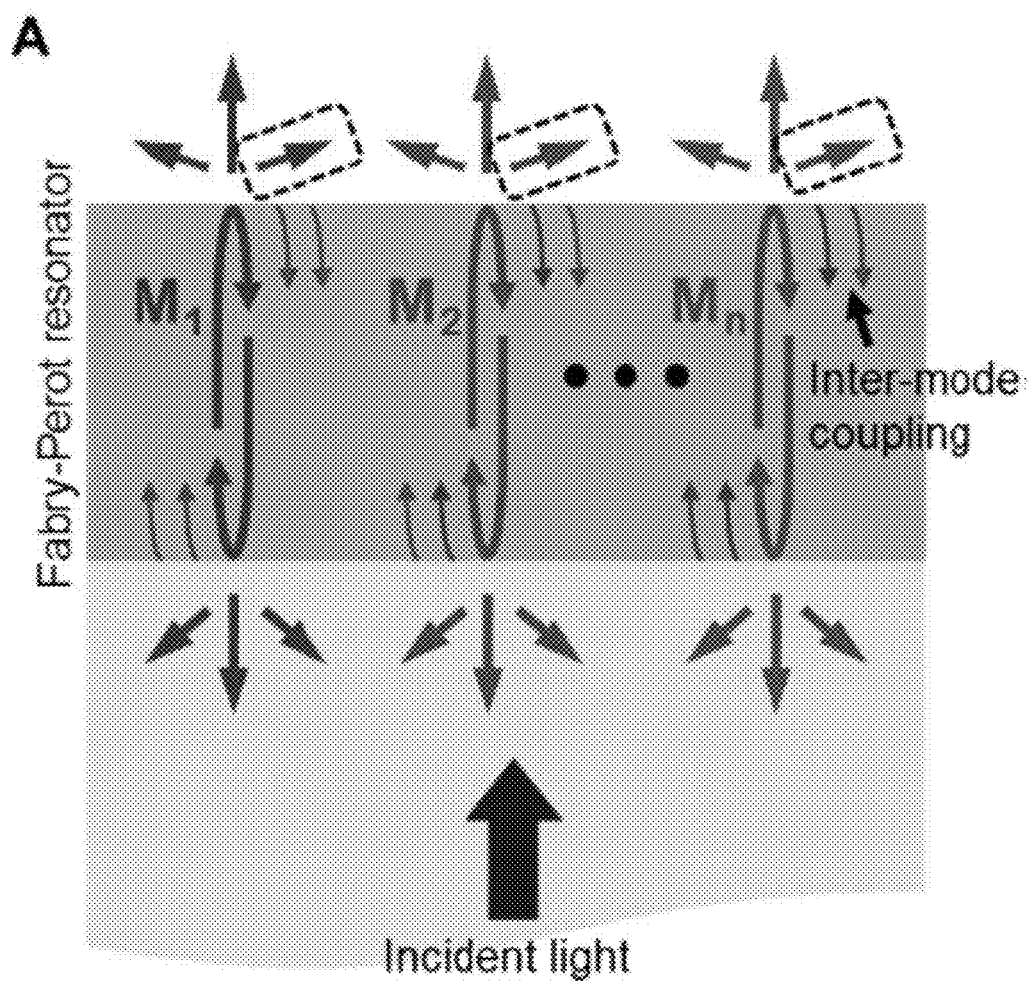
FIGS. 18A-18C illustrate example supermode coupling, in accordance with various embodiments of the present disclosure.

FIG. 17A illustrates simulated deflection efficiencies of various transmission grating types as a function of deflection angle. These include the classical echelle grating, three types of established metagrating designs, and topology-optimized metagrating in accordance with various embodiments disclosed herein. These devices deflect normally incident TE- and TM-polarized light at a single wavelength, and the plotted points represent the deflection efficiency averaged over both polarizations. The wavelengths and materials used in these simulations are listed in Table S1. The topology-optimized metagrating can be optimized for 75 degree deflection.

The grating designs simulated in FIG. 17A can be based on metagrating designs in previously published papers. The material systems, operating wavelengths, and bibliographic sources for these designs are listed below:

TABLE 1

| Grating Design Approach | Material | Wavelength |
| --- | --- | --- |
| Effective Medium | $TiO_2$ | 860 |
| Transmit Array | Poly-silicon | 1550 |
| Geometric Phase | $TiO_2$ | 405 |
| Echelle (sawtooth profile) | $SiO_2$ | 1050 |

Figure 17B:
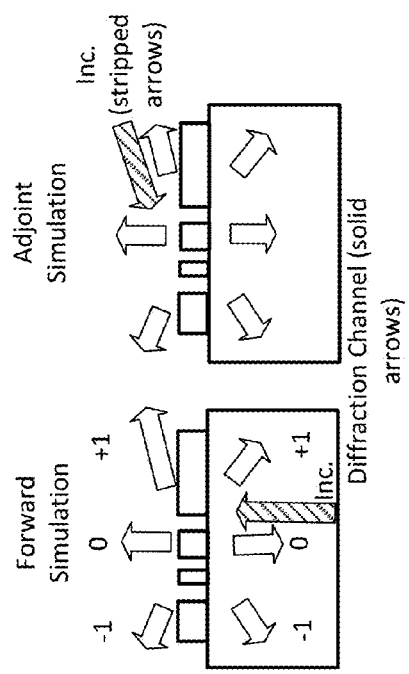
Figure 17C:
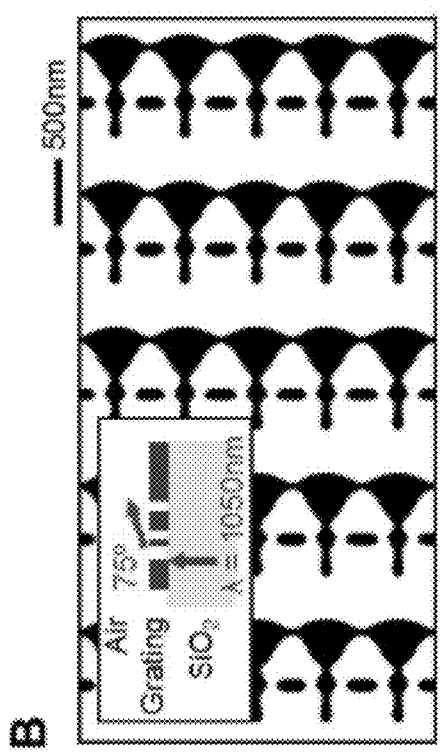

FIG. 17B illustrates a top view of the topology-optimized metagrating, which is optimized for 75 degree deflection in various embodiments. As a representative example, the supermodes for the transmissive 75 degree metagrating featured in FIG. 17B can be analyzed for TM-polarized incident light. The mode profiles are extracted from a coupled-wave analysis solver (INSERT 29). This device supports eight propagating supermodes, which have effective modal refractive indices ranging from air-like to silicon-like. The device also supports many evanescent supermodes, which have decay lengths that are much shorter than the device thickness and therefore couple minimally with the diffraction channels. The field profiles of the propagating modes are plotted in FIG. 18B, and each display an intricate field profile. An analysis of each supermode indicates that no individual supermode couples efficiently into the desired diffraction channel. However, the constructive interference of all eight out-coupled supermodes in the desired diffraction channel yields high deflection efficiency. The device deflects normally-incident TE- and TM-polarized light at a wavelength of 1050 nm. Black represents silicon and white represents air. FIG. 17C illustrates an example schematic of the forward and adjoint simulations used to optimize a large-angle transmissive metagrating, which deflects normally-incident light into the +1 diffraction channel. Also sketched are the five other diffraction channels in the system.

Figure 17D:
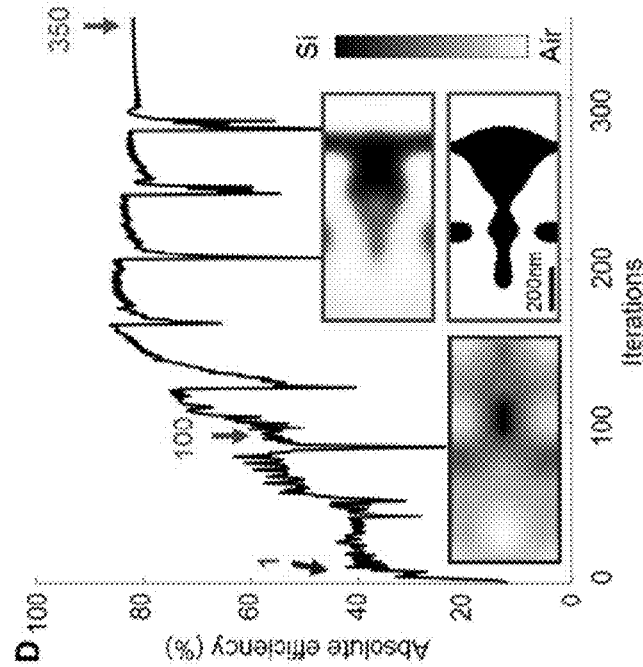

FIG. 17D illustrates an example plot of deflection efficiency over the course of the adjoint-based topology optimization process for the metagrating in FIG. 17B. A total of 350 iterations can be used to design the device, although embodiments are not so limited and can include more or less iterations. The sharp dips represent a geometric blur that is applied every 40 iterations to eliminate small features (as described above). The insets show the dielectric constant distribution in a single unit cell of the metagrating at different stages of the optimization process.

This example is indicative of the many factors in device design that are controlled to enable efficient, and particular angle deflection. First, the effective refractive index and spatial profile of each supermode is tailored such that the modes constructively interfere as they couple into the intended diffraction channel. Second, the coupling strengths of the incident plane wave into the modes; the modes into the diffraction channels; and the modes with other modes are specified. These coupling parameters involve both the propagating and evanescent supermodes, which together specify the electromagnetic field boundary conditions at the metagrating interfaces. Third, it can be beneficial for the metagrating to support as many total supermodes as possible. Having more modes allows the potential for more degrees of freedom in the design, which can be tailored to better fit the parameters above. This design problem is complex and ultimately intractable to address using physically-intuitive design procedures, and can be solved using the above-described optimization process.

In specific experimental embodiments, a transmissive 75 degree metagrating designed according to the above-described optimization process can be analyzed for efficiencies. An individual grating period has space for only two nanoposts, and the device supports only three propagating supermodes. Two of the modes show strong field localization within an individual nanopost (FIGS. 22A-22C), which is consistent with the design methodology of stitching together individual waveguide elements. The third has a low effective refractive index, and its fields are predominantly in the air region of the grating. Due in part to the relatively small number of supermodes and non-optimized spatial mode profiles, the grating efficiency is low.

As described above, topology-optimized grating structures operating at near-infrared wavelengths can be fabricated and characterized. The initial substrate is a silicon dioxide wafer, on which a layer of polycrystalline silicon is grown by chemical vapor deposition. A 200 μm-diameter circular grating devices, in specific experimental embodiments, is patterned using electron beam lithography, followed by reactive ion etching. To optically characterize the device, a focused, tunable white light laser can be used as a light source, and the diffracted light beams using a germanium detector mounted on a goniometer, as is illustrated by FIG. 15A.

To reduce device sensitivity to fabrication imperfections, the robustness algorithms, as previously described can be implemented into the design process. These algorithms include the effects of geometric dilation and erosion in each (simulation) iteration of the optimization process, with the goal of reducing the impact of geometric variability on device efficiency. This incorporation of robustness into the device design necessitates a tradeoff with optimal device efficiency. Devices that possess higher overall performance, at the expense of being less robust, can be experimentally realized with more precise fabrication.

The 75 degree transmission grating from FIG. 17B can be characterized, which is designed to deflect normally-incident TE and TM waves with a wavelength of 1050 nm. A scanning electron microscopy (SEM) image of the device is presented in FIG. 19A, and the silicon nanostructures have morphologies that match well with the theoretical design. Tilted SEM images of the device (FIGS. 24A and 24B) show vertical sidewalls, indicative of high-quality silicon etching. From an analysis, both the absolute and relative efficiencies of the device. Absolute efficiency refers to the power in the deflected light beam normalized to the power of light transmitted through a bare silicon dioxide substrate. Relative efficiency refers to the power in the deflected light beam normalized to the total power transmitted through the device.

Figure 18B:
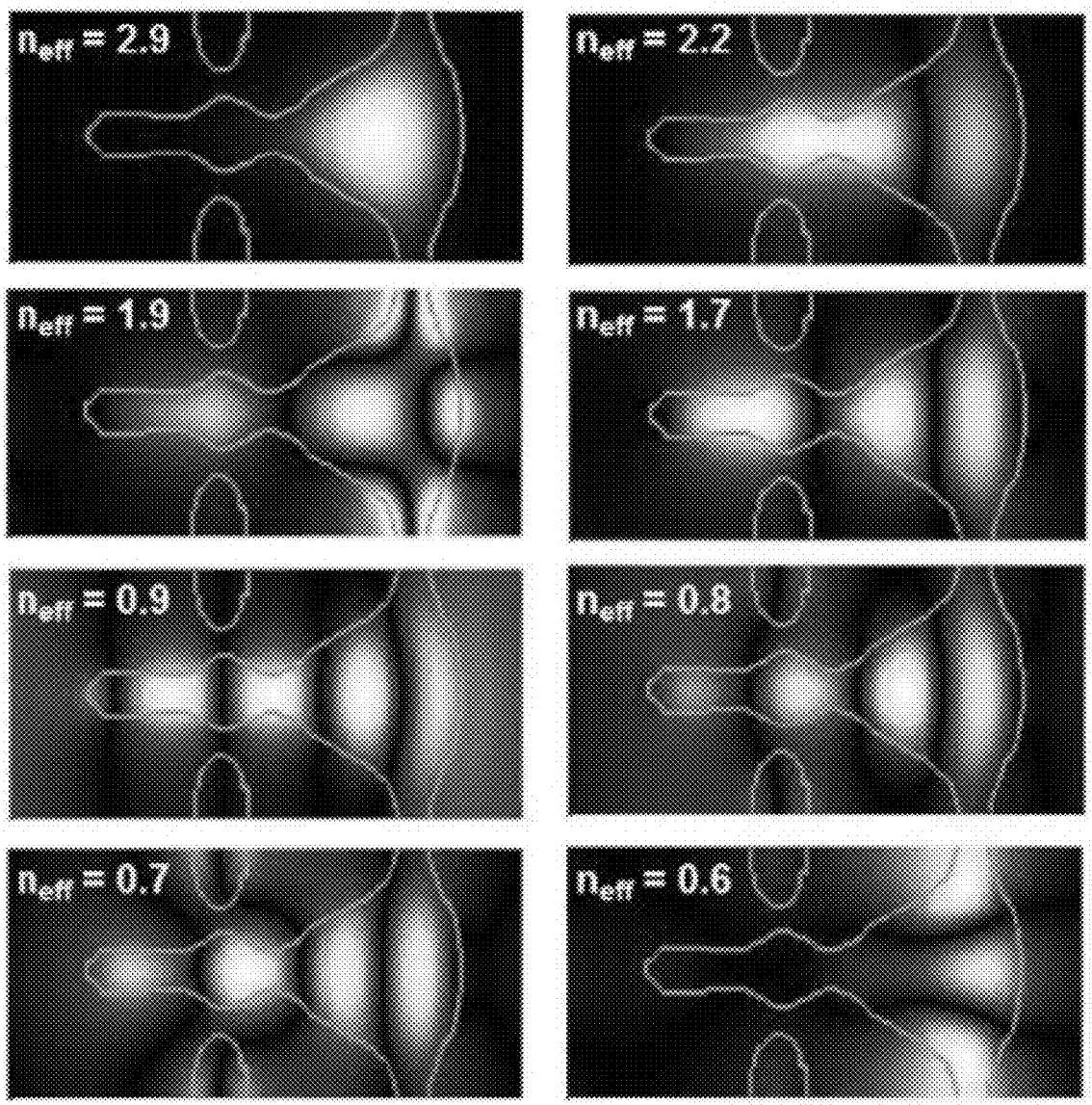
Figure 18C:
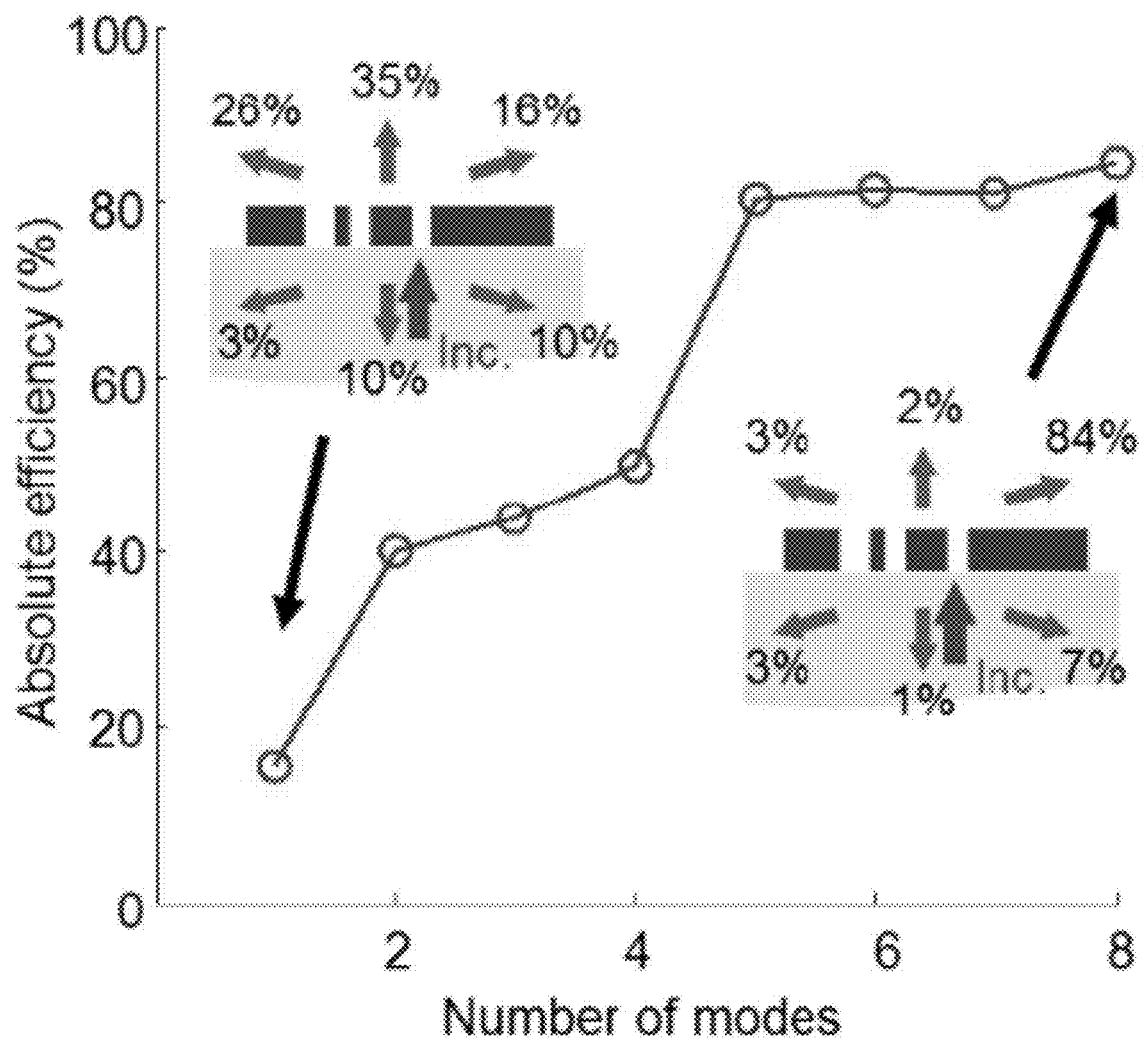

FIGS. 18A-18C illustrate example supermode coupling, in accordance with various embodiments. More-specifically, FIG. 18A illustrates a schematic of mode dynamics in a metagrating device, as described by coupled Bloch mode analysis. The supermodes, labeled $M_1$ to Mn, bounce within the metagrating. When these modes scatter at an interface, they can reflect (thick curved arrows), couple with other modes (thin curved arrows), and couple into diffraction channels (thick straight arrows). Strong beam deflection occurs when there is strong constructive interference between out-coupled modes in the desired diffraction channel (dashed boxes). FIG. 18B illustrates |H| profiles of the supermodes supported by the metagrating designed in FIG. 17B. The incident beam is TM-polarized. The effective mode refractive indices $n_{eff}$ are defined, and outlines of the silicon structure are drawn in green. And, FIG. 18C illustrates an example plot of deflection efficiency as a function of number of modes included in the calculation, using the modes in FIG. 18B. When the number of modes is one, the diffractive optical properties of only the $n_{eff}$=2.9 supermode is included, and only 16% of the light is deflected into the desired grating order (inset, top left). As more modes are included (added in order of decreasing $n_{eff}$), the deflection efficiency of the metagrating gradually increases. When all eight modes are included, the deflection efficiency into the desired channel is 84% (inset, bottom right).

Figure 19A:
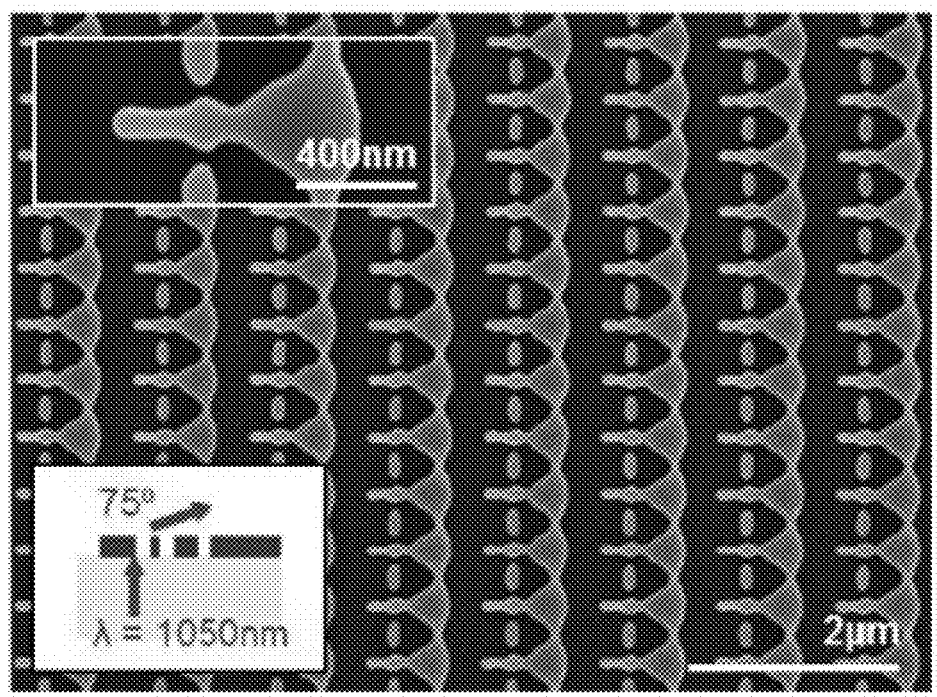
FIGS. 19A-19F illustrate example experimental characterization of metasurfaces, in accordance with various embodiments of the present disclosure.
Figure 19B:
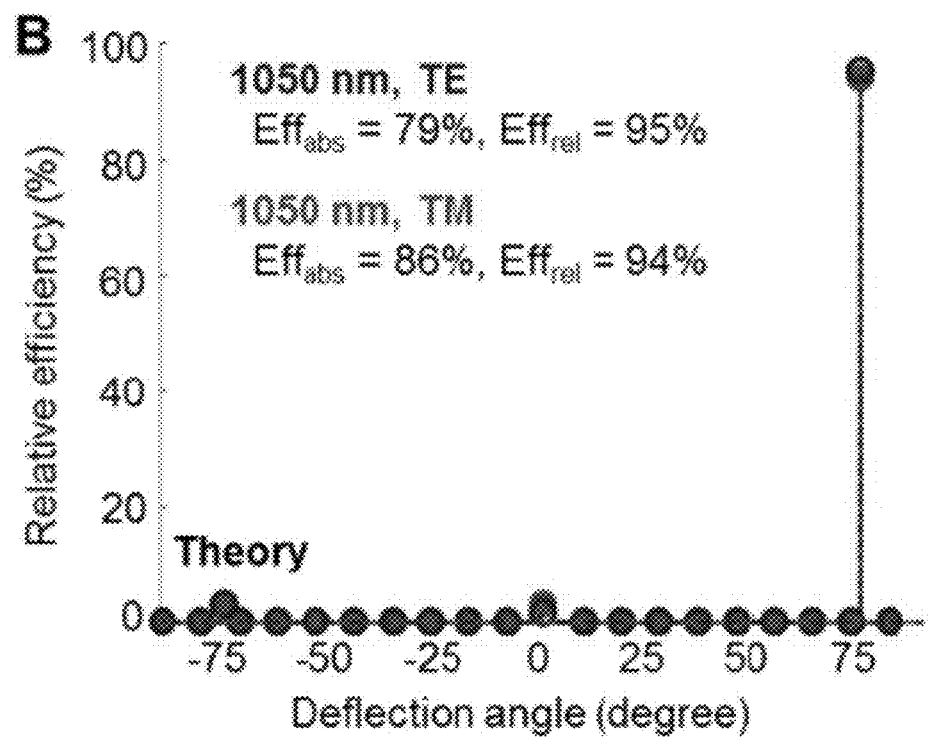
Figure 19C:
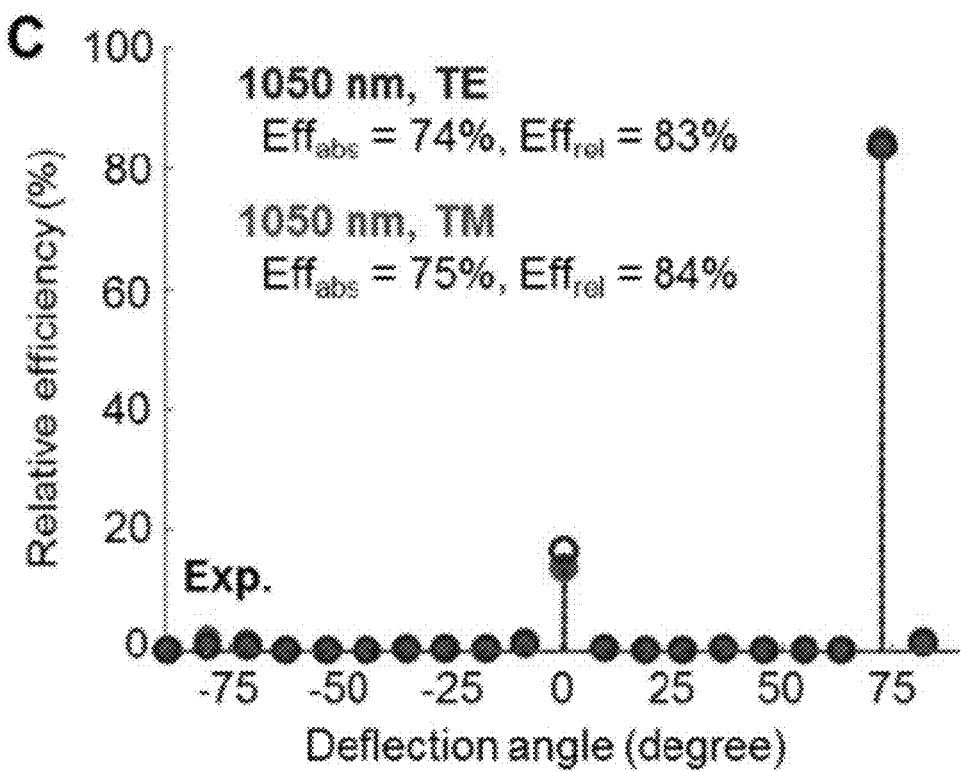
Figure 19D:
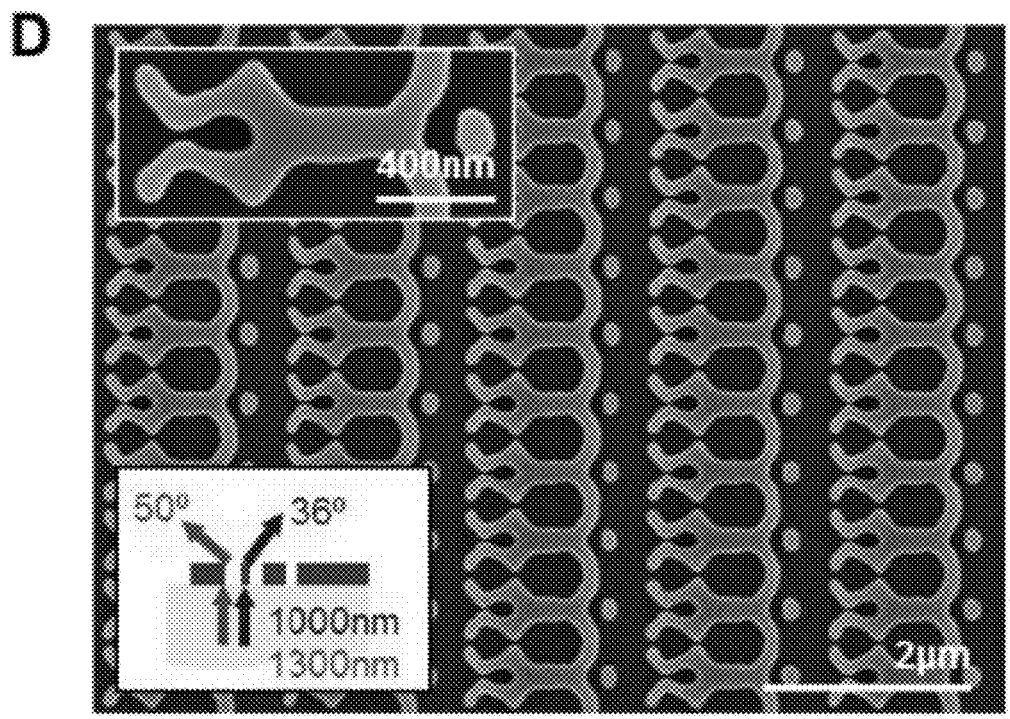
Figure 19E:
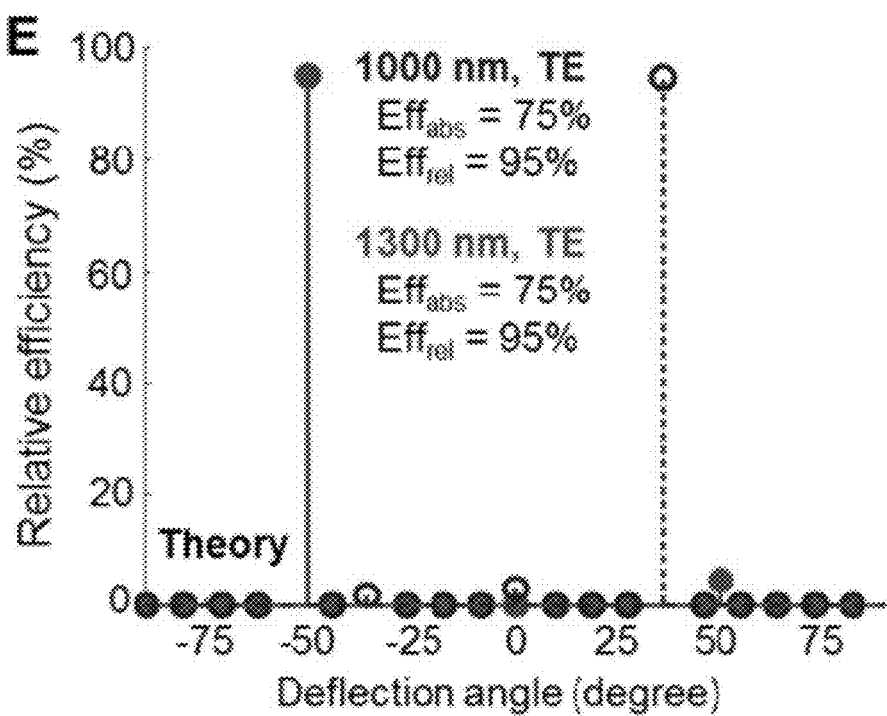
Figure 19F:
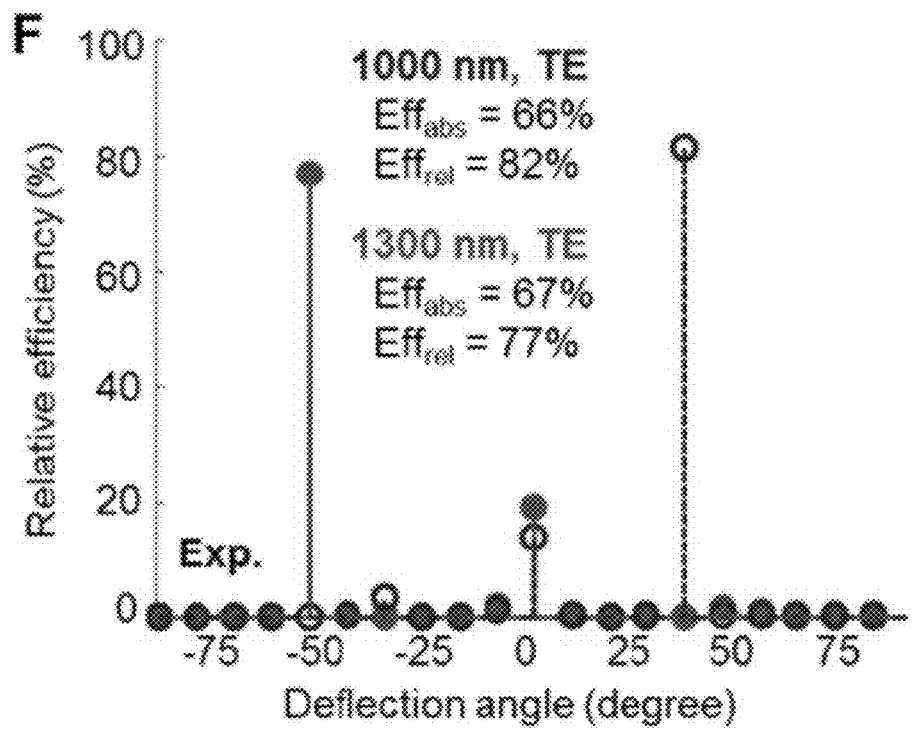

FIGS. 19A-19F illustrate example experimental characterization of metasurfaces, in accordance with various embodiments of the present disclosure. FIG. 19A illustrates a scanning electron microscopy image of the 75 degree beam deflector shown in 210. FIG. 19D illustrates a scanning electron microscopy of a wavelength splitter for normally-incident TE-polarized light. Top insets in each of FIGS. 19A and 19D illustrate magnified images of an individual metagrating unit cell and the bottom insets illustrate a schematic of the metagrating function. FIGS. 19B and 19C illustrate the theoretical and experimental deflection efficiencies of the beam deflector illustrated by FIG. 19A, respectively. Data points are plotted separately for TE- and TM-polarized incidence and are normalized as relative efficiencies. FIGS. 19E and 19F illustrate the theoretical and experimental deflection efficiencies of the wavelength splitter illustrated by FIG. 19D, respectively. Data points are plotted separately for 1000 nm and 1300 nm incident wavelengths and are normalized as relative efficiencies. In all plots, values for absolute and relative efficiency are specified.

Theoretical and experimental deflection efficiencies are summarized in FIG. 19B and FIG. 19C, respectively. The experimental data shows that the device operates with high absolute and relative efficiencies. The absolute deflection efficiencies for TE- and TM-polarized light are measured to be 74% and 75%, respectively, which are close to the theoretical values. The numerical accuracy of the theoretical values, calculated using an RCWA solver, is benchmarked as previously described and can have less than a one percent error. The relative efficiencies for TE- and TM-polarized light are both above 80%, indicating strong preferential coupling to the +1 diffraction channel, compared to the −1 and 0 diffraction channels. The discrepancies between the experimental and theoretical efficiencies are due in part to minor geometric imperfections in the fabricated device.

The above-described methodology can be applied to multi-functional devices. For example, an individual function can be defined to be the deflection of an incident beam with a particular wavelength and polarization into a specific diffraction channel. In an experimental embodiment, a metagrating that deflects 1000 nm TE-polarized light to a +36 degree angle (+1 diffraction channel) and 1300 nm TE-polarized light to a −50 degree angle (−1 diffraction channel) can be designed, fabricated, and characterized. Each of these target functions are incorporated in a straight-forward fashion into the iterative metagrating design procedure, by performing forward and adjoint simulations for each function in each iteration. SEM images and the efficiency plots of the device are displayed in FIGS. 19E-F and show that high-efficiency wavelength splitters can be theoretically designed and experimentally realized. The absolute deflection efficiencies at the two target wavelengths are above 60% and are within 10% of their theoretical values. The relative efficiencies at these wavelengths are near 80%.

In summary, the adjoint-based topology optimization as described herein can be used as an effective method for designing high-performance diffractive optical elements. As a demonstration, in specific experimental embodiments, these design principles are used to construct 75 degree angle silicon metagrating deflectors. These design principles can readily extend to multi-functional devices. A central feature of this approach is the automated specification of a collection of supermodes within the metagratings, which possess non-intuitive spatial profiles and coupling dynamics. Adjoint-based topology optimization in accordance with the present disclosure can be used to design aperiodic, multi-wavelength, multi-functional metasurfaces with performances that operate near the limits of composite nanomaterials engineering.

Figure 20:
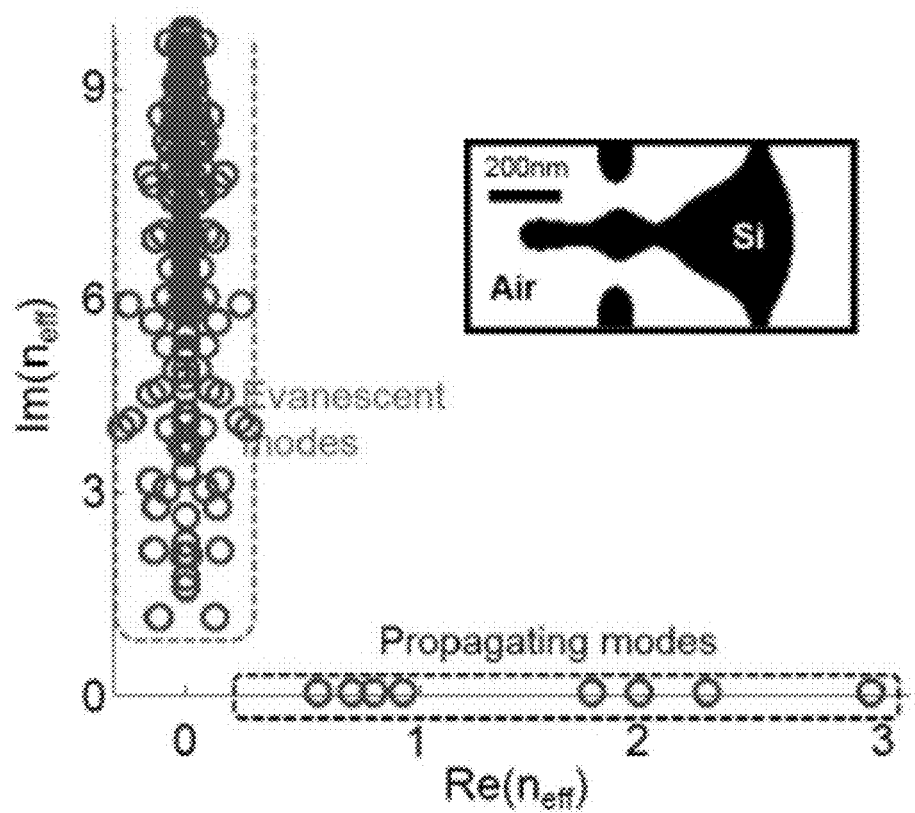
FIG. 20 illustrates an example mode analysis of a 75 degree beam deflector designed using the optimization methodology, in accordance with various embodiments of the present disclosure.

FIG. 20 illustrates an example mode analysis of a 75 degree beam deflector designed using the optimization methodology, in accordance with various embodiments. Specifically, FIG. 20 illustrates the effective indices $n_{eff}$ of the supermodes in the 75 degree deflector for TM polarization. Each circle marker represents a supermode identified by the RCWA solver. There are 8 propagating modes, contained within the dashed-box box, which have negligible Im($n_{eff}$). The field profiles of these modes are plotted in FIG. 18B. The evanescent modes are contained in the open curve. All of these modes have large imaginary parts and decay strongly with a propagation length less than or equal to the metagrating thickness.

Figure 21A:
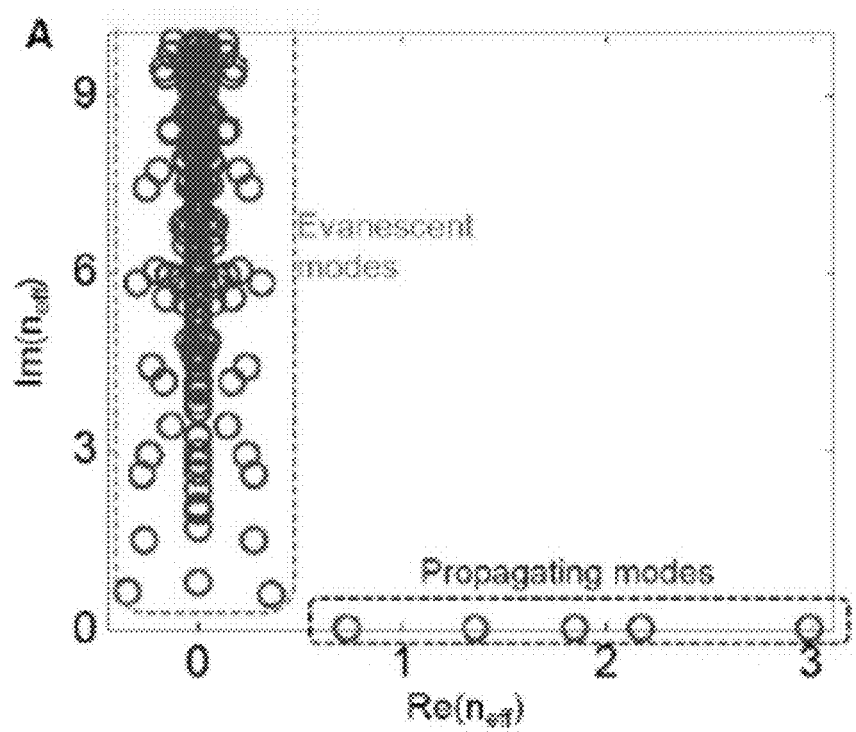
FIGS. 21A-21C illustrate an example coupled Bloch mode analysis of the 75 degree metagrating for TE polarization, in accordance with various embodiments of the present disclosure.
Figure 21C:
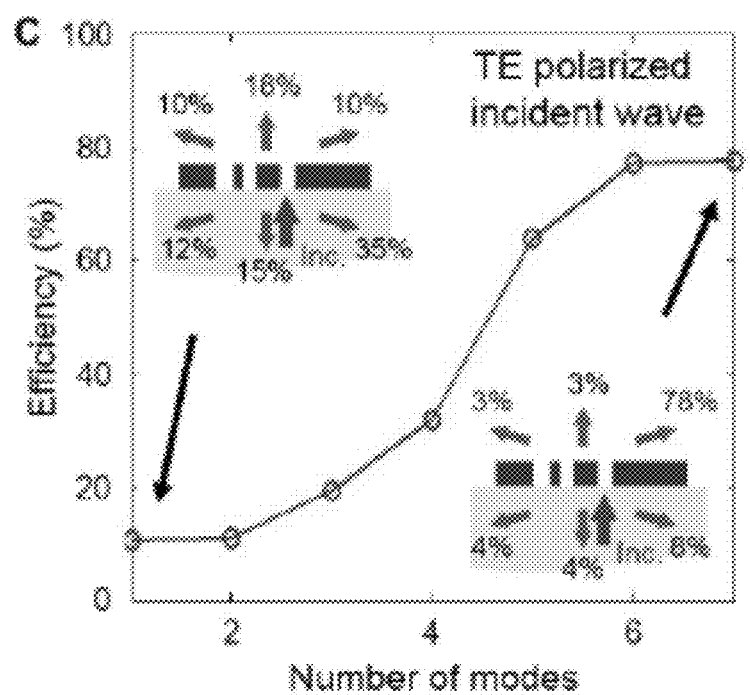
Figure 21B:
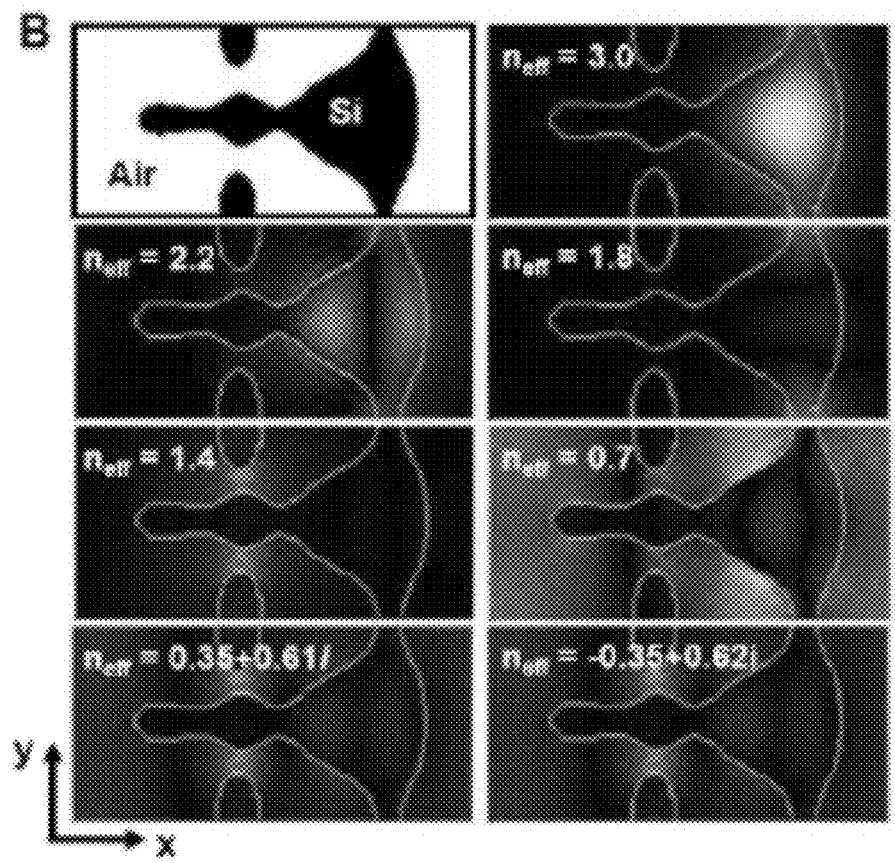

FIGS. 21A-21C illustrate an example coupled Bloch mode analysis of the 75 degree metagrating for TE polarization, in accordance with various embodiments. FIG. 21A illustrates example effective indices $n_{eff}$ of the TE-polarized supermodes of the metagrating, calculated using the RCWA solver. The device supports five propagating modes, contained within the dashed-lined box, and many evanescent modes, contained within the open curve. Most of the evanescent modes have large imaginary parts and strongly decay with a propagation length less than or equal to the metagrating thickness. However, two of the evanescent modes have relatively small imaginary parts and do not strongly decay within the metagrating. These two evanescent modes, together with the five propagating modes, contribute to the deflection efficiency of the metagrating. FIG. 21B illustrates the |E| profiles of the seven supermodes that contribute to the deflection efficiency of the metagrating. The effective mode refractive indices $n_{eff}$ are listed, and outlines of the silicon structure are drawn in green. FIG. 21C illustrates an example plot of deflection efficiency of the simulated metagrating as a function of number of modes included in the grating efficiency calculation, for a TE-polarized incident beam. For one mode, the diffractive optical properties of the supermode with $n_{eff}$=3.0 is included, and only 10% of the light is deflected into the desired grating order (inset, top left). Note that the total efficiency from all diffraction channels adds to 100%. As more modes are included (added in order of decreasing $n_{eff}$), the deflection efficiency of the metagrating gradually increases. When all seven modes are included, the deflection efficiency into the desired channel is 78% (inset, bottom right).

Figure 22A:
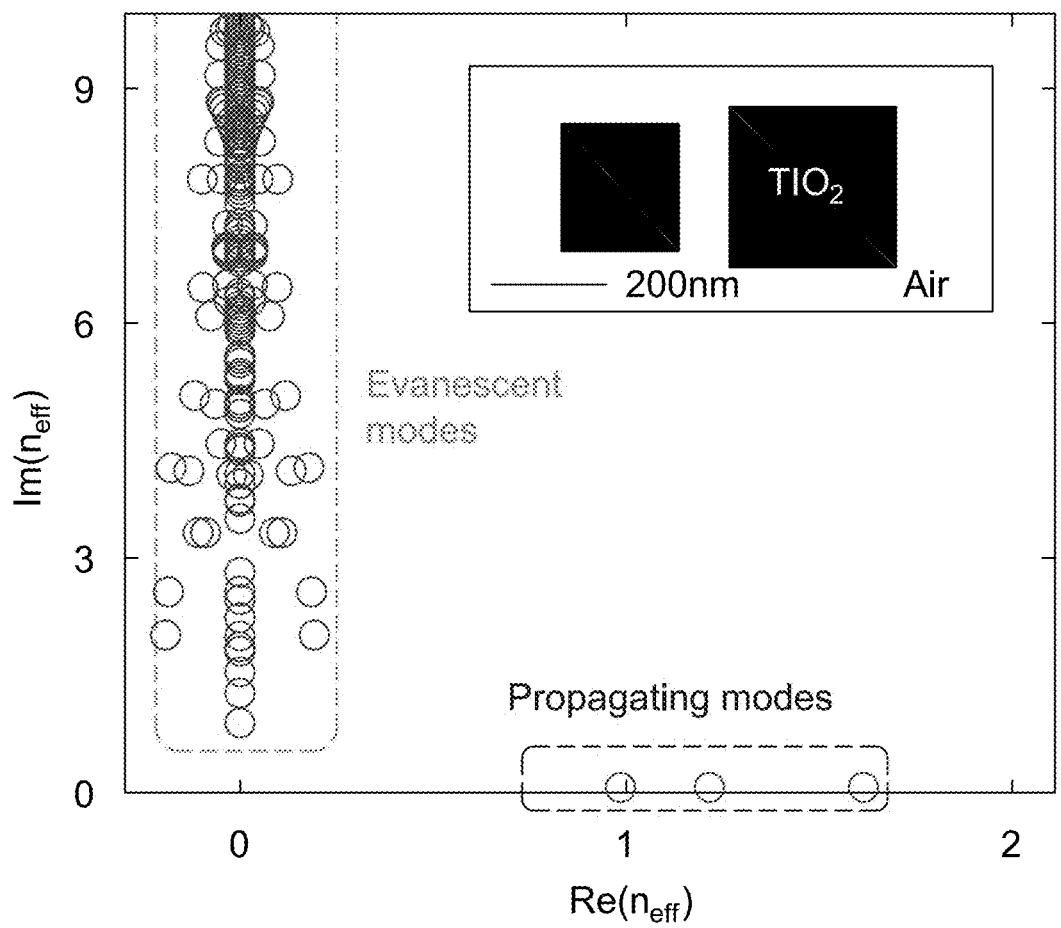
FIGS. 22A-22C illustrate an example coupled Bloch mode analysis of a 75-degree deflector made of two TiO2 square pillars, in accordance with various embodiments of the present disclosure.
Figure 22B:
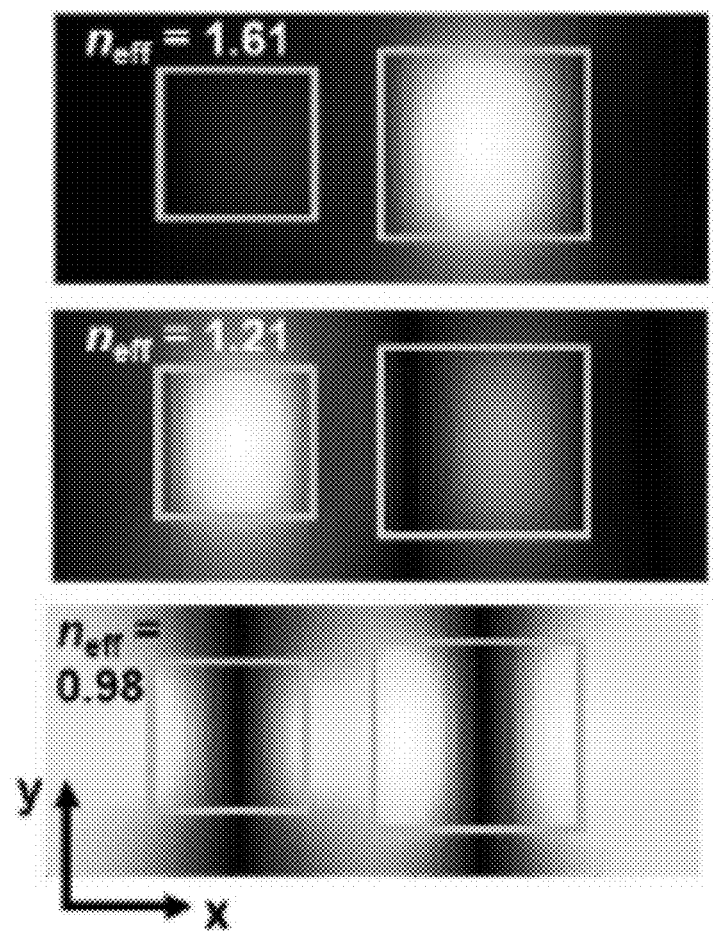
Figure 22C:
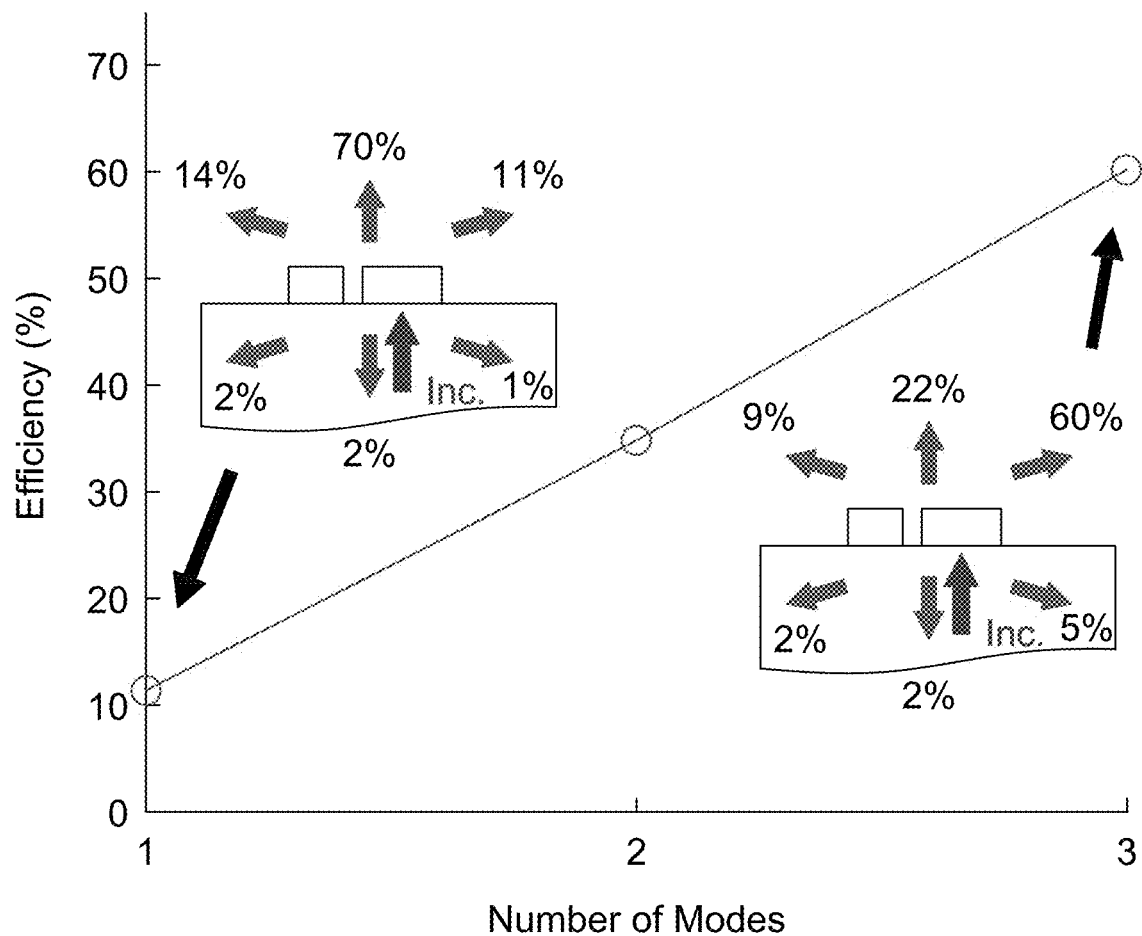

FIGS. 22A-22C illustrates an example coupled Bloch mode analysis of a 75-degree deflector made of two TiO2 square pillars, in accordance with various embodiments. In various embodiments, the modes of degree deflector design can be analyzed based on the effective refractive index concept. This design method is represented by the light blue curve in FIG. 17A. For this large deflection angle, the device period is small, such that there is space for only two TiO2 square pillars (see, FIG. 22A, inset). This two-pillar design supports 60% and 30% absolute efficiencies for TM- and TE-incident polarized waves, respectively. As illustrated by FIG. 22A, coupled Bloch mode analysis for the metagrating for TM-polarized incident light can be performed and results in verifying that the metagrating supports three propagating modes. For example, FIG. 22A illustrates the grating layout and its Bloch modes at TM polarization. FIG. 22B illustrates the |H| of the three propagating modes. FIG. 22C illustrates the deflection efficiency as a function of number of modes. For one mode, the diffractive optical properties of the supermode with $n_{eff}=1.61$ is included, and 11% of the light is deflected into the desired direction (inset, top left). As more modes are included (added in order of decreasing $n_{eff}$), the deflection efficiency of the metagrating gradually increases. When all three modes are accounted for, the deflection efficiency into the desired channel is 60% (inset, bottom right). As shown in FIG. 22B, the field profiles of two of the modes ($n_{eff}=1.61$ and 1.21) are mostly confined in the nanopillars, in agreement with the effective medium approximation approach. The third propagating mode has an effective index $n_{eff}=1$ and its field is mostly distributed in air.

Figure 23A:
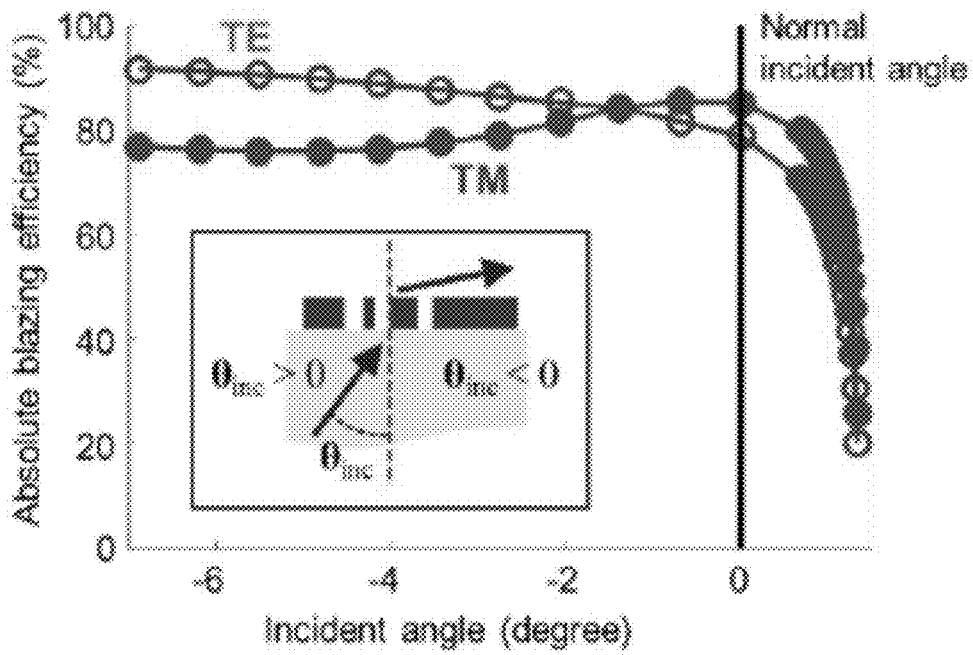
FIGS. 23A-23B illustrate examples of absolute deflection efficiency as a function of different incident angles, in accordance with various embodiments of the present disclosure.
Figure 23B:
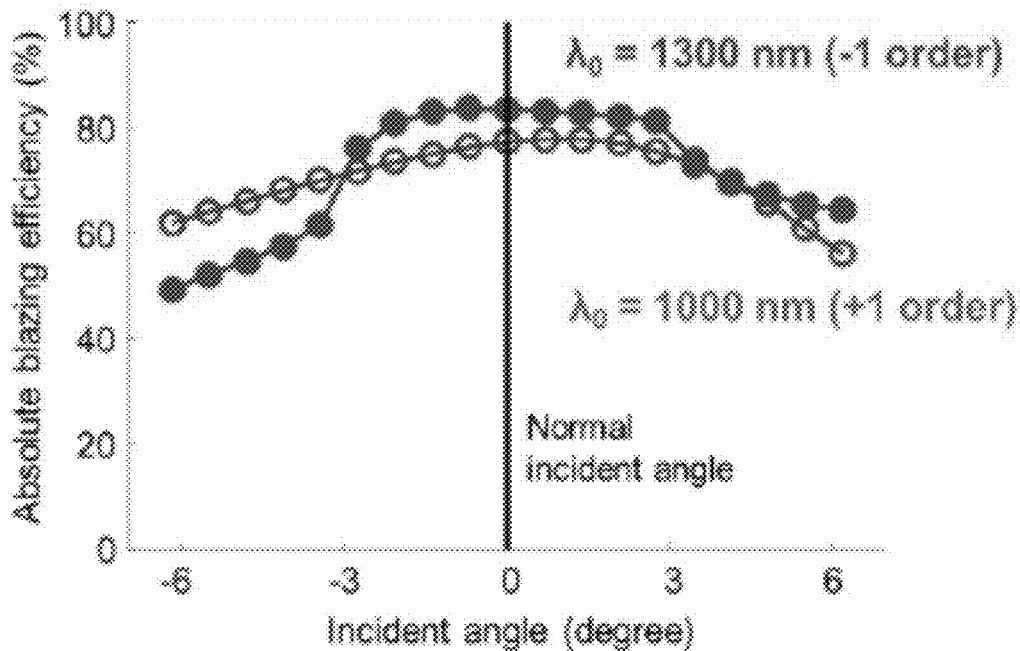

FIGS. 23A-23B illustrates examples of absolute deflection efficiency as a function of different incident angles, in accordance with various embodiments. The impact of variations in angle of incidence on the performance of the 75 degree deflector and wavelength splitter from FIG. 19A and FIG. 19D. These variations in incidence angle arise experimentally because the incident beam is weakly focused on the sample. Plots of simulated absolute efficiency as a function of incidence angle ($\theta_{inc}$) for both devices are displayed in FIG. 23A and FIG. 23B. For the 75 degree metagrating, as illustrated by FIG. 23A, the calculation is performed for $\theta_{inc}$ ranging from −7 to +1.3 degrees from the glass substrate, which corresponds to −10 to +2 degrees in air. The +2 degree angle is a limit that arises from the cutoff of the diffracted beam at larger incident angles. For the wavelength splitter, as illustrated by FIG. 23B, the incident angles range from −7 to +7 degrees in glass substrate, which corresponds to −10 to +10 degrees in air. Experimentally, the incident beam has incident angles that range from −1 to +1 degrees in air. As such, the variations in incidence angle may minimally impact the efficiencies of resulting devices.

Figure 24A:
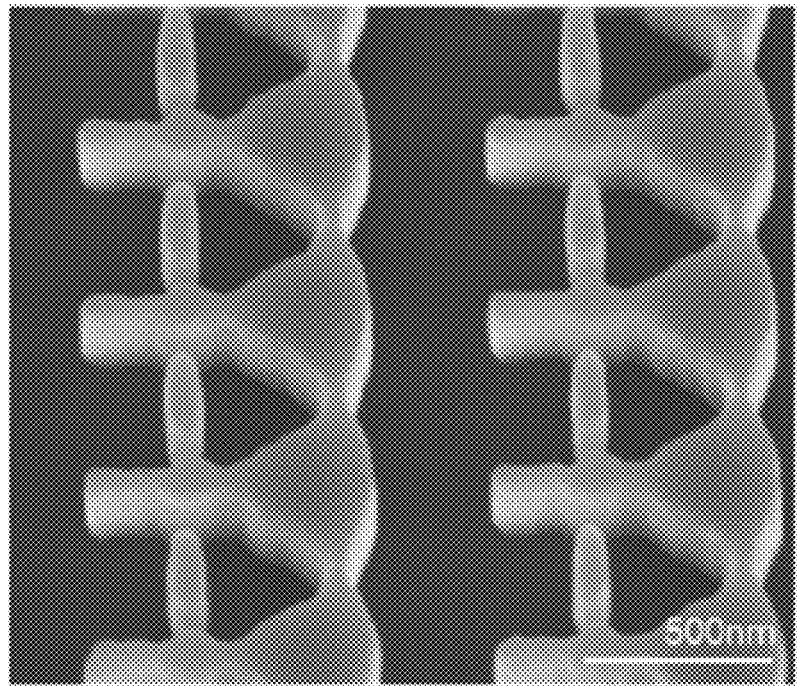
FIGS. 24A-24B illustrate examples of tilted scanning electron microscopy images of metagratings, in accordance with various embodiments of the present disclosure.
Figure 24B:
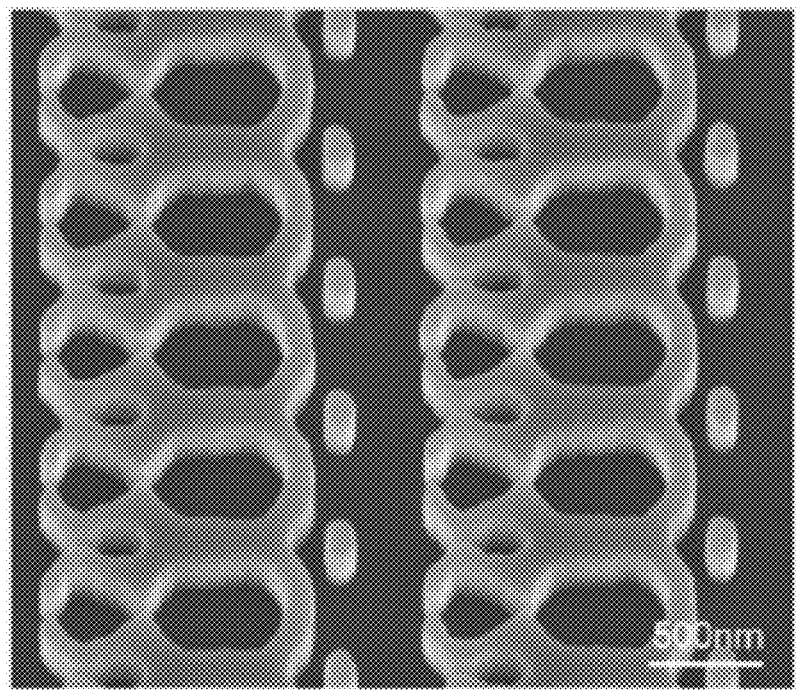

FIGS. 24A-24B illustrate examples of tilted scanning electron microscopy images of metagratings, in accordance with various embodiments. For example, FIG. 24A illustrates an image of a 75 degree beam deflector (e.g., FIG. 19A) and FIG. 24B illustrates an image of a wavelength splitter (e.g., FIG. 19D). The sidewall profiles of the devices can be vertical.

Figure 25A:
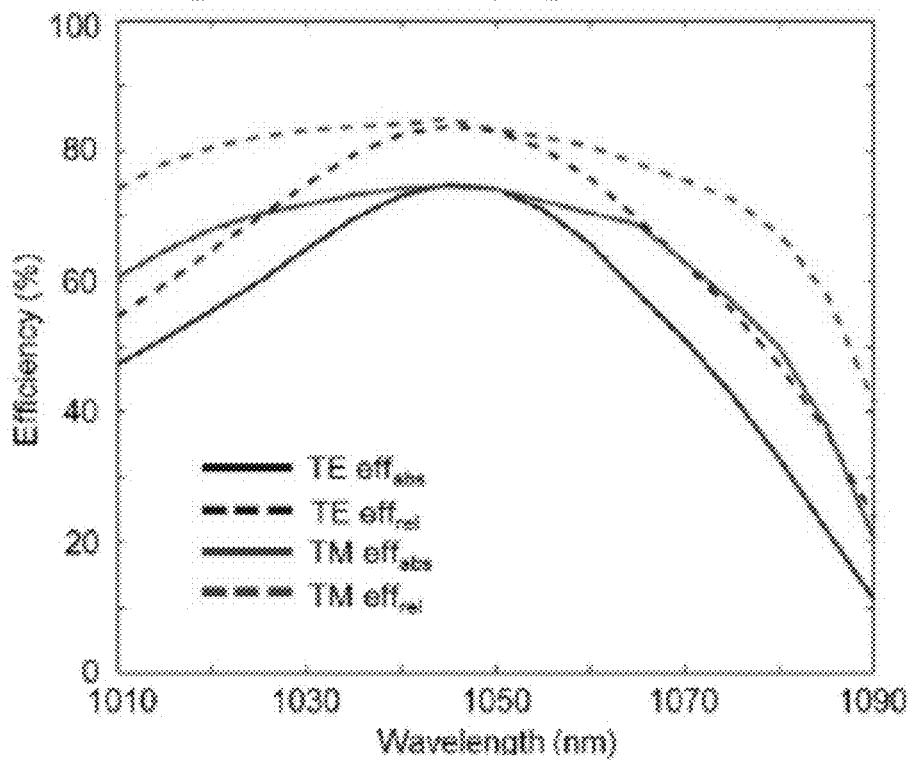
FIGS. 25A-25B illustrate example plots of experimental metagrating efficiencies as a function of incident wavelength of metagratings, in accordance with various embodiments of the present disclosure.
Figure 25B:
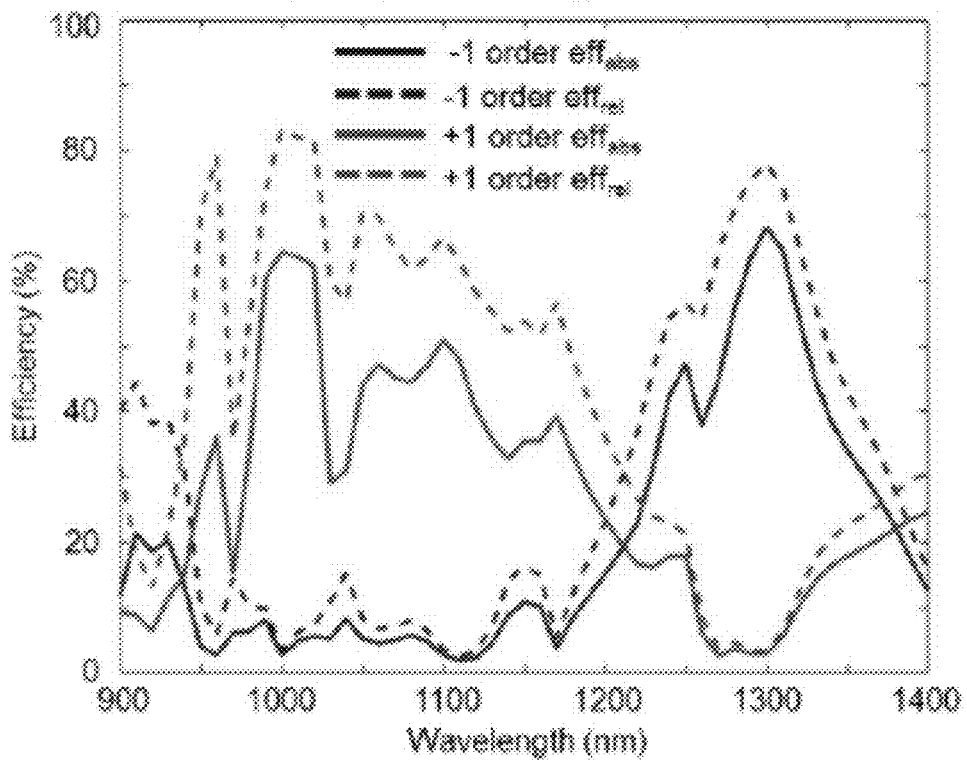

FIGS. 25A-25B illustrate example plots of experimental metagrating efficiencies as a function of incident wavelength of metagratings, in accordance with various embodiments. FIG. 25A illustrates an example plot of a 75 degree beam deflector (e.g., FIG. 19A) and FIG. 25B illustrates an example plot of a wavelength splitter (e.g., FIG. 19D).

Figure 26A:
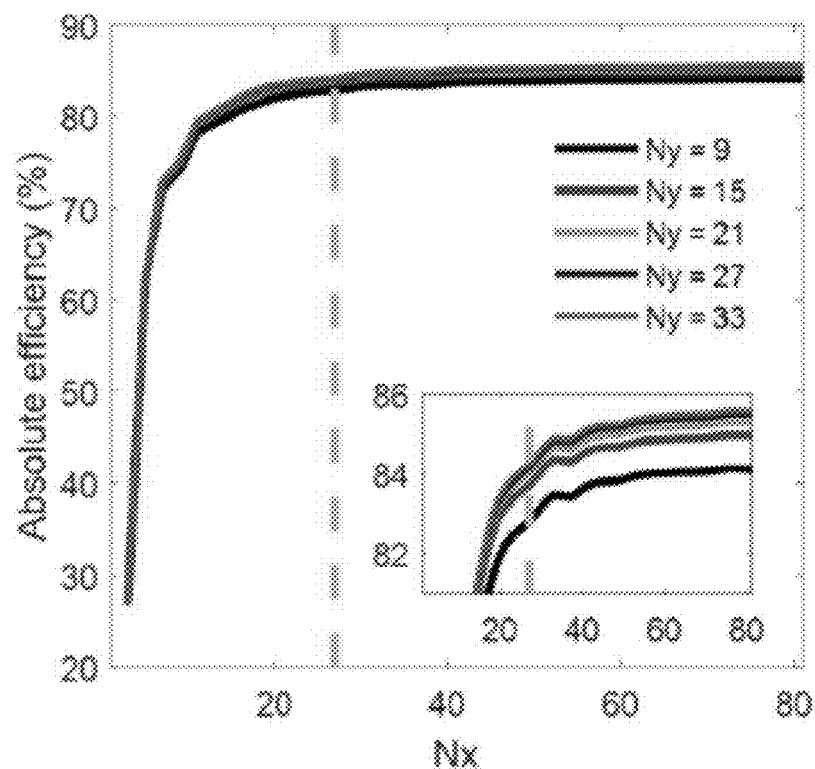
FIGS. 26A-26B illustrate example plots of convergence of metagratings, in accordance with various embodiments of the present disclosure.
Figure 26B:
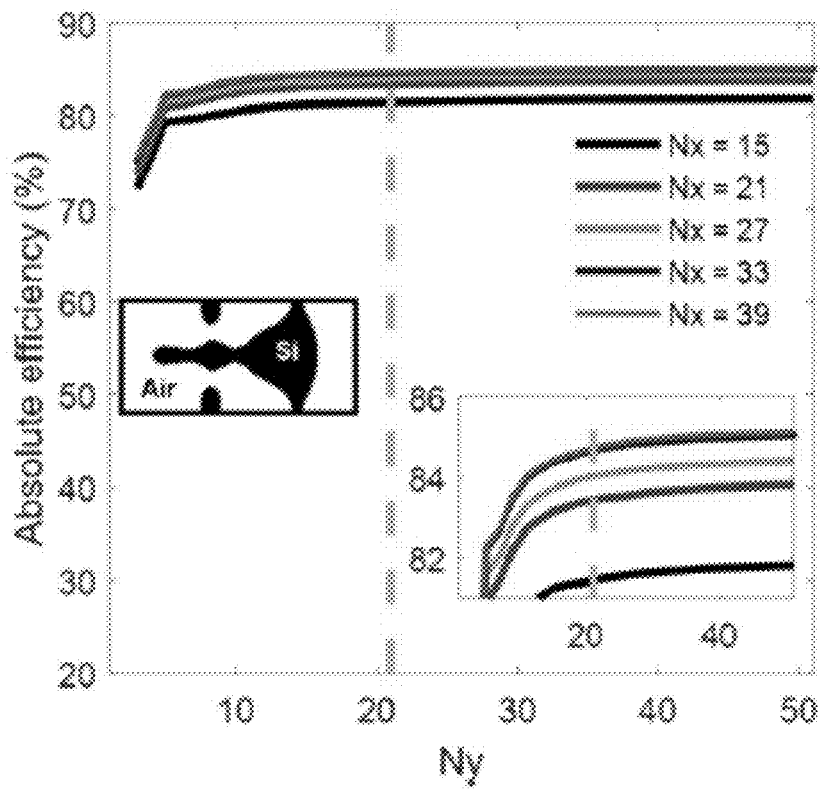

FIGS. 26A-26B illustrate example plots of convergence of metagratings, in accordance with various embodiments. The convergence of the rigorous coupled-wave analysis (RCWA) simulations can be analyzed. For example, the open-source RCWA code Reticolo can be used as the electromagnetic solver for the optimization process, which Fourier expands the electromagnetic fields in the system. The numerical inaccuracies of RCWA mainly arise due to inevitable truncation of these Fourier series in the simulation.

To evaluate the accuracy of the numerical results, the 75 degree blazed metagrating can be simulated with progressively increasing numbers ($N_x$ or $N_y$) of Fourier harmonics in the computation. Here, the Fourier series goes from $-(N-1)/2$ to $+(N-1)/2$ for each axis. FIGS. 26A-26B show the absolute deflection efficiencies of the metagrating with differing numbers of Fourier harmonics. For example, FIG. 26A illustrates example results for varying $N_x$ values with several fixed $N_y$ values and FIG. 26B illustrates example results for varying $N_y$ values with several fixed $N_x$ values. The vertical cyan lines mark the $N_x$ or $N_y$ values used in the optimization. The inset in FIG. 26B shows the metagrating layout under test. The number of Fourier harmonics can be fixed for one axis and vary the number of Fourier harmonics for the other axis. FIG. 26A show the convergence tests of absolute efficiency for varying $N_x$ values with several fixed $N_y$ values. When $N_y$ is large enough ($N_y>15$), all the calculations converge to within 0.5% of the same value. When $N_y>15$ and $N_x=27$, all of the calculations produce values that are within 1% of the accurate converged value. Similarly, the simulation results shown in FIG. 26B indicate that when $N_x>21$ and $N_y=21$, all of the calculations produce values that are within 1% of the accurate converged value. Therefore, simulations with $N_x=27$ and $N_y=21$ produce results with the numerical accuracies within around one percent, and these values can be used for the optimization process (e.g., the reverse design procedure).

Figure 27:
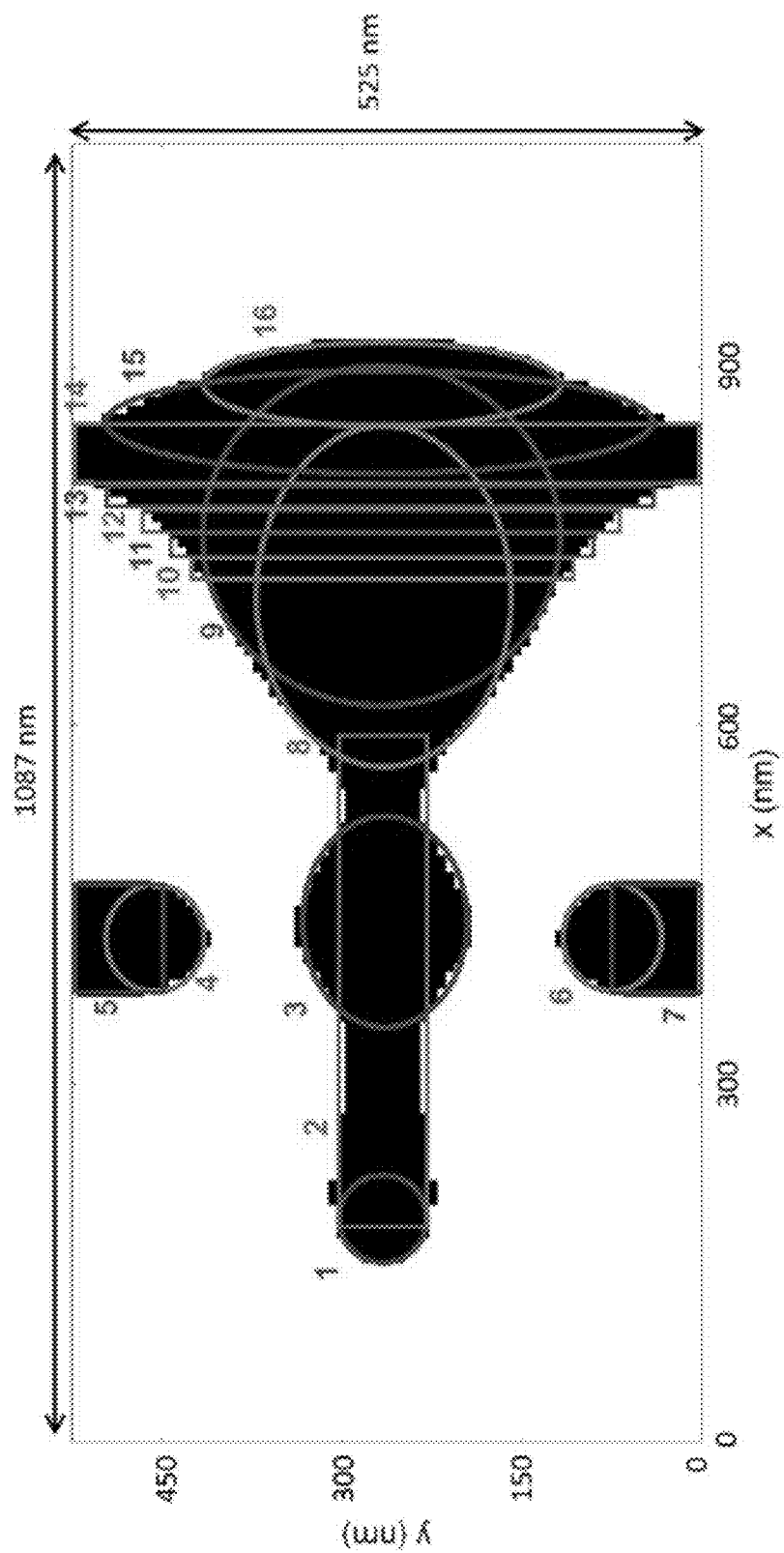
FIG. 27 illustrates an example top view of single period of a 75 degree metagrating layout, in accordance with various embodiments of the present disclosure.

FIG. 27 illustrates an example top view of single period of a 75 degree metagrating layout, in accordance with various embodiments. The 75 degree deflector can be further analyzed using finite-element-method (COMSOL) calculations. COMSOL is an established, commercial software package that is suitable for modeling curvilinear geometries. The curvilinear grating geometry can be approximated using a combination of simple geometric shapes and combine them using the "booleans and partitions" operation in COMSOL. The elementary geometries are delimited by green and red lines in FIG. 27. The precise geometric dimensions of these shapes are recorded in Table 2. The corners of all rectangles are rounded and have a radius of curvature of 8 nm.

The deflection efficiencies of a metagrating of this approximate geometry are calculated using COMSOL to be 84% and 79% for TM and TE polarizations, respectively, for a normally incident planewave through the glass substrate. These values are in agreement with the RCWA calculations of the metagrating (85% and 79% for TM and TE polarizations, respectively). This agreement between COMSOL and RCWA simulations is another indication that RCWA can simulate the curvilinear, topology-optimized geometries with high accuracy.

As illustrated by FIG. 27, the layout shown in black is used in RCWA simulations. The approximate layout used in COMSOL consists of a combination of sixteen ellipses and rectangles, which are shown here outlined by red and green curves. The dimensions of the grating period along x and y are 1087 nm and 525 nm, respectively.

TABLE 2

| Geometry | Size (nm) | Center Position (nm) |
| --- | --- | --- |
| 1: ellipse | Axis length 74 × 74 | Axis length 74 × 74 |
| 2: rectangle | Axis length 74 × 74 | Axis length 74 × 74 |
| 3: ellipse | Axis length 74 × 74 | Axis length 74 × 74 |
| 4: ellipse | Axis Length 91 × 82.5 | (419, 457.5) |
| 5: rectangle | Side Length 91 × 74 | (419, 488) |
| 6: ellipse | Axis Length 91 × 82.5 | (419, 67.5) |
| 7: rectangle | Side Length 91 × 74 | (419, 37) |
| 8: ellipse | Axis Length 285 × 213 | (710, 262.5) |
| 9: ellipse | Axis Length 285 × 299 | (758.5, 262.5) |
| 10: rectangle | Side Length 18 × 320 | (731, 262.5) |
| 11: rectangle | Side Length 19 × 355 | (749, 262.5) |
| 12: rectangle | Side Length 22 × 399 | (768, 262.5) |
| 13: rectangle | Side Length 20 × 458.5 | (788, 262.5) |
| 14: rectangle | Side Length 52 × 525 | (824, 262.5) |
| 15: ellipse | Axis Length 85.5 × 458.5 | (854.5, 262.5) |
| 16: ellipse | Axis Length 71 × 299 | (884, 262.5) |

Figure 28:
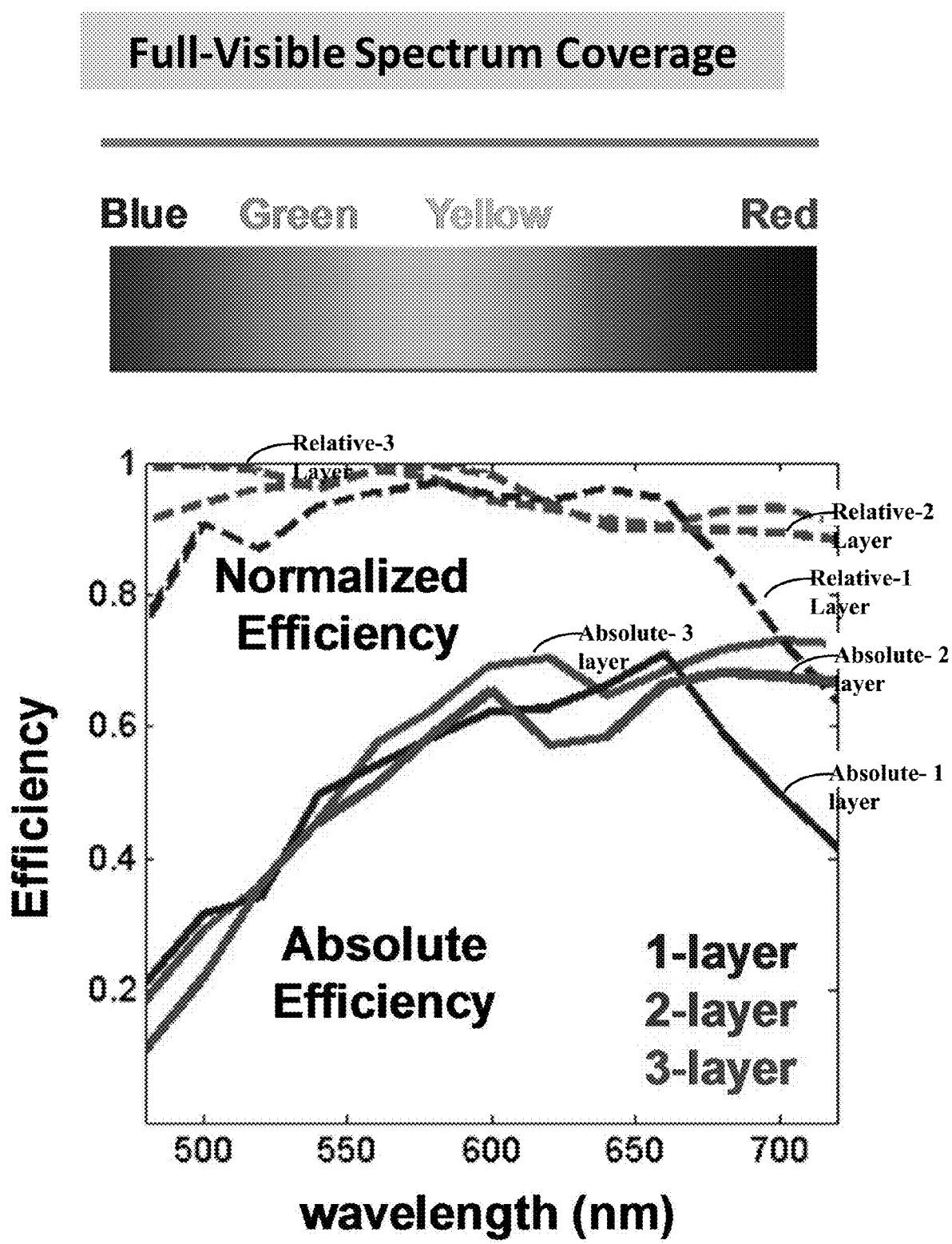
FIG. 28 illustrates the normalized and absolute efficiencies of a device component with one layer, two layers, and three layers of geometric structures across a broadband spectrum, in accordance with various embodiments.

FIG. 28 illustrates the normalized and absolute efficiencies of a device component with one layer, two layers, and three layers of geometric structures across a broadband spectrum. As illustrated, surprisingly, the consistency increases when the number of layers increases.

Figure 29:
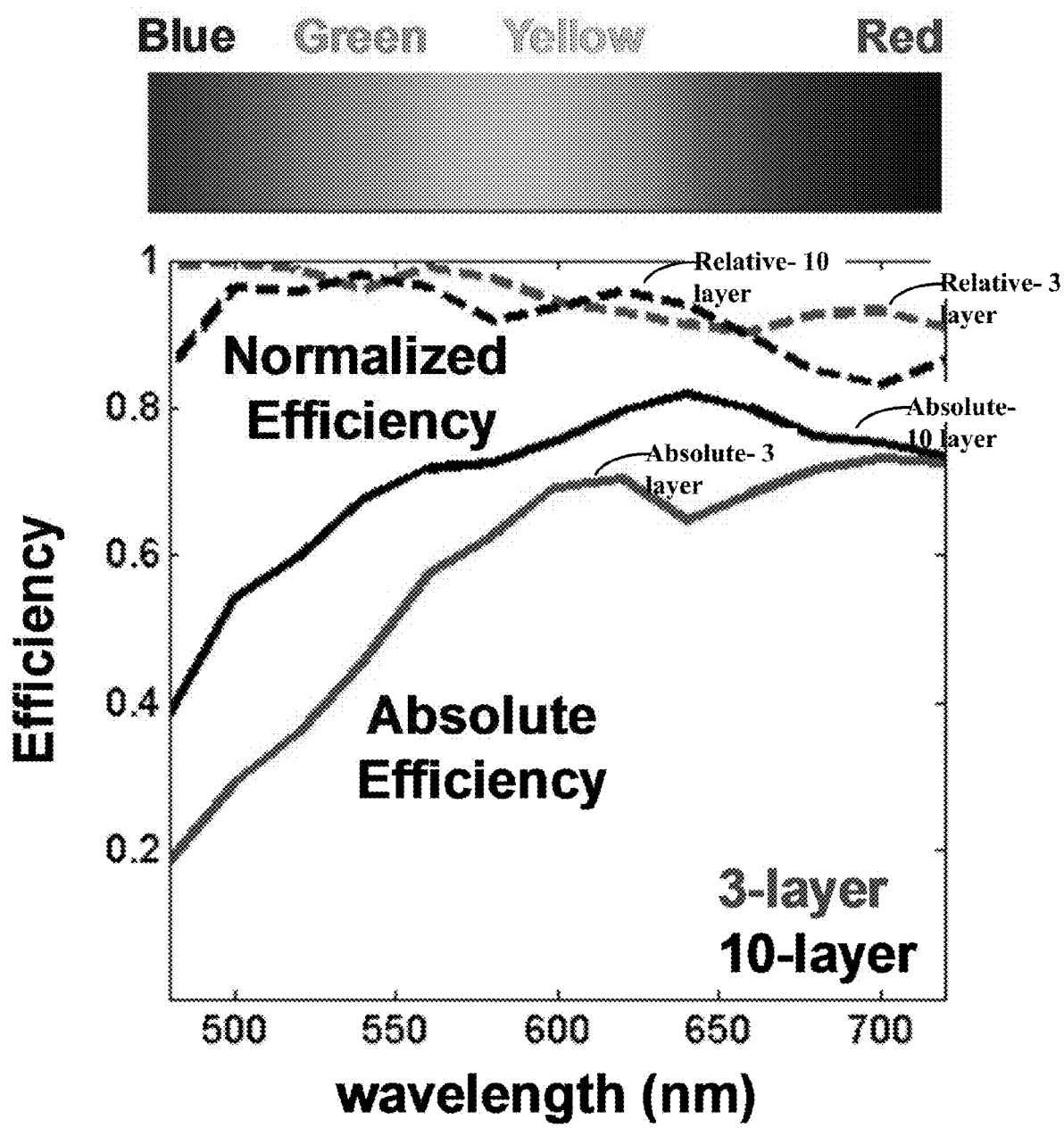
FIG. 29 illustrates the normalized and absolute efficiencies of a device component with three layers and ten layers of geometric structures across a broadband spectrum, in accordance with various embodiments.

FIG. 29 illustrates the normalized and absolute efficiencies of a device component with three layers of geometric structures and another device component with ten layers of geometric structures across a broadband spectrum. In various embodiments, with increasing layers, the thickness of each layer is reduced as the spatial tolerance of silicon is ten nm. As illustrated, the normalized efficiency is relatively the same for three layers versus ten layers. But, surprisingly, the absolute efficiency increases for ten layers versus three layers of geometric structures (given an expectation that the absolute efficiency would decrease with the number of layers as silicon, such as poly silicon (e.g., is lossey).

FIGS. 30A-30B illustrate examples of efficiency of a two layer device component as designed with two thickness. For example, FIG. 30A illustrates an absolute efficiency and FIG. 30B illustrates a relative efficiency across a broadband spectrum of 450-750 nm.

Figure 31A:
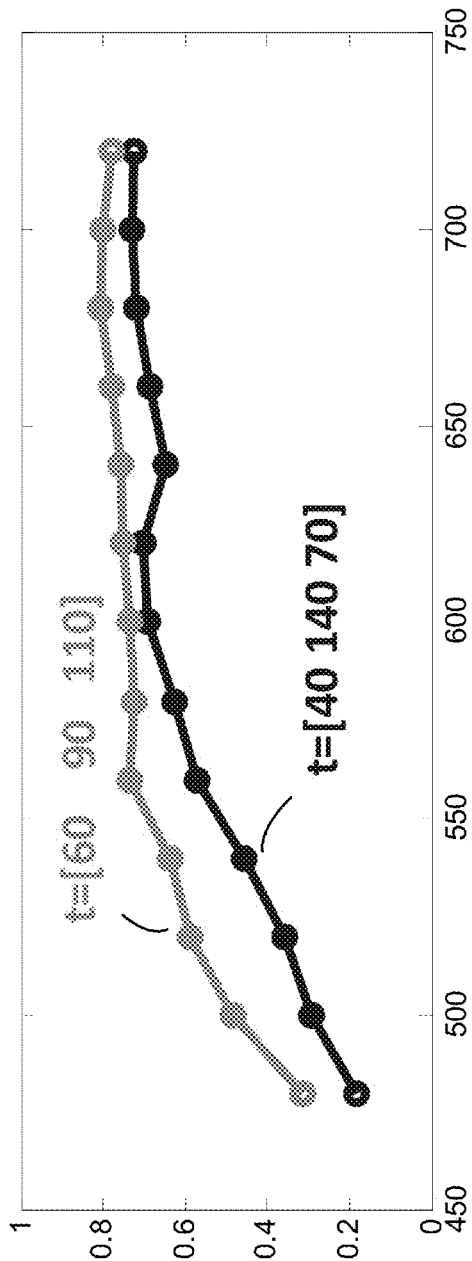
FIGS. 31A-31B illustrate example efficiency of a three layer device component as designed with different thicknesses, in accordance with various embodiments.
Figure 31B:
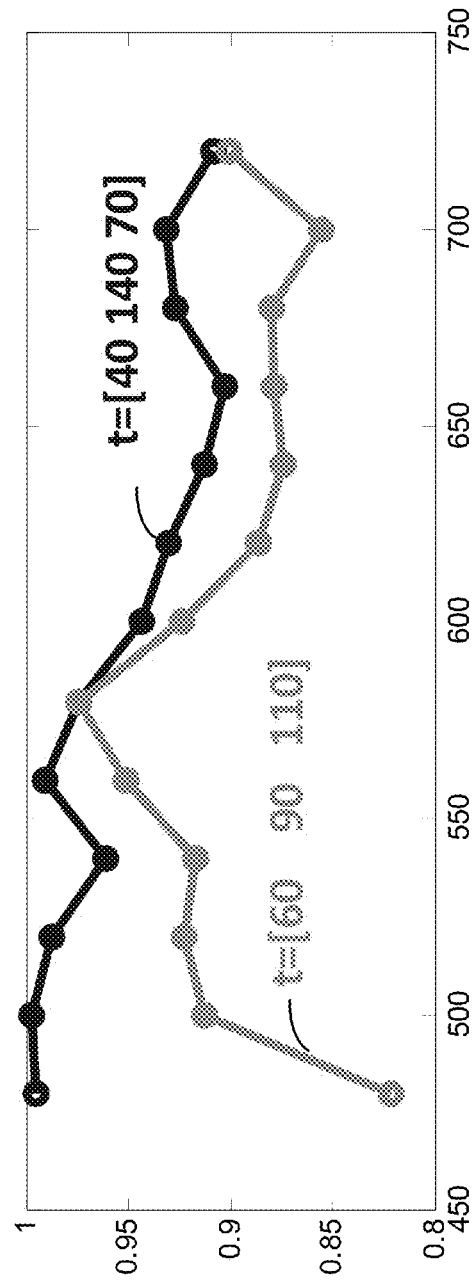

FIGS. 31A-31B illustrate examples of efficiency of a three layer device component as designed with different thicknesses. For example, FIG. 31A illustrates an absolute efficiency and FIG. 31B illustrates a relative efficiency across a broadband spectrum of 450-750 nm.

In various specific experimental embodiments, a compact hyperspectral imaging platform that is compatible with existing imaging system architectures is fabricated. To fabricate a periodic or aperiodic apparatus and/or device comprising a plurality of device components (e.g., a metasurface), a series of wafer bonding, alignment, patterning, etching, and planarization steps are used to construct the device layer by layer. For example, in some embodiments, the device components (e.g., metasurface elements) are integrated directly onto the facet of a commercial CCD platform, together with microlenses and filters, to complete optical hardware system. To automate data processing and reconstruction in a fast manner, a custom FPGA electronic backend is used.

Figures 33A, 33B, 33C:
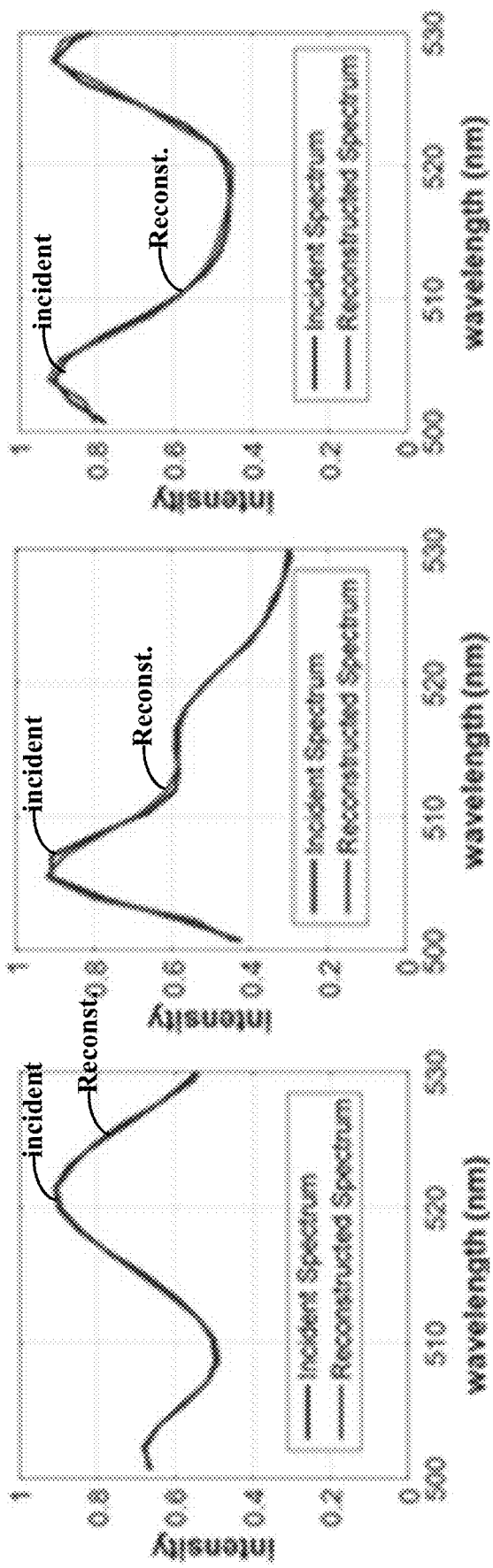
FIGS. 33A-33C illustrate an example reconstructed spectra of various incident waveforms as generated using the high resolution hyperspectral imaging device of FIG. 14A, in accordance with various embodiments.

FIG. 32A-32B illustrate an example hyperspectral imaging platform that includes a periodic or aperiodic apparatus and/or device and optical properties of each device components of the device across a broadband spectrum. The device of the hyperspectral imaging platform is developed to enhance the spectral resolution in hyperspectral imaging systems. By specifying quasi-random device components (e.g., metasurface filters) with highly dispersive optical responses over each pixel as illustrated by FIG. 32A, the incident light field is computationally reconstructed and recover edits detailed spectrum (e.g., as illustrated by FIG. 33A-33C). These filters are designed to take advantage of spectral sparsity (e.g., there are no sharp spectral peaks in ambient images).

As illustrated by FIG. 32A, each pixel is covered with a different filter using the periodic or aperiodic apparatus and/or devices. Light entering the pixel of the imaging device, such as a conventional CCD camera, is filtered using the aperiodic apparatus/device with unique and random-like spectral characteristics. Light with in a particular wavelength illuminates a particular row of the aperiodic apparatus corresponding to a row of pixels of the imaging device, as illustrated by the inset of FIG. 32A (e.g., the row of pixels 1423, 1424, 1425, 1426, 1427, 1428, 1429, 1430). For example, FIG. 32B illustrates a row of the periodic or aperiodic apparatus that corresponds to light in the 500-530 band (e.g., green). Each pixel (e.g., 1-8) corresponds with a unique layout of geometric structures resulting in optimized transmission for a particular wavelength range. FIG. 32B illustrates the device components 1433, 1434, 1435, 1436, 1437, 1438, 1439, 1430 and respective efficiency across a wavelength range that corresponds with the row of pixels illustrated in the inset of FIG. 32A.

FIG. 33A-33C illustrate an example reconstructed spectra of various incident waveforms as generated using the high resolution hyperspectral imaging device of FIG. 32A.

Figure 34:
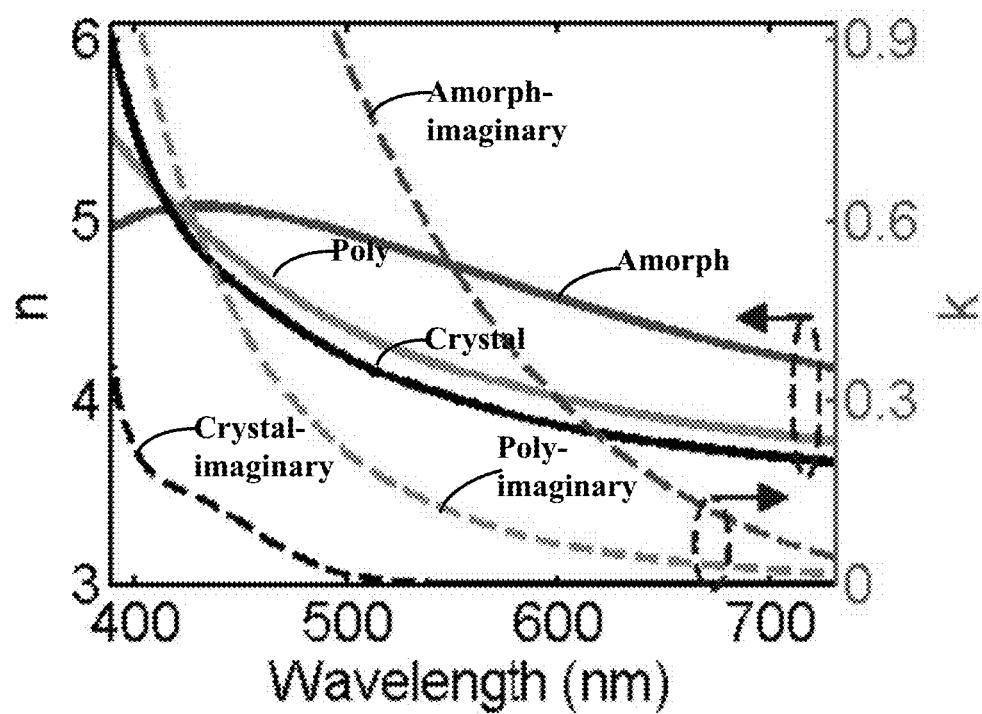
FIG. 34 illustrates a plot of different phases of silicon, in accordance with various embodiments.

FIG. 34 illustrates a plot of different phases of silicon, in accordance with various embodiments. As illustrated, crystalline silicon has superior optical properties at processing blue light as compared to polycrystalline and amorphous silicon. FIG. 34 illustrates the refractive indices for crystalline, polycrystalline, and amorphous silicon. The solid and dashed lines represent the real and imaginary parts, respectively, of the refractive index. For each material, the real part of the refractive indices is high through the visible spectrum and yields the possibility of strong scattering in geometric structures that are sub-wavelength in scale.

However, the imaginary parts of the refractive indices are different. Amorphous silicon has a pronounced absorption caused by the disorder-induced broadening of its bands, which limits its use in near-infrared wavelengths. Polycrystalline silicon has a moderate amount of absorption due to the material disorder at grain boundaries. Crystalline silicon, by contrast, does not have structure disorder which results in low absorption below the direct bandgap near 3.4 eV, which allows the material to be effective as a geometric structure material across the full visible spectrum. Further, crystalline silicon is capable of being etched into geometric structures, such as devices operating at blue wavelengths.

In some experimental embodiments, a scattering and absorption of silicon ridges are observed. Ridges with rectangular cross-sections are used in nano-optical engineering and in individual and coupled arrangements to tailor optical responses for metasurfaces. To characterize the different loss channels in the system, the quasi-normal modes of silicon ridges with square cross-sections of varying dimensions are calculated. The calculations provide a modal description of the geometric structures that comprise dispersive materials. By changing the cross-sectional dimensions of the ridges, the fundamental mode resonance tunes across the full visible spectrum from 400 nm to 700 nm. The excitation source is a plane wave with normal incidence to the ridges, and two incident polarizations are analyzed: TM-polarization light, in which the incident magnetic field is oriented parallel to the length of the ridge, and TE-polarization light, in which the incident electric field is oriented parallel to the length of the ridge. Calculations are performed for amorphous, polycrystalline, and crystalline silicon using an ellipsometry-measured refractive index values illustrated by FIG. 34. As references, calculations are also performed for "ideal silicon," which is a non-physical material with the real refractive index of crystalline silicon but no imaginary part.

FIGS. 35A-35D illustrate a theoretical analysis of the scattering properties of silicon ridges. The normalized scattering cross sections ($\sigma_{scat}$) of ridges of differing size and composition at their resonance wavelengths are plotted for TE and TM-polarizations incidence in FIG. 35A and FIG. 35C, respectively. $\sigma_{scat}$ is the total scattering cross section divided by the geometric cross section of the ridge. Further, the scattering efficiency is plotted, defined as the scattering cross section divided by the extinction cross section, for different ridges and excitation conditions in FIG. 35B and FIG. 35D. Starting with TE-polarization, the ideal silicon curve represents an approximate upper boundary for the scattering magnitudes of silicon ridges (FIG. 35A) and has scattering efficiency of one-hundred percent since the material is lossless (FIG. 35B). Its $\sigma_{scat}$ increases together with the refractive index as the mode resonance wavelength decreases, as dictated by Mie theory.

The $\sigma_{scat}$ of crystalline silicon follows that of ideal silicon for wavelengths longer than 500 nm, which is due to its (nearly negligible) imaginary refractive index within this wavelength range (see, FIG. 34). In various embodiments, crystalline silicon represents a nearly ideal lossless material at green and red wavelengths. Between 400 nm and 500 nm, the absorption in crystalline silicon becomes non-negligible and its $\sigma_{scat}$ deviates from that of ideal silicon. Its scattering efficiency gradually reduces within this wavelength range, down to ninety percent at 400 nm. While this represents a reduction in efficiency, it is still relatively high. The mode is visualized in the inset of FIG. 35B, which displays |Ez|2 (out-of-plane component) of a crystalline silicon ridge with a 27 nm by 2 nm cross-sectional area and eigen-wavelength of 450+91i nm. This mode plot indicates that the fundamental TE mode is delocalized from the silicon ridge, which reduces the mode overlap with the absorbing silicon ridge and lowers the model loss.

The $\sigma_{scat}$ and scattering efficiency for amorphous and polycrystalline silicon indicates that these materials scatter with high magnitude and efficiency at 700 nm, but they perform significantly worse at shorter wavelengths. For amorphous silicon, the scattering efficiency steadily drops over the visible spectrum down to approximately thirty-five percent at 400 nm, which for polycrystalline silicon, the scattering efficiency drops start at 550 nm to approximately sixty percent at 400 nm.

For TM-polarizations, similar trends exist. As with TE-polarization, the $\sigma_{scat}$ of ideal silicon increases as the fundamental mode resonance wavelength decreases due to the material dispersion of silicon. The $\sigma_{scat}$ for crystalline follows that of ideal silicon down to 500 nm, indicating that it represents a nearly ideal lossless material above this wavelength. However, its $\sigma_{scat}$ more precipitously declines from 500 nm to 400 nm, and its scattering efficiency decreases from approximately one-hundred percent to fifty-percent within this wavelength range. This efficiency is suitable for many metasurface applications and is high for blue wavelengths. The source of this reduced scattering, compared to the case of TE-polarization, can be understood by examining the fundamental TM mode profile. |Hz| 2 (out-of-plane component) is plotted in the inset of FIG. 35D for crystalline silicon ridge with a 54 nm by 64 nm cross sectional area and an eigen-wavelength of 444+16i nm. Here, the mode is confined in the silicon ridge, which effectively maximizes mode interaction with the silicon ridge and enhances modal absorption.

In comparison, the amorphous and polycrystalline silicon ridges have scattering efficiencies that steadily drop throughout the entire visible regime. For amorphous silicon, the scattering efficiencies are less than forty percent at wavelengths shorter than 550 nm, and for polycrystalline silicon, the efficiency drops monotonically to approximately thirty percent at 400 nm. Both materials possess $\sigma_{scat}$ that are many times smaller than that of crystalline silicon below 450 nm. As such, these materials are limited in their ability to efficiently scatter blue light due to their material absorption at these wavelengths.

Although the above discussion is directed to ridges, embodiments in accordance with the present disclosure are not so limited and can include various geometric shapes.

Figures 36A, 36B, 36C:
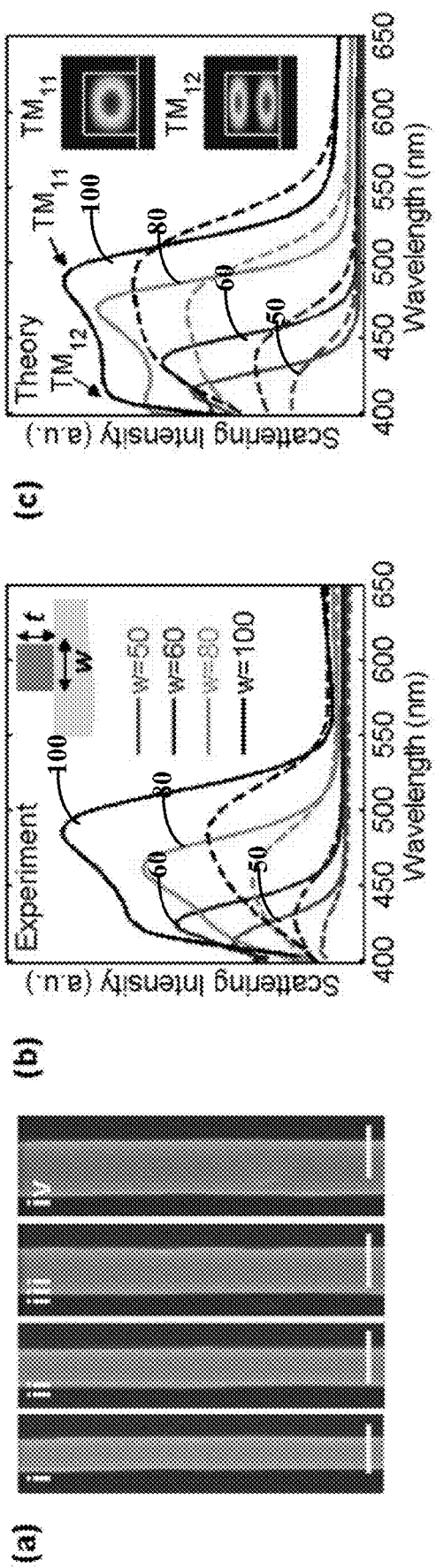
FIGS. 36A-36C illustrate the scattering spectra of individual silicon nanoridges, in accordance with various embodiments.

FIGS. 36A-36C illustrate the scattering spectra of individual silicon nanoridges. In various specific experimental embodiments, scattering from crystalline and polycrystalline silicon nanoridges are analyzed. The crystalline silicon samples are prepared by bonding an SOI wafer to Pyrex using hydrogen silsesquioxane (HSQ) as an adhesive layer. The silicon handle and buried oxide layer are removed by polishing and etching to expose the crystalline silicon film, which is then patterned by electron beam lithography and etched. Electron microscopy images (FIG. 36A) indicate that crystalline silicon ridges with widths ranging from 50 nm to 100 nm can be precisely etched with smooth sideways. For example, FIG. 36A illustrates the ectron microscopy images of crystal silicon ridges with widths of: (i) 50 nm, (ii) 60 nm, (iii) 80 nm, and (iv) 100 nm. The imaged samples are coated with a thin layer of titanium to minimize charging during imaging, which artificially widens the ridges.

The polycrystalline silicon samples are prepared by growing the silicon film on silicon dioxide wafer by low pressure chemical vapor deposition, followed by lithographic patterning and etching. Electron microscopy images of individual ridge are presented and show that etching produced smooth sidewalls. Films of polycrystalline silicon with thicknesses on the order of 100 nm or less have relatively small grains, which yield smooth sidewall etching.

A polarized halogen white light source, coupled to a near-normal dark-filed spectroscopy setup, characterized light scattering from individual 10 um-long ridges. Near-normal excitation is used instead of oblique excitation because it eliminates retardation effects, which can distort the spectral line shapes.

The spectra of 70 nm-thick ridges with differing widths are plotting in FIG. 36B. The spectra show that, as the ridge widths increase from 40 nm to 100 nm, the $TM_{11}$ fundamental model increases in magnitude and its peak resonance wavelength shifts from 400 nm to 500 nm. For the 80 nm-wide ridge, the $TM_{12}$ higher-order mode emerges as a distinct feature near 415 nm and is further pronounced and slightly red-shifted in the 100 nm-wide ridge. As such, crystalline silicon geometric structures exhibit clear and distinct resonant features, including the fundamental and higher order modes, at blue wavelengths across the 400 nm to 500 nm range.

Theoretical scattering spectra, calculated using the finite element program COMSOL, are plotted in FIG. 36C and display agreement. Normal incident is assumed, and the simulations account for the glass substrate and finite numerical aperture of the collection objective (NA=0.65). To confirm the interpretation of the peak designations, the quasi-normal $TM_{11}$ and $TM_{12}$ modes are solved for an 80 nm-widge ridge and there $|H_z|^2$ intensity profiles are plotted in the set of FIG. 36B. For the $TM_{11}$ fundamental mode, the eigen-wavelength is solved to be 481+26i nm, which matches with the peak in the experimental spectra. The mode profile has the form of a singular lobe confined in the silicon, which is consistent with the quasi-normal mode analysis. For the $TM_{12}$ mode, the eigen-wavelength is solved to be 395+11i nm, which matched with the position of the peak emerging near 400 nm. The mode contains two lobes, confirming its form as a higher order mode.

The experimental spectra of polycrystalline silicon ridges are plotted in FIG. 36B and show distinct peaks across the blue wavelength range. However, the magnitudes of the peaks are lower than that of crystalline silicon. For 50 nm and 60 nm-wide structures, the peaks have magnitudes that are four to five times lower than those from crystalline silicon. For 80 nm and 100 nm-wide structures, the peaks have magnitudes that are approximately half of those from crystalline silicon. In addition, the polysilicon scattering spectra do not show distinct $TM_{12}$ pleas in the wider ridges, due to its strong optical absorption. Theses comparisons in scattering intensity between individual geometric structures confirm that crystalline silicon is significantly higher quality optical material at blue wavelengths relative to polysilicon.

The theoretical scattering spectra of polysilicon ridges (FIG. 36C) generally agree with the experimental spectral. However, the experimental scattering intensity from each ridge is lower compared to the calculated scattering intensity. This result is attributable to surface roughness, which is more pronounced in polysilicon than in crystalline silicon due to the presence of grains. Surface roughness can enhance optical losses, contribute to inhomogeneous broadening effects, and scatter light in unpredictable directions. Such roughness is not accounted for in the theoretical calculations, which assume perfectly smooth surfaces.

The spectra of ridges excited by TE-polarization do not exhibit clear scattering peaks. A fare-field analysis of back-scattered light from individual crystalline silicon ridges indicates that the presence of higher order modes at blue wavelengths and their interference with the fundamental mode are responsible for distorting the spectral line shape of collected light.

Certain more-specific embodiments include a blue light metasurface device. For example, silicon ridges are used as a base element to design and characterize beam deflectors, which are transmissive blazed grating structure that deflect light at a specific angle and wavelength. These device control the magnitude and phase of incident light in ways that can generalize to more complex metasurfaces, such as lenses and reflectors. Blue light manipulation plays a role in many technologies.

The following discussion, which focuses on the design of beam deflectors operating at three distinct wavelengths, for discussion purposes, it may be useful to better appreciate the use of such a blue light device. The first is 488 nm, which is a blue light laser line wavelength that is common to many fluorescence imaging platforms, including those involving green fluorescent protein. The second is 450 nm, which is the lower wavelength limit of blue as a color before violet. The third is 405 nm, which is the operating wavelength of Blue-ray optical storage media.

Such apparatuses can also be designed using a stochastic optimization approach, which enables the realization of device with design specification providing such surprising and unexpected optical responses. The design deflect TE-polarization light at a twenty degree angle and utilizing five nanoridges in each period. Based on simulations, optimal device thicknesses for these wavelengths range from 50 nm to 75 nm, which is consistent with the dimensions of ridges previously discussed. Further, various apparatuses are designed that deflect TE-polarizing light at a forty-five degree angle for each wavelengths.

FIGS. 37A-37E illustrate example designs and performance of devices. The theoretical designs and performance specifications of the beam deflectors are plotted in FIGS. 37A-37C. The apparatuses operating at 488 nm have an absolute efficiency, defined as the total power deflected into the desired angle divided by the total incident power through a plain glass substrate, of sixty-five percent. The apparatuses have a relative efficiency, defined as the total power deflected into the desired angle divided by the total transmitted power, of eight-three percent. These numbers indicate that metasurfaces with high absolute and relative efficiencies are realized with crystalline silicon at blue wavelengths. The high relative efficiencies are useful in many transmissive metasurface applications, where spurious light deflection leads to distorted wavefronts and noise. The apparatus operating at 450 nm and 405 nm do not operate with as high of absolute efficiency as that operating at 488 nm due to increased material losses in silicon. However, the absolute and relative efficiencies for 405 nm operation are still forty-six percent and seventy-six percent, respectively, which are suitable for many applications.

Figures 37A, 37B, 37C:
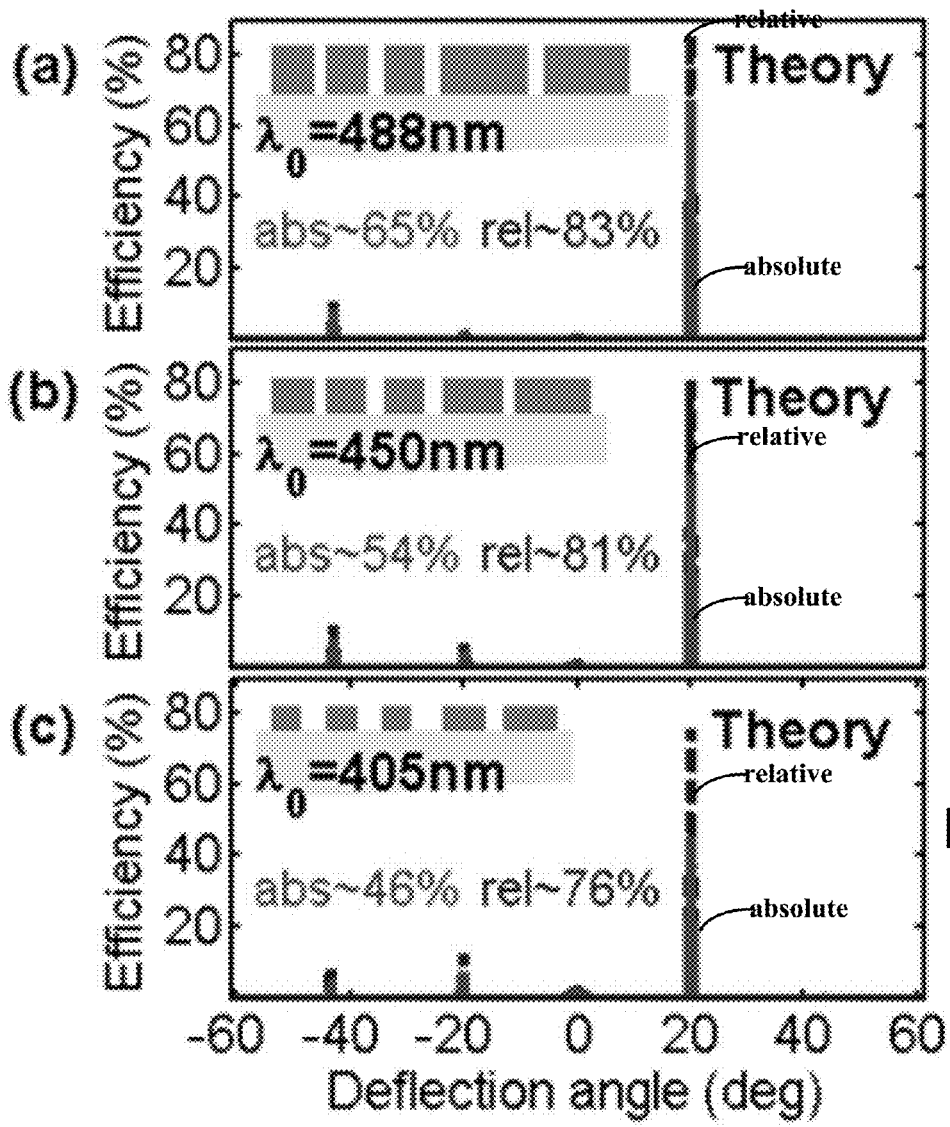
FIGS. 37A-37E illustrate example designs and performance of devices, in accordance with various embodiments.
Figure 37D:
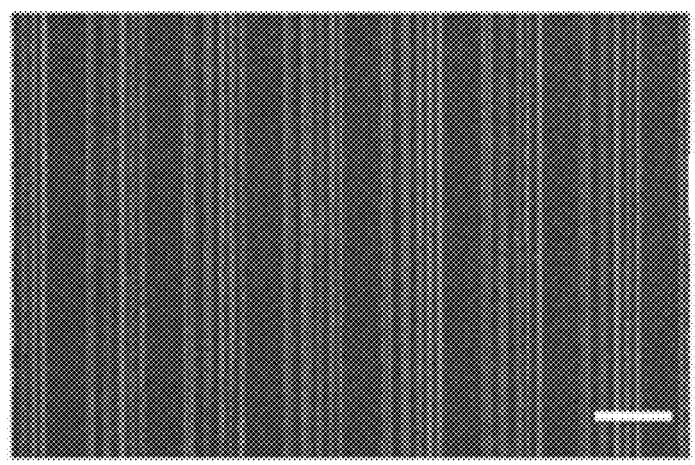
Figure 37E:
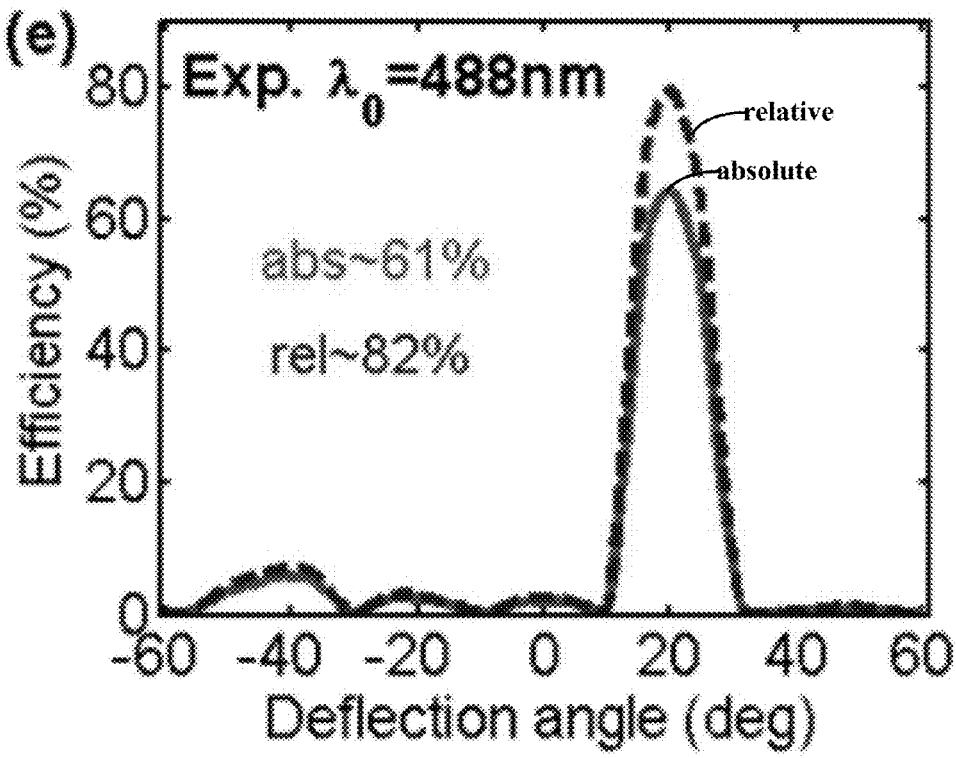

Various embodiments have been used to experimentally test deflectors. For example, deflectors are fabricated and characterize a 75 nm-thick crystalline silicon apparatus that deflect TE-polarized 488 nm light by twenty degrees. The fabrication is consistent with that for individual silicon ridges. An electron microscopy image of the deflector is illustrated by FIG. 37D and shows a periodic array of spatially defined silicon ridges. To experimentally test the deflection efficiency, an incoherent white light source is collimated, filtered, and polarized with a 488 nm laser line filter, and then the light is focused with a 0.14 NA objective lens onto the deflector. The transmitted beam is characterized with a power meter mounted on a motorized rotation stage to measure the transmitted power at different angles. The far-field profile of the transmitted light is illustrated by FIG. 37E. The peak at twenty degree deflection is broadened due to the finite numerical aperture of the excitation source. The plot shows that the apparatus deflects the 488 nm beam at twenty degrees with absolute and relative efficiencies of sixty-one percent and eighty-two percent, respectively. A comparison between the theoretical (FIG. 37A) and experimental (FIG. 37E) deflection efficiencies shows close agreement, indicating that inhomogeneities intrinsic to the fabrication process minimally impact the apparatuses.

Embodiments in accordance with the present disclosure can include silicon ridges and beam deflectors formed of crystalline silicon and that are suitable for blue light metasurfaces. Polycrystalline silicon metasurfaces, by contrast, do not scatter blue light as efficiently as crystalline silicon due to material absorption losses. Blue light metasurfaces are useful for a variety of applications in thin-film optical engineering. For example, in biology, structured blue light illumination and focusing is the basis for fluorescence imaging and optogenetics. Blue light metasurfaces, in various embodiments, enable miniaturized and implantable photonic system for controlled illumination and imaging. Further, data storage utilizes focused spots of blue light for optical storage media. More generally, optical components with blue light responses are combined with those with green and red responses, or integrated into broadband designs to yield a broad range of efficient apparatuses responsive to the full visible spectrum.

Figure 38:
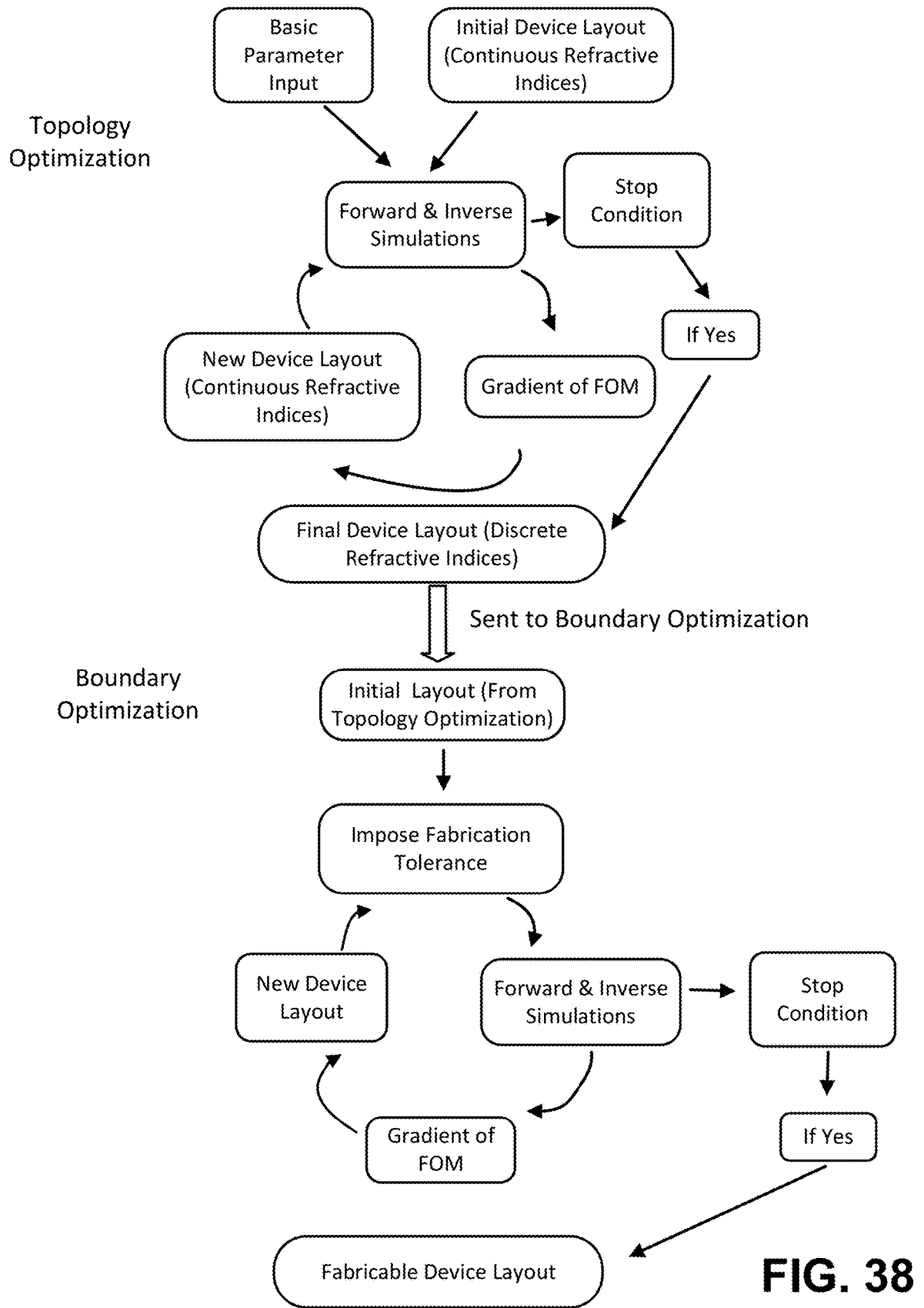
FIG. 38 illustrates an example of an optimization process, in accordance with various embodiments.

FIG. 38 illustrates an example of an optimization process, in accordance with various embodiments. In accordance with a number of embodiments, a device (e.g., metasurface) is optimized using two processes, the first is a topology optimization and the second is boundary optimization. For example, the topology optimization includes solving Maxwell's equations and producing an output electromagnetic wave state for a given input design and input electromagnetic wave condition. The boundary optimization, in some instances, leverages the simulation engine to produce a fabricatable (by imposing the fabrication tolerance into the optimization) design yielding an ideal output electromagnetic wave state.

A number of embodiments include use of a simulation engine. Example simulation engines includes finite-different time-domain (FDTD), finite-difference frequency-domain (FDFD), finite element (FEM), and rigorous coupled wave analysis (RCWA) techniques. The proper choice of simulation engine depends on the type of device being designed. As previous discussed, the devices are divided into two categories: periodic structures and aperiodic structures. Periodic structures include gratings, and aperiodic structures encompass devices and/or apparatuses that control the magnitude and phase response of light. For periodic structures, an open-source RCWA software package provides high computational efficiency and numerical stability. For the aperiodic structures, a combination of aperiodic RCWA (a-RCWA, a modified-version of RCWA), FDTD (e.g., the commercial software Lumerical), and FEM (e.g., the commercial software COMSOL), and an open-source near-to-far-field-transformation (NFFT) code can be used. For general and specific information on simulation engines, reference is made to J.-P. Hugonin and P. Lalanne. Reticolo software for grating analysis, Institut d'Optique, Orsay, France (2005) (www.lp2n.institutoptique.fr/Membres-Services/Responsables-d-equipe/LALANNE-Philippe); J.-P. Hugonin and P. Lalanne. J. Opt. Soc. Am. A 22, 1844 (2005); and J. Yang, J.-P. Hugonin, and P. Lalanne. ACS Photonics 3, 395 (2016), which are hereby fully incorporated by reference.

There are many optimization schemes that can be used to optimize an apparatus as previously described herein. In general, one or a combination of optimization schemes are used to yield a hybrid optimization approach to design apparatuses. Examples of optimization schemes include particle swarm optimization, genetic optimization, local gradient optimization, machine learning approaches using artificial neural network algorithms and deep learning algorithms, and other computational approach. For general and specific information on particle swarm optimization, genetic optimization, local gradient optimization, and other approaches, reference is made herein to Jakob S. Jensen and Ole Sigmund, Laser Photonics Rev. 5, 308-321 (2011); C. M. Lalau-Keraly, S. Bhargava, O. D. Miller, and E. Yablonovitch. Opt. Express 21, 21693 (2013); Jesse Lu and Jelena Vuckovic. Opt. Express Vol. 21, 13351 (2013); Y. Zhang, S. Yang, E. J. Lim, G. Lo, T. Baehr-Jones, and M. Hochberg. IEEE Photon. Tech. Lett. 25, 422 (2013); and P. Sanchis, P. Villalba, F. Cuesta, A. Håkansson, A. Griol, J. V. Galan, A. Brimont, and J. Marti. Opt. Lett. 34, 2760 (2009), which are hereby fully incorporated by reference.

Machine learning approaches using artificial neural network algorithms and deep learning algorithms are used in various embodiments. While it may be possible to use a neural network to produce a desired design layout for a given desired electromagnetic property, these techniques can also be used in more specialized ways, for example to efficiency produce starting points for other optimization schemes. A compelling competitive advantage of machine learning approach is that the longer data is fed to the machine learning algorithm (i.e., days, months, or even years), the algorithm training gets better and produces better device designs in a more efficient manner.

An example two-step optimization procedure, which may efficiently touch the globally optimal device design, is now described. As illustrated by FIG. 38, the optimization approach in various embodiments includes include an adjoint-based computational approach. Various embodiments include an efficient adjoint-based optimization procedure to design and refine nano-optical devices that are constrained by practical fabrication tolerance limits. This route provides an efficient optimization approach that allows for design of consistently generated designs containing thousands of geometric structures and geometric parameters that have performance specifications that approach a global optimum without severely increasing computation time. An adjoint-based approach consists of two components: topology optimization and boundary optimization. Topology optimization determines/sets the number and shape of elementary geometries (e.g., geometric structures) within a device layout, and boundary optimization adjusts (e.g., optimizes) the boundaries of the geometries generated in the topology optimization process. In some embodiments, the topology optimization process effectively generate geometries that are near the theoretical global optimum with high probability. These geometries are then used as starting points in the boundary optimization routine, which further refines the geometry as well as imposes constraints on minimum feature size for fabrication purposes. For example, the boundary optimization can include adjusting edges between boundaries of the device components by accounting for fabrication constraints.

The approach, as illustrated and described herein, provides for a local optimal solution for a device being optimized that is not convex. However, it is possible to find a local solution that approaches a theoretical global maximum, which will be discussed further herein. For this approach, two independent simulations are performed in each iteration (e.g., in the topology optimization and in the boundary optimization): the first is a forward simulation, in which an device and/or particular device component is illuminated by the input(s) that it is designed for, and the second is the adjoint simulation, in which the device and/or particular device component is illuminated by its target output(s) in the reverse direction. The field distributions calculated by these simulations allows one to infer the impact of every parameter on the figure-of-merit (FoM) of the device and/or device component simultaneously. Specifically, these simulations provide information which indicates the effect that a change in any of the geometric parameters has on the FoM (the FoM gradient for every parameter). With this information, small modifications are made to the structure, resulting in a new layout which increases the FoM. Typically, after a small number of optimization iterations, one reaches a local optimal design. The computational cost of this approach may not scale with the number of parameters in a device, making it suitable for systems with large numbers (e.g., many thousands) of geometric structures.

Due to the number of local optima in such devices, making sure that the solution is as close as possible to global optimization is difficult. In certain embodiments, this approach is applied to a number of different starting/initial device layouts and used to find the best optimization result. Alternatively, various embodiments include identifying a best/optimal (e.g., more suitable) starting point for the optimization algorithm by allowing the refractive indices of the materials in the device to vary continuously, which yields a more "convex" optimization problem (or more technically as having a reduced duality gap). A solution that satisfies the physical constraints (with the true material refractive indices) is obtained by discretizing the continuous refractive index values, either at the end of the optimization process or gradually throughout the optimization process. In applying this strategy towards topology optimization, it is evident that this strategy consistently yields solutions near the global optimum with high probability, and is nearly independent of the complexity (in terms of the number of layers or geometric structures) of a system.

FIGS. 39A-39M illustrate various examples applications of a device, in accordance with various embodiments. In various specific aspects, the formed device is used with and/or to form thin film solar cells, a hyper-spectral imaging system, a dielectric lens, a lens, a thermal management metasurface, a light emitting device, a fluorescence imaging system, a polarizing lens, a wearable flexible device, and/or a micro-electro-mechanical system (MEM), among other devices and/or systems.

Figure 39A:
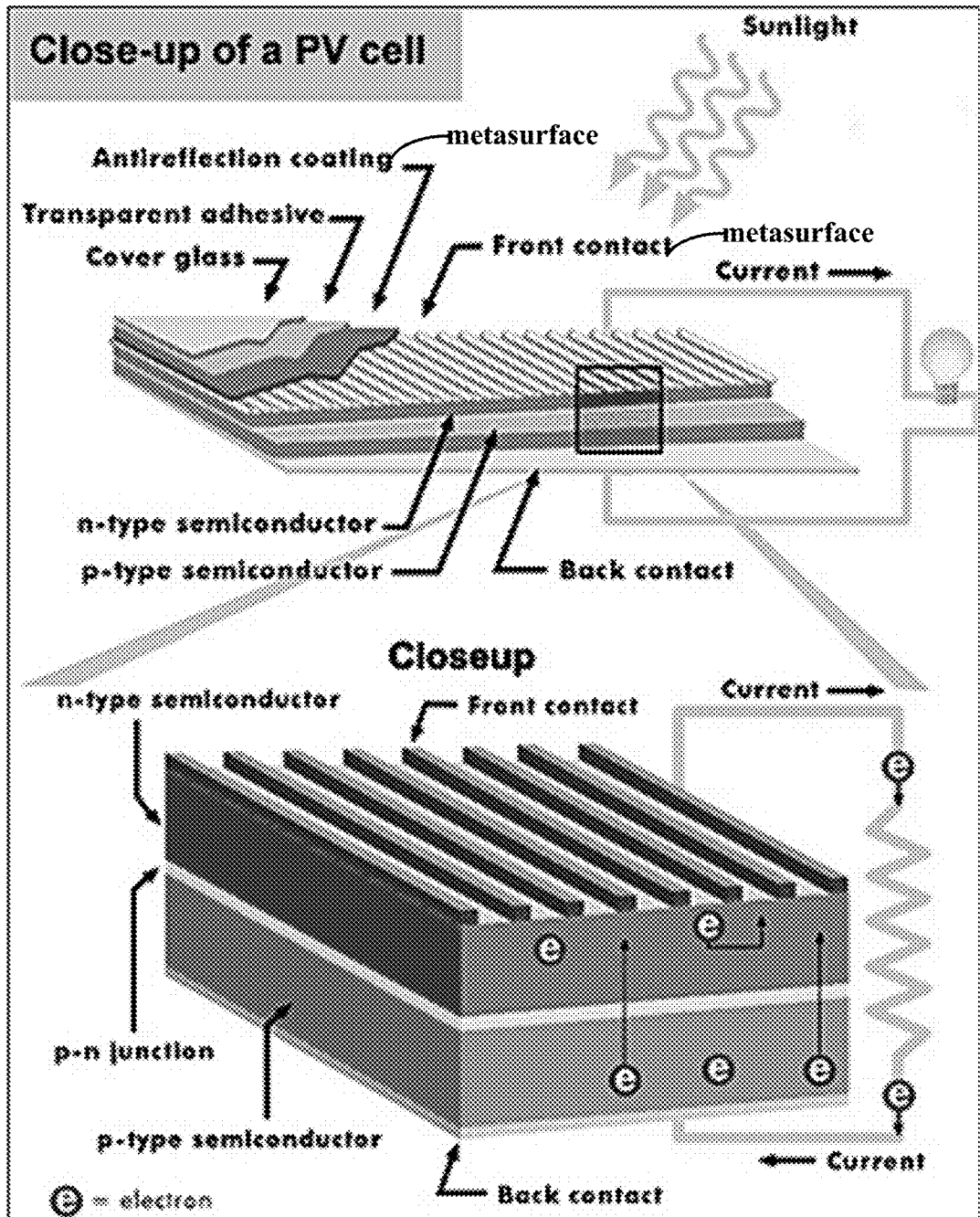
FIGS. 39A-39M illustrate various examples applications of an apparatus, in accordance with various embodiments.

FIG. 39A illustrates a device (e.g., that is or includes a metasurface) used with and/or to form a thin film solar devices, such as solar cells, photothermal, photocatalytic, solar concentrators, and/or chemical reaction driving devices. High-efficiency solar cells convert as much light as possible into electric currents with semiconductor materials. Semiconductor materials sometimes absorb (and convert) light with efficiencies that strongly vary with wavelength. Optimized geometric (nanophotonic) structures can trap, direct, and/or funnel light in wavelength-specific ways to boost the efficiency of multi-material solar cells. For example, in various embodiments, thin film solar devices include a plurality of device components, each device component including at least one layer of geometric structures. The device components are configured to capture and sort different wavelengths of light toward different areas of the thin film solar devices across a broadband range of wavelengths. And, the device components are combined together to form a periodic or aperiodic apparatus and/or device (e.g., the metasurface).

Figure 39B:
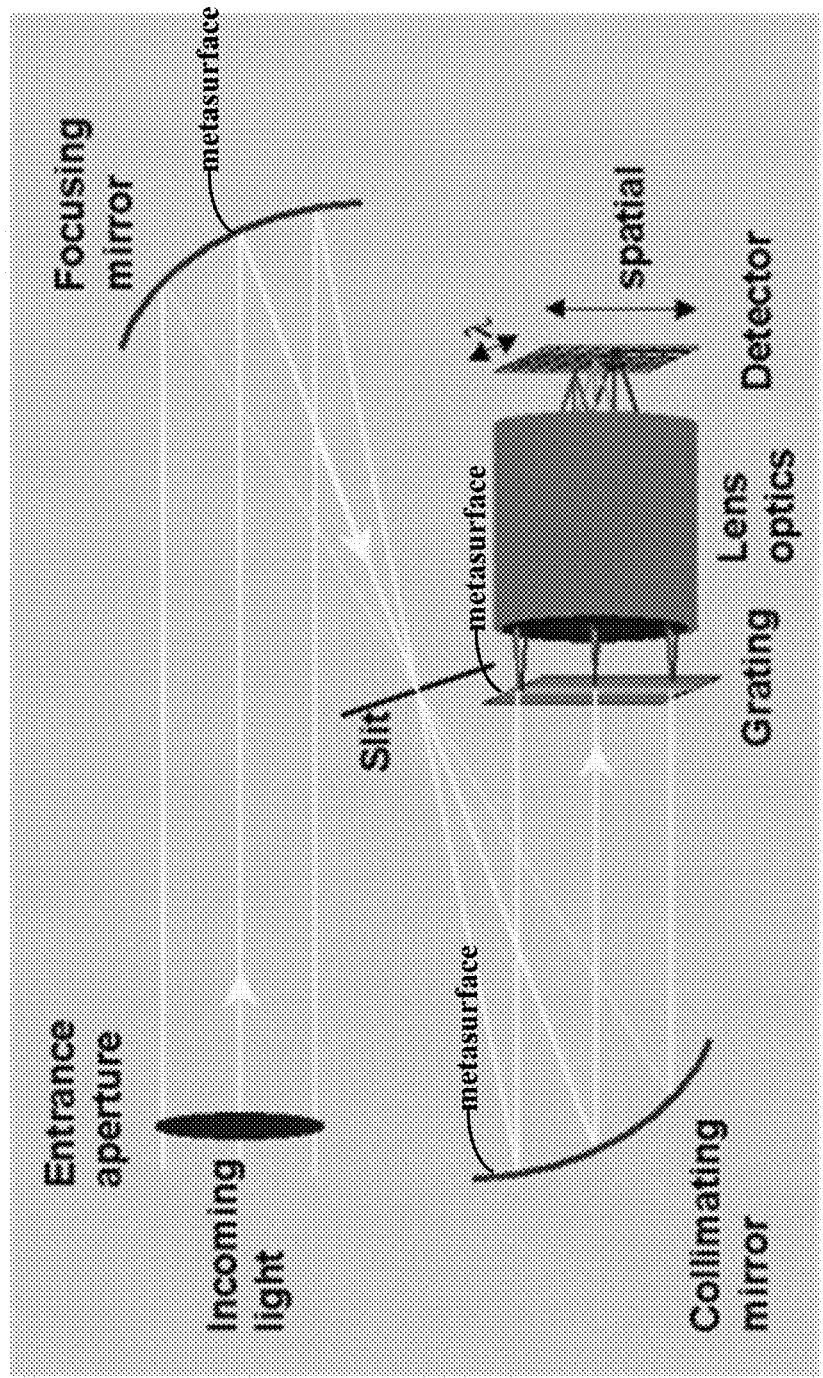
Figure 39C:
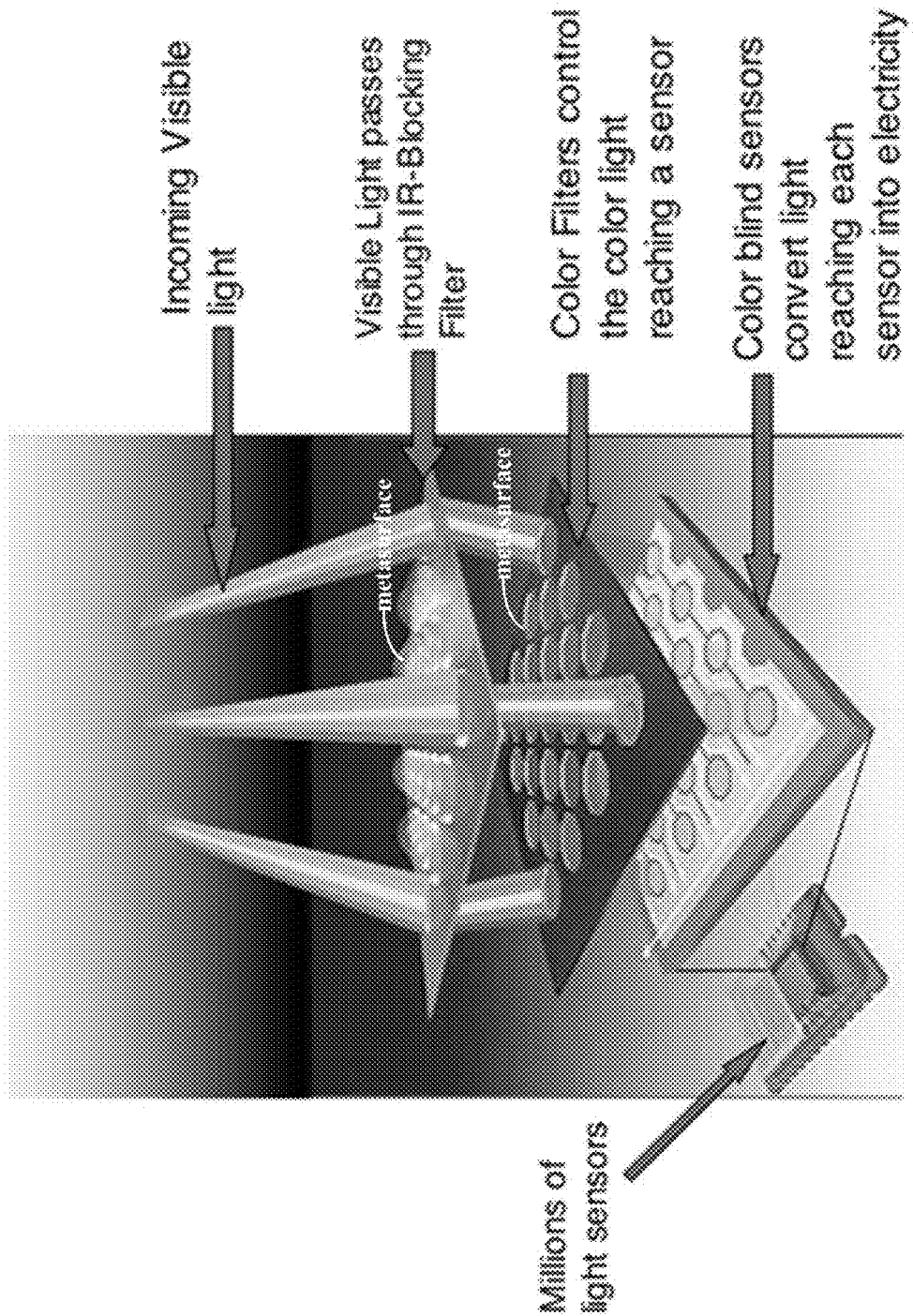

FIGS. 39B-39C illustrate an example of a device (e.g., that is or includes a metasurface) used with and/or to form an imaging system. For example, as illustrated by FIG. 39B, the device is used with and/or to form hyper-spectral camera, such as a hyper-spectral imaging system (as previously illustrated by FIG. 32B). A hyper-spectral imaging system records the spectrum of light at every pixel. This has a very wide variety of applications, from identifying the components and distribution of a specific material in the environment, enhancing machine vision, and/or sensing the ripeness of food. Optical elements are designed that maximally extract spectral information from the smallest physical footprint on a sensor to realize compact and cost effective hyper-spectral imaging systems. In some embodiments, a hyper-spectral imaging system includes a plurality of device components. Each device component includes at least one layer of geometric structures and is configured to extract spectral information from a sensor of the imaging system across the spectrum of light. Further, the device components are combined together to form a periodic or aperiodic apparatus and/or device. In other embodiments, the imaging system includes a polarimeter, or both a hyper-spectral imaging system and a polarimeter.

In other specific embodiments, as illustrated by FIG. 39C, the device (e.g., that is or includes a metasurface) is used with and/or to form an imaging system, such as an image sensor. For example, the metasurface is integrated with image sensors to augment their capabilities, reduce their footprint, and reduce their energy consumption. Image sensors include but are not limited to CCD and silicon CMOS sensors. The reductions in footprint are due to the device platform, which includes ultra-lightweight and nanoscale thin-film form factors. For example, the metasurface can reduce the size of bulky optical imaging systems down to the footprint of cell phone cameras, which increases the usability and proliferation of advanced imaging systems in the consumer, medical, and military markets. In addition, the ability to integrate multiple optical functions into a monolithic platform produces more durable optical systems.

There are a variety of applications of imaging system. For example, an imaging system that includes a metasurface in accordance with the present disclosure is used for efficient sorting and filtering of colors. The imaging system includes, for example, various combinations of dielectric lens, polarizers, beam splitters, wave plates, phase plates, filters, mirrors, retroreflectors, beam-shapers, holographic plates, gratings, prisms, or achromatic lenses and/or, deflectors. A conventional CCD image sensor uses a color filter array that passes red (R), green (G), or blue (B) light to selected pixel sensors. Coloration is achieved by absorbing light in dyes at the undesired wavelengths. In various embodiments, flat dielectric devices (or other of the above listed components) are used to efficiently focus light of different wavelength ranges (e.g., different colors) into different pixels and avoid using absorption dyes, which significantly increases the signal/noise of light entering the sensor. For example, imaging system in various embodiments includes a dielectric lens that focuses light of particular wavelength ranges (e.g., red, green, and/or blue light, the visible spectrum, near-infrared, and/or ultraviolet light) to selected pixel sensors. In some embodiments, the dielectric lens includes a plurality of device components formed by at least one layer of geometric structures, and configured to focus red, green, and/or blue light to particular pixel sensors. Further, the device components are combined together to form a periodic or aperiodic apparatus and/or device.

Various embodiments include using the apparatus (e.g., that is or includes a metasurface) for energy efficient optics. For example, the metasurfaces are optimized to complement computational imaging software to optimize for energy consumption in an optical system. As such, an advanced optical system is created that not only have cell phone camera form factors, but that can also run off of a cell phone battery. Applications include compact microscopy, hyper-spectral, polarimetry, light field camera, holographic display, and sensing systems.

Figure 39D:
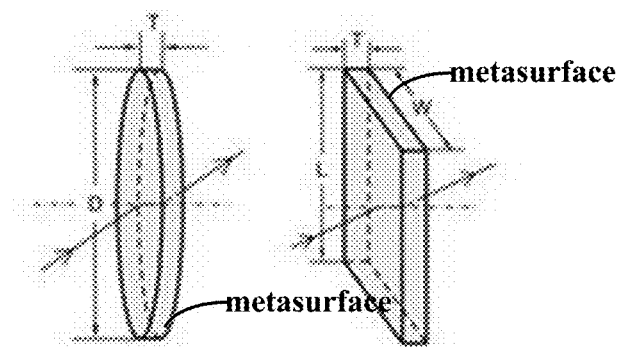
Figure 39E:
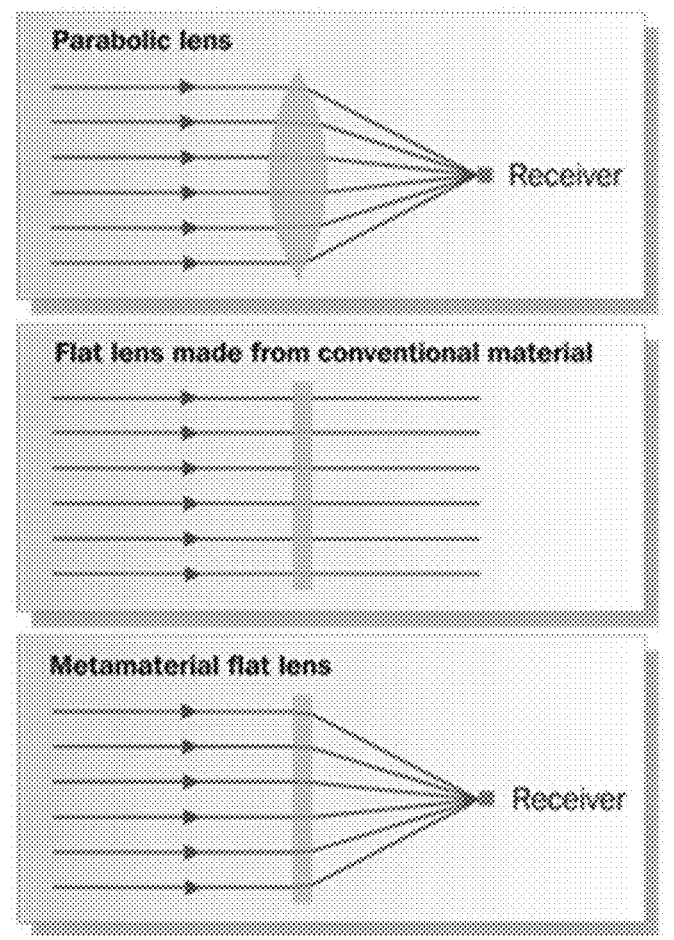

FIGS. 39D-39E illustrate various examples of using an apparatus (e.g., that is or includes a metasurface) to form lenses. In some applications, such as machine vision systems, systems use near-infrared light sources to illuminate the environment. Flat optics devices are used to control the structural illumination patterns and their phase, focus and process incoming/scattered light, and perform optical processing and filtering in optical hardware at one or more wavelengths with high efficiency.

In some specific embodiments, the device (e.g., that is or includes a metasurface) is used with and/or to form a flat lens. For example, due to the material dispersion, classic lenses exhibit chromatic aberration, which means that light of different color are focused to different focal spots (chromatic aberration). In addition, classic lenses are incapable of perfectly focusing light which is incident from all angles (coma). These facts prevent high-quality imaging and are sometimes solved by combining multiple lenses together to form a bulky optical system. In various embodiments, ultra-thin (several hundred nanometers thick) metasurface flat lenses are designed to eliminate both chromatic aberration and distortion. This allows for the creation of ultra-compact high-quality optical systems, and reduces the physical size and increases the image quality of cameras in compact consumer devices. Flat lenses are also designed, at single or multiple wavelengths, with very large numerical aperture (0.9+ in air, 1.4+ in oil). Metasurfaces, in accordance with the present disclosure, are used to design and make large aperture gradient index lenses. The extension of the metasurface to infrared wavelengths also enables compact and advanced imaging modalities at these wavelengths. For example, in a number of embodiments, a lens includes a plurality of device components, each device component including at least one layer of geometric structures and is configured to focus particular wavelengths of light across a broadband spectrum to different focal spots and incident from all angles. The device components are combined together to form a periodic or aperiodic apparatus and/or device.

In various other specific embodiments, the device (e.g., that is or includes a metasurface) is used with and/or to form a thermal radiation management metasurface. For example, the device is tailored to have thermal radiation properties (e.g., emissivity, spectrum and directionality of emission), which has applications as thermal sources, in thermal imaging, countermeasures, and in applications pertaining to thermophotovoltaics. In some embodiments, a thermal radiation management metasurface changes the temperature of a volume surrounded by the metasurface. The metasurface includes a plurality of device components, and each device component includes at least one layer of geometric structures and having particular radiation properties (e.g., emissivity, spectrum and directionality of emission). Further, the device components are combined together to form the metasurface.

Figure 39F:
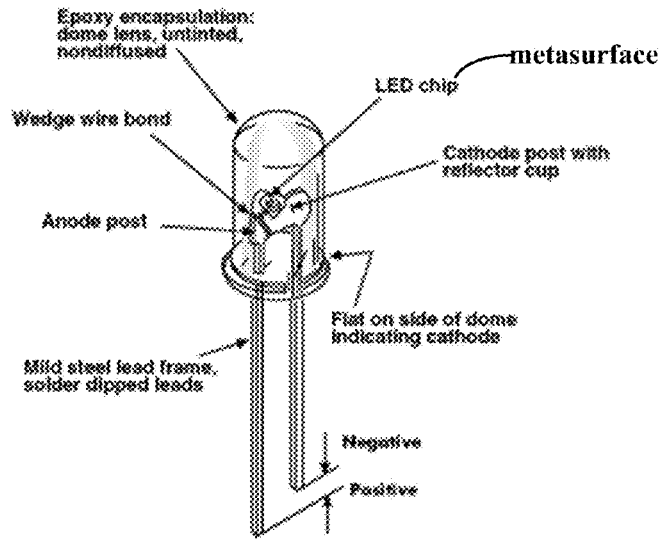

FIG. 39F illustrates an example of using a device (e.g., that is or includes a metasurface) with and/or to form a light emitting device, such as high density light field displays, laser, diodes light bulb, LED and/or OLED (and/or other general light emitting device). The light extraction efficiency from light emitting devices is limited by the total internal reflection and subsequent absorption of light. The integration of a metasurface as described herein directly with light emitting device enhances extraction efficiency. This reduces the operating temperature of such devices and greatly increase the efficiency of light emission. More generally, the device components of the metasurface serve as optical impedance matching elements with angular and wavelength dependence to enhance or reduce the transmission of light in novel ways. In various embodiments, a light emitting device includes a thin metasurface attached to a window of the light emitting device that is configured and arranged to allow light to escape to free space. The thin metasurface includes a plurality of device components, each device component including at least one layer of geometric structures and optimized to steer the light to specific directions with specific polarizations, to filter the light, to increase extraction efficiency and minimize energy absorbed by the light emitting device to reduce the operating temperate and increase efficiency of light emission. Further, the device components are combined together to form the thin metasurface.

Figure 39G:
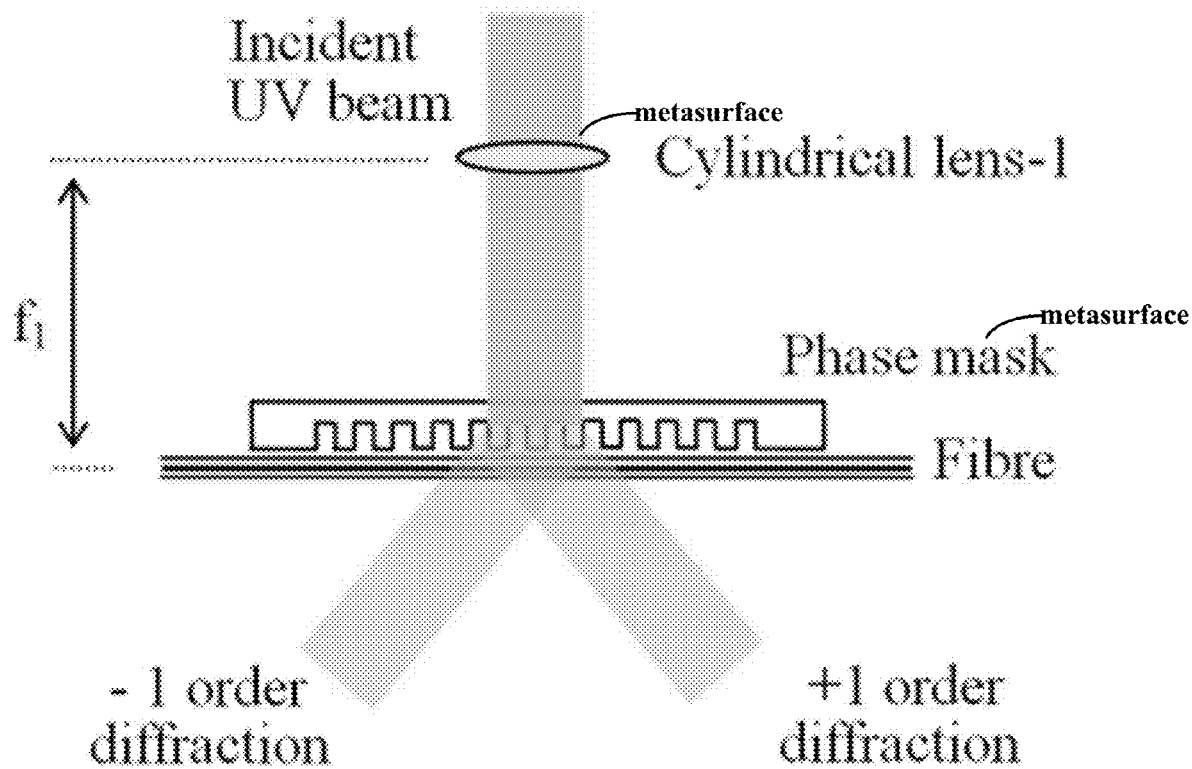
Figure 39H:
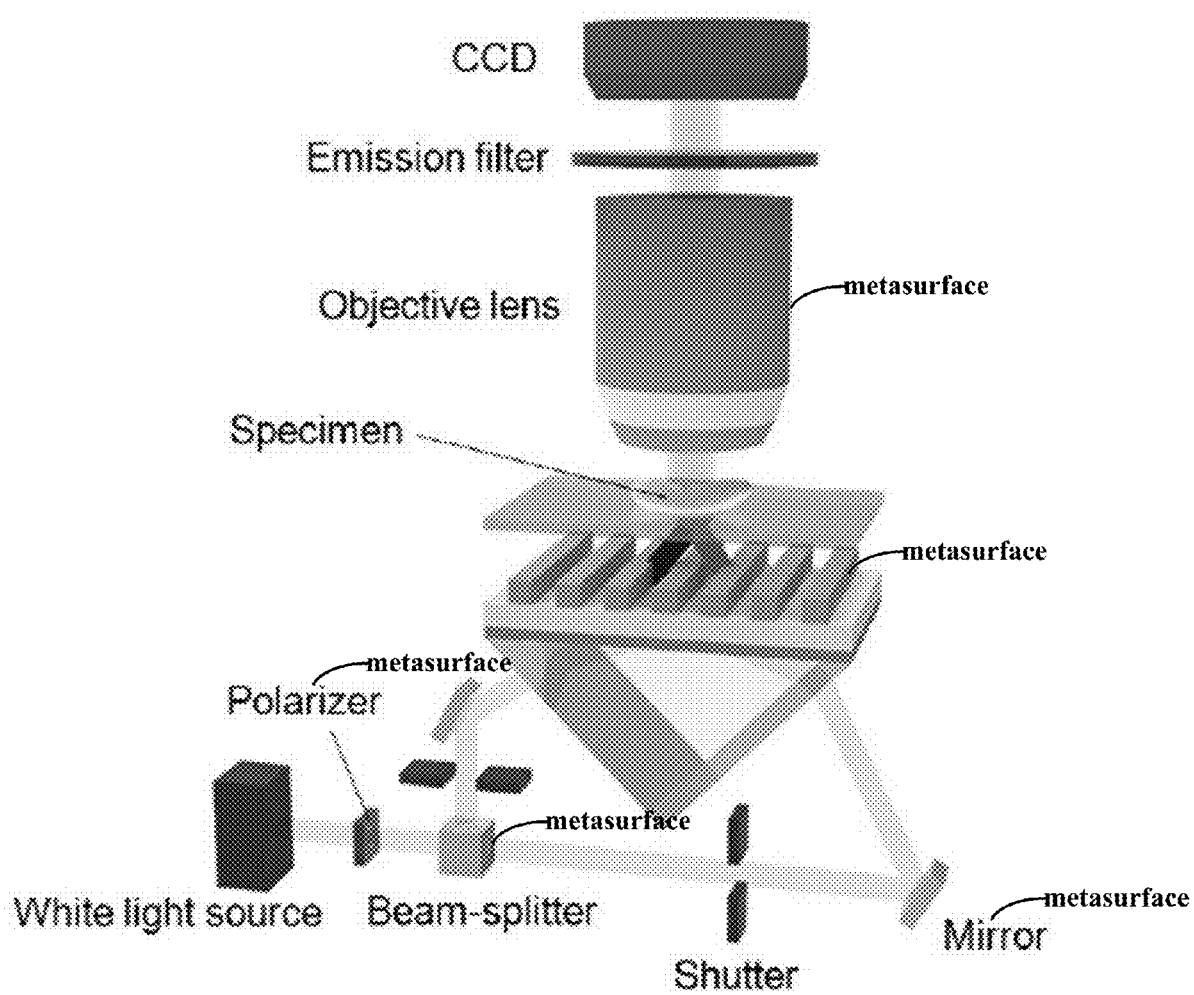

FIGS. 39G-39H illustrate examples of using a device (e.g., that is or includes a metasurface) with and/or to form a component of a microscopy apparatus. In a number of embodiments, the metasurface is tailored to serve as components in high-performance and miniaturized microscopy systems. In particular, the metasurface and/or device components combine lensing, beam steering, beam splitting, filtering, and magnification functionality in ways that are tailored to the wavelength and polarization of light. In some embodiments, the metasurfaces are used to encode specific phase patterns as a function of wavelength, which can be used in diverse applications ranging from structural light imaging to single molecule imaging. In other embodiments, the metasurfaces achieve beam expansion and contraction within a very small path length. For fluorescence imaging, the metasurface manipulates incident and fluorescent light in different ways to minimize system form factor and boost signal to noise ratio.

Such devices are used in a broad range of microscopy platforms including but not limited to: fluorescence imaging, phase contrast imaging, single-molecule imaging, light-sheet microscopy, and others. For example, some embodiments include a fluorescence imaging, phase contrast imaging, single-molecule imaging, light sheet microscopy, and/or other such systems that contain a polarizing lens, the lens including a plurality of device components. Each device component includes at least one layer of geometric structures and configured to sense polarization across a wavelength range (e.g., broadband or different range) of light, wherein the device components are combined together to form a periodic or aperiodic device and/or apparatus.

In some embodiments, a device (e.g., that is or includes a metasurface) has different optical responses and/or properties for different ranges of light. Such example devices have optical responses that change as a function of wavelength or polarization of light (e.g., perform wavelength and polarization multiplexing). As a specific example, a device differently modulates light of a first wavelength range (e.g., green light) than a modulation of light of a second wavelength range (e.g., red light). In another specific example, a lens focuses light differently at different wavelengths. In various embodiments, such devices (e.g., spatial filters) can change the shape of light as a function of wavelength and polarization of light and, thus, have multiple functions (for different wavelengths) as the devices respond/modulate light differently for different wavelengths. Accordingly, some embodiments include devices that have different optical functionality at different wavelengths. Such devices are useful in areas of compressive imagine sensing, remote sensing, optical microscopy, etc. to enhance resolution, increase speed of acquisition, etc.

Figure 39I:
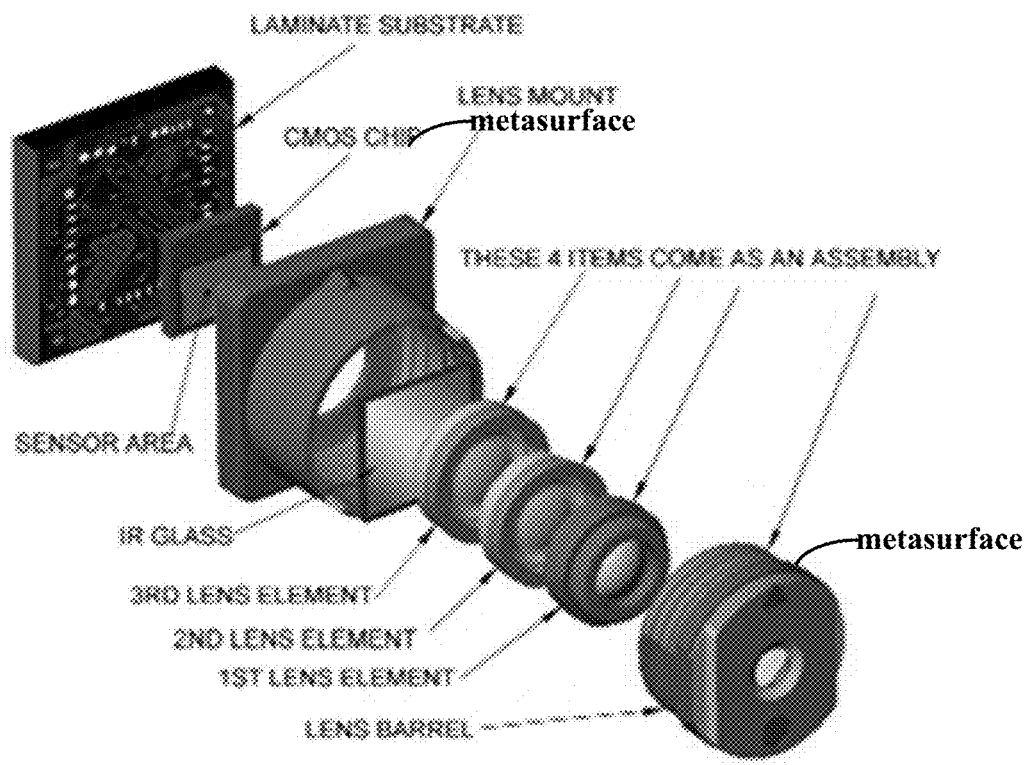

FIG. 39I illustrates an example of using a device (e.g., that is or includes a metasurface) with and/or to form an imaging device. For example, the metasurfaces are used to produce high quality thin film lenses that are capable of withstanding temperatures well above those used in the reflow process. This makes metasurface lenses an ideal candidate for advancing both the miniaturization of high performance cameras as well as the automation of the optical system assembly process.

A major hindrance to the full automation of camera modules for consumer applications is that the materials used for the lenses themselves are not capable of surviving high heat environments. This means that those components are not compatible with the reflow process, the process by which electronic components are joined together simultaneously with solder. Various embodiments include an imaging device that includes at least one lens. The at least one lens including a plurality of device components, each device component including at least one layer of geometric structures and having particular optical properties for a particular optical response, wherein the device components are combined together to form a periodic or aperiodic device and/or apparatus. Further, the periodic or aperiodic device/apparatus (e.g., metasurface) is joined together with other electronic components of a camera module via soldering.

Figure 39J:
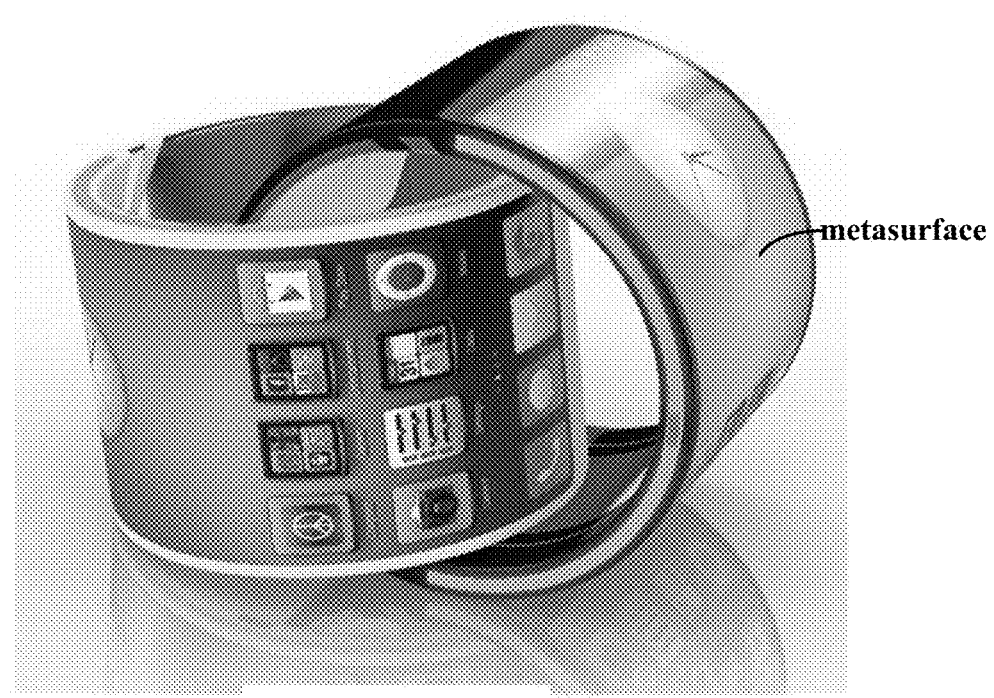

FIG. 39J illustrates an example of using a device (e.g., that is or includes a metasurface) with and/or to form a wearable flexible device, such as a lightweight wearable optical system. For example, the metasurface optimization scheme is used to design thin film optical devices that are mounted onto flexible substrates. The metasurfaces are intrinsically mechanically flexible due to their thin film form factor. As such, they can be directly integrated into wearable devices such as clothing, contact lenses, prescription glasses, goggles, watches, and flexible medical devices. Some specific embodiments include a wearable flexible device that includes a plurality of device components. Each device component includes at least one layer of geometric structures and has particular optical properties for a particular optical response, wherein the device components are combined together to form a periodic or aperiodic device and/or apparatus. In some embodiments, the flexibility of the device scales in relation to the thickness of the periodic or aperiodic device and/or apparatus. In other specific embodiments, the metasurface is used to form solar cells for a wearable flexible device. For instance, as described above, the metasurface is used to form the solar cells and integrated into a wearable flexible device to provide a renewable energy source (e.g., solar energy) for the wearable flexible device.

Figure 39K:
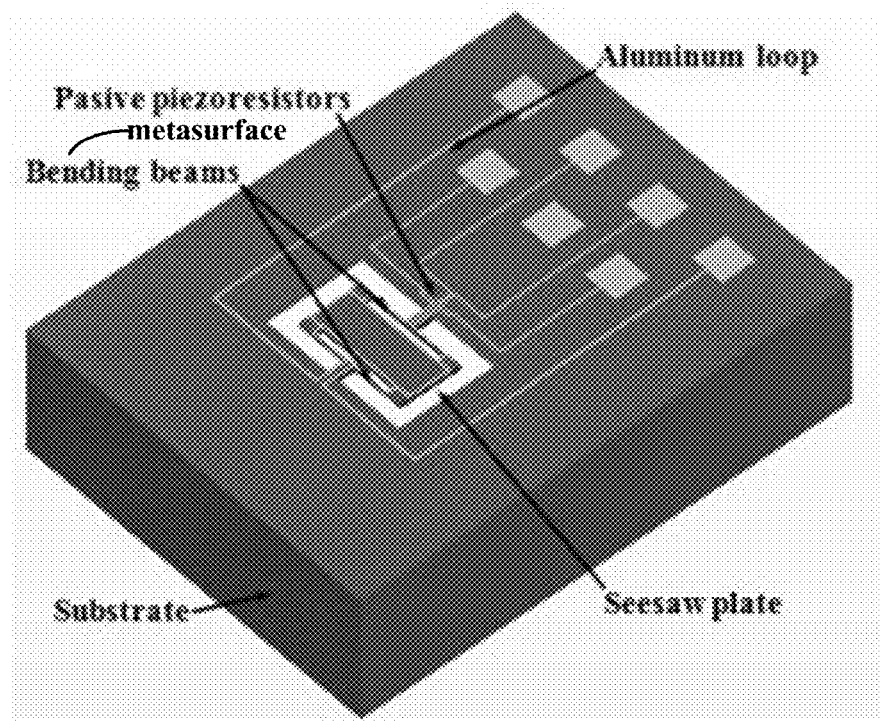

FIG. 39K illustrates an example of using a device (e.g., that is or includes a metasurface) with and/or form a nano-electro-mechanical system (NEMS) and/or a micro-electro-mechanical system (MEM). For example, silicon-based metasurfaces are actuated using concepts in NEMS and/or MEMS to enable a new class of high performance optical MEMS. These include NEMS and/or MEMS using conventional hard materials using wafer-based fabrication, and also mechanically compliant soft NEMS and/or MEMS utilizing mechanically soft materials such as elastomers and polymers. Applications include miniaturized and high speed beam steering platforms, scanners, lenses with adjustable zoom, optical force sensing platforms, and spectrometers. These devices can be implemented on solid state substrates or mounted on active and passive devices with unusual form factors such as the ends of an optical fiber or laser facet. A number of embodiments includes a NEMS or MEMS including at least one metasurface. The metasurface includes a plurality of device components, each device component including at least one layer of geometric structures and having particular optical properties for a particular optical response, wherein the device components are combined together to form the metasurface Other specific embodiments, include using a device (e.g., that is or includes a metasurface) in lightweight optics for deployment into space or high speed aircraft. The metasurface is useful for optics in avionics applications because they are lightweight, conformal to flat and curved geometries, and are monolithic and therefore mechanically. Possible uses in such systems include but are not limited to retroreflectors, camera objectives, photodetector objectives, beam steering, telescope assemblies, or solar cell coatings mounted on high speed aircraft such as commercial jets, military jets, drones, and spacecraft.

Figure 39L:
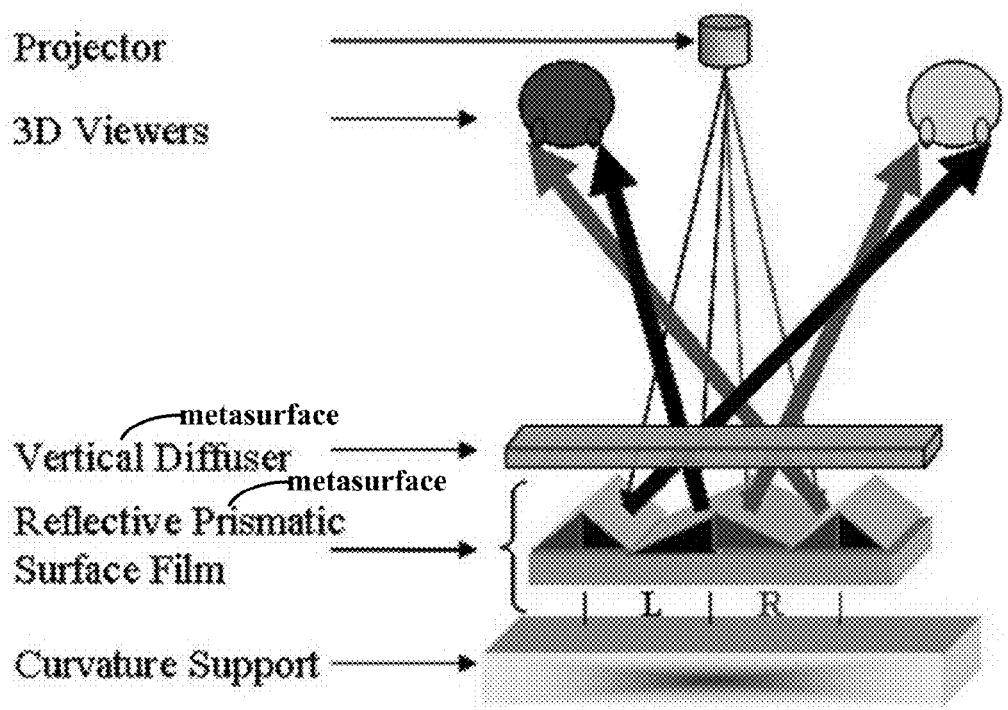

FIG. 39L illustrates an example of using at least one device (e.g., that is or includes a metasurface) in a three-dimensional (3D) display. By controlling the amplitude and phase of red, green, and blue light, metasurfaces produce a fully visible holographic image. Devices can be also be designed to integrate with 3D imaging displays to produce compact 3D displays. These concepts can apply to heads-up displays, virtual reality, augmented reality, and glassless 3DTV.

Further, specific embodiments include use of device (e.g., metasurface) to form an ultra-high resolution imaging system. Using the optimization approach, geometric structures are designed in various embodiments with optical responses that span the full 1931 CIE color spectrum. These geometric structures can serve as building blocks for ultra-high resolution (100,000+ pixels/inch) imaging systems with full color response. These devices can also be combined with active light emission devices, such as LEDs, to produce vivid and precise colors beyond the scope of current red/green/blue coloration technologies.

A number of embodiments include use of device (e.g., that is or includes a metasurface) to form and in compact quantum information platforms. The device, which can coherently manipulate light in multiple ways (i.e. phase, amplitude, and polarization states) with ultra-high efficiency (99%+ in the near-infrared), can enable ultra-compact optical setups for quantum computing. For example, a metasurface manipulates individual photons with extremely high fidelity, process entangled photon pairs with minimal loss, and steer and guide photons with high efficiency, and produce squeezed states. The integration of active photonic materials into the devices, such as quantum dots and quantum wells, can further streamline the solid state integration of quantum optics elements in a single monolithic platform.

Figure 39M:
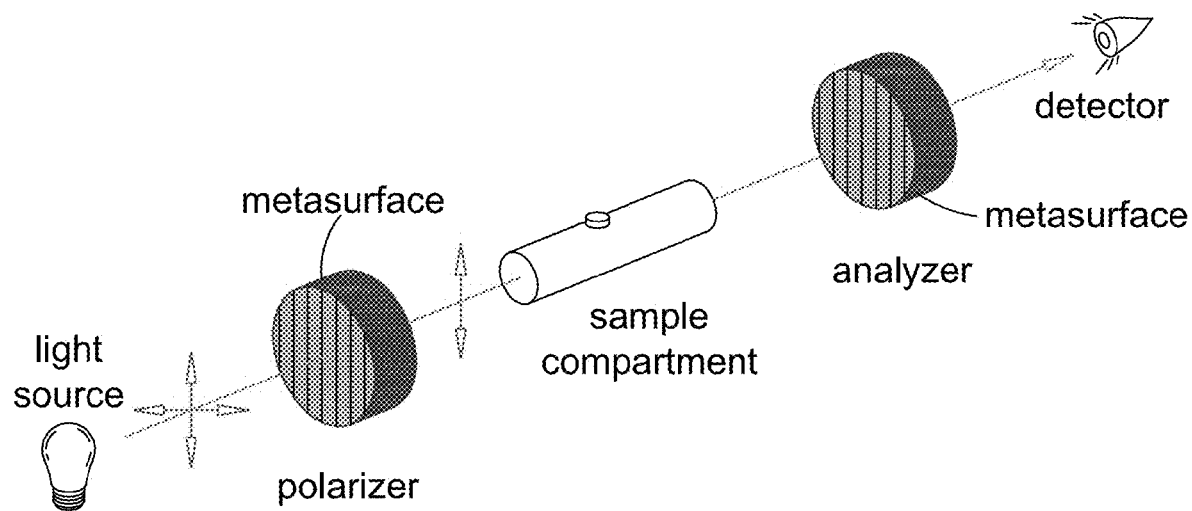

FIG. 39M illustrates an example of using a device with and/or to form component of a polarimeter. Some embodiments include the use of the device to form a compact broadband metasurface polarimeter. Traditional polarimeters use bulky optical components to sort the light by polarization state. Metasurfaces, in some embodiments, are designed to produce a broadband response that sorts light of different polarization states. Further, metasurfaces are designed to convert incident light of a polarization and wavelength type into a distinct spatial pattern, which can be detected by a conventional CCD. Such concepts are used to construct compact hyperspectral polarimeter imaging sensors, to record an amount of information that far exceeds that of conventional image sensors, and/or for applications in machine vision, scientific metrology experimentation, environmental sensing, and military application.

Various embodiments include using device (e.g., that is or includes a metasurface) to form nonlinear optical elements. For example, non-linear optical materials are integrated into the metasurface to produce systems that: 1) have optical responses that depend on incident light intensity, 2) have optical responses that depend on local electric field, and 3) produce output light responses with wavelengths differing from the input light. Such systems have applications in actively electrically or optically controlled photonic devices for steering, sorting, and filtering light in free space and on chip; compact quasi-phase matching devices (e.g., efficient conversion of wavelengths in a compact form factor), one way mirrors, and/or compact mode locking systems.

Other specific embodiments include use of device (e.g., that is or includes a metasurface) in and/or to form transformation optics and unusual beam manipulation platforms. The ability for metasurfaces to deflect light in arbitrary ways is used to optimize for light deflection and steering in the context of transformation optics and negative refractive index materials. Such a capability is useful in applications such as invisibility cloaking, routing and waveguide devices, ultra-compact active and passive optical cavities, sensors, imaging arrays, and solar light funnels.

In accordance with various embodiments, a device (e.g., that is or includes a metasurface) is used in and/or to form active and passive optical cavities. For example, the metasurface serves as facets in optical cavities, and in general, in applications requiring multiple passes of light. This is particularly the case in the near- and mid-infrared wavelengths, where metasurfaces possess negligible absorption losses. Metasurfaces in some embodiments are implemented in laser cavities to direct/specify feedback, mode profiles, mode spacing, mode volume, system form factor, and mediate nonlinearities in pulsed or CW systems. This applies for laser types including but not limited to free space lasers, semiconductor lasers, ultra-fast lasers, pulsed lasers, SBS lasers, and plasmonic lasers. It can also be implemented in passive optical cavities to modify the spatial form factor, effective cavity size, sensitivity, polarization modes, and angular momentum modes of the system.

Further, in various specific embodiments, a device (e.g., that is or includes a metasurface) is used in and/or to form dynamic devices. Notably, materials with optical properties that are reconfigured can be incorporated directly into the metasurfaces to reconfigure their optical response. These include, as examples, phase change materials (such as GST and vanadium dioxide), which have optical responses that can be modified as a function of electrical, mechanical, or thermal stimulus, electro-optic materials (such as bulk semiconductors/thin film semiconductors/2D materials/transparent conductive oxides with tunable carrier concentrations; electrochemical materials that reconfigure as a function of chemical composition; liquid crystal tuning, magnetic field tuning, and MEMS tuning). As such, devices can be made that can dynamically steer or route light on chip and in free space, change focal point position in the case of a lens, serve as dynamically tunable filters/modulators/phase plates, dynamic holographic surfaces, etc. Further, devices can be integrated with active on-chip devices, such as modulators, detectors, and sources, to produce systems with hybrid optoelectronic capabilities.

It may also be helpful to appreciate the context/meaning of the following terms. Geometric structure refers to or includes a material having a geometric shape and/or size defined by same-wavelength and/or sub-wavelength dimension(s), such as in a resonator and/or as in a device or component with geometry-dependent optical properties. A geometric structure can be a photonic structure or element used for providing refractive or reflective properties. In some embodiments, the geometric structure can be formed of at least one (low absorption) dielectric or semiconducting material, such as materials having a refractive index that is greater than two and/or materials that are not primarily metallic. As an example, the geometric structures can include a pattern etched into a dielectric or semiconducting material. The geometric structures are designed using the above-described iterative-based topology optimization and are not constrained to a specific topology. Nanostructure refers to or includes a geometric structure with at least one dimension across the structure that is less than a micron. Device component refers to or includes at least one layer of geometric structures, where one or more layers include a geometric layout of one or more geometric structures and that are stacked to form the device component. Each device component can be a dielectric or semiconducting film(s) arranged on the flat substrate (e.g., each of the plurality device components are arranged on the flat substrate). The plurality of device components forming the apparatus can support a plurality of optical modes which include inter-mode and intra-mode coupling that is mediated by the bouncing of light between different vertical interfaces of the layers of the device components. In various specific embodiments, the plurality of device components provide at least 3 round trips of light bouncing. Example device components can include lens, polarizers, beam splitters, wave plates, phase plates, filters, mirrors, retroreflectors, beam-shapers, holographic plates, gratings, prisms, or achromatic lenses and/or, deflectors, among other optical elements. Layer refers to or includes a material with a region thereof formed uniformly or with a thickness of one or more materials as exemplified in a device component having multiple layers forming a thickness dimension of the device component. Microstructure refers to or includes a structure, such as in a device component, with at least one dimension that is of a magnitude order of a micron. Periodic device and/or apparatus refers to or includes a device and/or apparatus (having multiple device components as above) formed of periodic structures, such as device components with geometric structures of a periodic pattern (e.g., device components with regularly arranged layers). For example, a periodic device and/or apparatus is configured to modulate light in a periodic pattern. Aperiodic device and/or apparatus refers to or includes a device and/or apparatus formed of aperiodic structures, such as devices components formed of different geometric structures in an aperiodic pattern. Metasurface refers to or includes optical hardware and/or a device that is configured to control a magnitude and phase response to light based on geometric design of the metasurface (e.g., film, rigid or flexible, and/or other insulative/(semi-)conductive substance providing desired optical properties). Optical properties refers to or includes an interaction with electromagnetic radiation of light. Examples of optical properties include reflection, refraction, diffusion, absorption, and transmission, which can include specific angles. Optical response refers to or includes optical properties and/or respective efficiencies at particular wavelengths of light. Topology of a device component refers to or includes a layout of geometric structures in each layer of the device component (e.g., topology includes various parameters such as the number of layers, the layout of geometric structures in each layer, the shape of the geometric structures, dimensions of geometric structures, dimensions of each layer, include thickness, among other parameters). Continuous profile refers to or includes a topology of the device component having a range of two or more materials and including mixtures of the two or more materials. Broadband spectrum refers to or includes a range of wavelengths, an example broadband spectrum includes the visible light spectrum, near-infrared spectrum, infrared spectrum, and a combination thereof. Spectral information refers to or includes information relating to or produced by a spectrum of light. Discrete profile refers to or includes a topology of the device component having two or more material that is discrete and does not include mixtures of the respective materials, such as the discrete profile being generated by converting the continuous profile to a binary result. And fabrication constraints refers to or includes parameters indicative of fabrication tolerance limits (example parameters include constraints on minimum geometric structure dimensions for fabrication purposes).

As should be readily apparent, various modules and/or other circuit-based building blocks may be implemented to carry out one or more of the operations and activities described herein and/or shown in the block-diagram-type figures. In such contexts, these modules and/or building blocks represent circuits that carry out one or more of these or related operations/activities. For example, in certain of the embodiments discussed above, one or more modules and/blocks are discrete logic circuits or programmable logic circuits configured and arranged for implementing these operations/activities, as in the circuit modules/blocks therein. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules/blocks include a combination of a CPU hardware-based circuit and a set of instructions in the form of firmware, where the first module/block includes a first CPU hardware circuit with one set of instructions and the second module/block includes a second CPU hardware circuit with another set of instructions. Also, although aspects and features may in some cases be described in individual figures, it will be appreciated that features from one figure or embodiment can be combined with features of another figure or embodiment even though the combination is not explicitly shown or explicitly described as a combination.

Consistent with aspects of the foregoing description, a number of related aspects and embodiments are disclosed in accordance with the Attachments, entitled Attachment A, Attachment B, and Attachment C, which are fully incorporated herein by reference. For example, Attachment A illustrates various embodiments and aspects as previously described herein, such as aspects previously described by FIGS. 2A-2C, 15A-15D, 16A-16E, 17A-17C, 18A-18C, 19A-19F, 20, 21A-21C, 22A-22C, 24A, 25A, 26A-B, and 27, among other locations. Attachment B illustrates devices designed using the above-described topology optimization. For example, as illustrated by FIGS. 3*a*-3*d* of Attachment B, the topology-designed device can support many optical modes (e.g., seven modes), and which include inter-mode and intra-mode couplings due to bouncing of light within the device components. By contrasts, FIGS. 2*a*-2*d* illustrates a conventional optical device (e.g., bulk optics or other metasurfaces designed using other techniques) in which light entering the device comes out in a single path (e.g., does not bounce within the device/does not include inter-mode couplings). The white squares illustrated in FIGS. 2*d* and 3*d* represent optical modes that do not bounce or couple with each other (e.g., light goes in and comes out). As illustrated, the device designed using the topology-optimization method described herein (e.g., FIG. 3*d*) support a great number of optical modes than the conventional device (e.g., FIG. 2*d*). FIG. 4*a-e* of Appendix B illustrates a device that supports around 50 modes. In specific embodiments, apparatuses formed can support at least three round trips of bouncing within device components and which recovers the steady state performance of the device, as reflected in FIGS. 3*d* and 4*d* of Appendix B. Attachment C illustrates different example devices as designed to support different function using the topology-optimization method. For example, FIG. 2 of Attachment C illustrates a device that transmits and deflects light through the device into different directions depending on the wavelength of the light. FIG. 3 of Attachment C illustrates experimental efficiencies of different devices, which can be defined as $N^{-1/4}$ in various embodiments and as further illustrated by FIG. S3. For instance, embodiments herein and/or in the provisional application (including the slides therein) may be combined in varying degrees with the embodiments illustrated in the Attachments (including wholly).

Various embodiments are implemented in accordance with the underlying Provisional Application (Ser. No. 62/329,841), entitled "Device Components Formed of Multiple Layers of Geometric Structures or a Three Dimensional Multi-layer, Multi-Material Metasurface", filed Apr. 29, 2016, to which benefit is claimed and which are fully incorporated herein by reference. For instance, embodiments herein and/or in the provisional application (including the slides therein) may be combined in varying degrees (including wholly). Reference may also be made to the experimental teachings and underlying references provided in the underlying provisional application, including the slides that form part of the provisional application. Embodiments discussed in the slides are not intended, in any way, to be limiting to the overall technical disclosure, or to any part of the claimed invention unless specifically noted.

Various embodiments include the use of such device components in an optical-type device. For example, various specific embodiments are directed to an apparatus that is a thin film solar device which includes the plurality of device components, each device component including at least one layer of geometric structures and configured to capture and sort different wavelengths of light toward different areas of the thin film solar device across a broadband range of wavelengths. In other embodiments, the apparatus is a hyper-spectral imaging system configured to record a spectrum of light at each of a plurality of pixels, the hyper-spectral imaging system including the plurality of device components, each device component configured to extract spectral information from a sensor of the imaging system across the spectrum of light. Further, the apparatus can be an imaging system including a dielectric lens configured to focus light of particular wavelength ranges to selected pixel sensors, wherein the dielectric lens includes the plurality of device components configured to focus light of particular wavelength ranges to particular pixel sensors. In addition or alternatively, the apparatus is a lens including the plurality of device components, each device component configured to focus particular wavelengths of light across a broadband spectrum to different focal spots and incident from all angles. In some specific embodiments, the apparatus is a thermal radiation management metasurface configured and arranged to change a temperature of a volume and/or area surrounded by the metasurface, wherein the metasurface includes the plurality of device components, each device component having particular radiation properties. In other embodiments, the apparatus is a light emitting device including a metasurface attached to a window of the light emitting device that is configured and arranged to allow light to escape to free space, the metasurface including the plurality of device components, each device component optimized to steer the light to specific directions with specific polarizations, to filter the light, to increase extraction efficiency and minimize energy absorbed by the light emitting device to reduce an operating temperate and increase efficiency of light emission.

In various embodiment, the apparatus is an imaging system have a polarizing lens, the lens including the plurality of device components, each device component configured to sense polarization across a wavelength range of light, wherein the device components are configured and arranged to provide lensing, beam steering, beam splitting, filtering, and/or magnification functionality. For example, the apparatus can be an imaging device including at least one lens bonded to a portion of the imaging device, the at least one lens including the plurality of device components, each device component having particular optical properties for a particular optical response.

In other specific embodiment, the apparatus is a wearable flexible device including the plurality of device components, each device component having particular optical properties for a particular optical response, wherein a flexibility of the wearable flexible device scales in relation to a thickness of the wearable flexible device. Alternatively and/or in addition, apparatus is a NEMS or MEMS, including at least one metasurface formed by the plurality of device components, each device component having particular optical properties for a particular optical response.

Terms to exemplify orientation, such as upper/lower, left/right, top/bottom, above/below, width, length, and thickness (as well as x, y, and z), may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Certain embodiments are directed to a computer program product (e.g., nonvolatile memory device), which includes a machine or computer-readable medium having stored thereon instructions which may be executed by a computer (or other electronic device) to perform these operations/activities.

Various embodiments described above may be implemented together and/or in other manners. One or more of the items depicted in the present disclosure can also be implemented separately or in a more integrated manner, or removed and/or rendered as inoperable in certain cases, as is useful in accordance with particular applications. In view of the description herein, those skilled in the art will recognize that many changes may be made thereto without departing from the spirit and scope of the present disclosure.

Based upon the above discussion and illustrations, those skilled in the art will readily recognize that various modifications and changes may be made to the various embodiments without strictly following the exemplary embodiments and applications illustrated and described herein. Such modifications do not depart from the true spirit and scope of various aspects of the disclosure, including aspects set forth in the claims.

What is claimed:

1. An apparatus comprising:
   each of a plurality of device components
   including a metasurface of at least one layer of geometric structures, and
   being arranged, via at one least one of geometries and boundaries of the geometric structures, to have optical properties for a particular optical response that is optimized to control an attribute of light, in terms of at one least one of an amount or amplitude of light and a phase of light, wherein the plurality of device components are shaped to manipulate light defined in a particular wavelength range based on the shapes and sizes of the geometric structures.

2. The apparatus of claim 1, wherein for each of the plurality of device components, the optical properties for a particular optical response are configured or optimized to control an amount or amplitude of light across a broadband spectrum, wherein the broadband spectrum includes light in one or more of the following categories: visible light, infrared and near-infrared light.

3. The apparatus of claim 1, wherein for each of the plurality of device components, the optical properties for a particular optical response are configured or optimized to control a phase of light across a broadband spectrum, wherein the broadband spectrum includes light in one or more of the following categories: visible light, infrared and near-infrared light.

4. The apparatus of claim 1, wherein for each of the plurality of device components, the optical properties for a particular optical response are configured or optimized to control an amount or amplitude of light and a phase of light across a broadband spectrum.

5. The apparatus of claim 1, wherein the plurality of device components are configured and arranged to support a plurality of optical modes that include inter-mode and intra-mode coupling, which is mediated by the bouncing of light between different vertical interfaces of the at least one layer, wherein the vertical interfaces are geometric structures.

6. The apparatus of claim 1, wherein the geometric structures have a geometric shape and size defined by wavelength dimensions and having optical properties for a particular optical response, and wherein each device component is a dielectric or semiconducting film or films configured and arranged on a flat substrate.

7. The apparatus of claim 6, wherein for at least one of the plurality of device components, the particular optical response is a function of at least one of, or a combination of, the following: a number of layers of geometric structures of the device component, dimensions of the device component, thickness of each layer of the device component, materials forming the geometric structures, presence of a layer of solid material, and/or total thickness of the device component.

8. The apparatus of claim 1, wherein the plurality of device components include a single layer of geometric structures and are configured to have optical properties for a particular optical response.

9. The apparatus of claim 8, wherein for at least one of the plurality of device components, the particular optical response is a function of at least one of, or a combination of, the following: a number of layers of geometric structures of the device component, dimensions of the device component, thickness of each layer of the device component, materials forming the geometric structures, presence of a layer of solid material, and/or total thickness of the device component.

10. The apparatus of claim 1, wherein the plurality of device components include multiple layers of geometric structures and are configured to have optical properties for a particular optical response.

11. The apparatus of claim 10, wherein for at least one of the plurality of device components, the particular optical response is a function of at least one of, or a combination of, the following: a number of layers of geometric structures of the device component, dimensions of the device component, thickness of each layer of the device component, materials forming the geometric structures, presence of a layer of solid material, and/or total thickness of the device component.

12. The apparatus of claim 1, wherein the geometric structures are formed of at least one material primarily non-metallic and/or having a refractive index that is greater than two and selected from the group consisting of metal, insulating, semiconducting material, and a combination thereof, and are configured to have optical properties for a particular optical response including controlling at least one of an amplitude and phase of light across a broadband spectrum.

13. The apparatus of claim 1, wherein each device component includes at least one layer of geometric structures formed of two or more different materials primarily non-metallic and/or having a refractive index that is greater than two, and formed by optimizing a topology and boundaries, for each device component, to have particular optical properties for a particular optical response and based on formation constraints.

14. The apparatus of claim 1, wherein each device component includes at least one layer of geometric structures and has a particular optical response as a function of at least one of: a number of layers of geometric structures of the device component, dimensions of the device component, thickness of each layer of the device component, materials forming the geometric structures, presence of a layer of solid material, and total thickness of the device component.

15. The apparatus of claim 1, wherein the plurality of device components are coupled together to form an aperiodic apparatus, and wherein one or more of the layers of geometric structures is formed of two or more materials selected from the group consisting of phase change materials, electro-optic materials, and electrochemical materials.

16. The apparatus of claim 1, further including a hyper-spectral imaging platform having multiple layers, each of the multiple layers having a surface including or composed of subsets of the plurality of device components.

17. The apparatus of claim 16, further including said at least one layer of geometric structures, an optical light processing system including microlenses, filters, and an electronic backend logic circuit to process the light after being manipulated by said at least one layer of geometric structures.

18. The apparatus of claim 1, further including a CCD imaging platform having at least one layer, said at least one layer having a surface including or composed of subsets of the plurality of device components, wherein said at least one layer is integrated directly onto a facet of the CCD imaging platform.

19. The apparatus of claim 1, wherein said at least one layer of geometric structures includes at least three layers of geometric structures, wherein the plurality of device components are coupled together to form aperiodic structures which correspond to the plurality of device components formed in an aperiodic pattern, and wherein light transmission efficiencies associated with each of the plurality of layers of geometric structures are consistent from layer to layer.

20. The apparatus of claim 1, wherein said at least one layer of geometric structures includes a plurality of layers of geometric structures which are arranged via a topology optimization to have particular optical properties for a particular optical response, and wherein light transmission efficiencies associated with each of the plurality of layers of geometric structures are consistent from layer to layer.

21. The apparatus of claim 1, wherein each of said at least one layer of geometric structures is arranged as an etched microstructure-sized geometric structure.

22. The apparatus of claim 1, wherein the geometric structures have nano-scale thin film form factors and the geometric structures are arranged via a topology optimization to have particular optical properties for a particular optical response, and wherein the particular optical response is across a broadband spectrum that spans at least 100 nanometers.

23. The apparatus of claim 1, wherein the geometric structures have nano-scale thin film form factors, and wherein the particular optical response is across a broadband spectrum that spans at least 100 nanometers.

24. An apparatus comprising:
   each of a plurality of device components
   including at least one layer of geometric structures,
   arranged as a metasurface, and
   having optical properties for a particular optical response that is optimized to control an attribute of light, in terms of one or more of an amount or amplitude of light and a phase of light, across a broadband spectrum, wherein the plurality of device components are shaped to manipulate light defined in a particular wavelength range based on the shapes and sizes of the geometric structures, wherein adjacent ones of the plurality of device components are arranged to define a space which is set to operate by at least one of: mitigating coupling between adjacent device components, and providing an approximate linear phase profile response.

25. The apparatus of claim 24, wherein the metasurface is thicker than a decay length of evanescent modes which at least in part characterize the plurality of device components.

26. The apparatus of claim 24, wherein edges between boundaries of the plurality of device components are configured to account for minimum geometric structure dimensions.

* * * * *